United States Patent
Park et al.

(10) Patent No.: US 10,630,828 B2
(45) Date of Patent: Apr. 21, 2020

(54) MOBILE TERMINAL AND METHOD FOR CONTROLLING SAME

(71) Applicant: LG ELECTRONICS INC., Seoul (KR)

(72) Inventors: Mihyun Park, Seoul (KR); Hongjo Shim, Seoul (KR); Hyunok Lee, Seoul (KR); Changseok Cho, Seoul (KR); Mansoo Sin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/339,210

(22) PCT Filed: Nov. 10, 2016

(86) PCT No.: PCT/KR2016/012926
§ 371 (c)(1),
(2) Date: Apr. 3, 2019

(87) PCT Pub. No.: WO2018/066746
PCT Pub. Date: Apr. 12, 2018

(65) Prior Publication Data
US 2019/0312965 A1 Oct. 10, 2019

(30) Foreign Application Priority Data
Oct. 4, 2016 (KR) ........................ 10-2016-0127747

(51) Int. Cl.
*A61B 5/00* (2006.01)
*G01P 15/00* (2006.01)
(Continued)

(52) U.S. Cl.
CPC ....... *H04M 1/72519* (2013.01); *H04M 1/725* (2013.01); *H04W 4/023* (2013.01)

(58) Field of Classification Search
CPC ........... H04M 1/7253; H04M 1/72519; H04M 1/72533; A61B 5/681; A61B 5/6824; H04W 4/80
See application file for complete search history.

(56) References Cited

U.S. PATENT DOCUMENTS

| 2014/0127996 A1* | 5/2014 | Park .................. H04W 4/008 |
| 2014/0239065 A1 | 8/2014 | Zhou et al. |
| 2016/0089080 A1* | 3/2016 | Li ........................ A61B 5/6801 |

FOREIGN PATENT DOCUMENTS

| KR | 20150011246 | 1/2015 |
| KR | 20150084190 | 7/2015 |

(Continued)

OTHER PUBLICATIONS

PCT International Application No. PCT/KR2016/012926, International Search Report dated Jun. 30, 2017, 2 pages.

*Primary Examiner* — Gary Lafontant
(74) *Attorney, Agent, or Firm* — Lee, Hong, Degerman, Kang & Waimey

(57) ABSTRACT

The present invention relates to a wrist-wearable mobile terminal and a method for controlling the same. A mobile terminal according to an embodiment of the present invention comprises: a band configured to be worn around a user's wrist; a first body connected to the band; a second body formed to be attachable to or detachable from the first body; and a control unit for outputting information relating to an external device to different devices when the first body and the second body are separated from each other and when the same are coupled to each other, respectively.

20 Claims, 48 Drawing Sheets

(51) Int. Cl.
*H04M 1/725* (2006.01)
*H04W 4/02* (2018.01)

(56) References Cited

FOREIGN PATENT DOCUMENTS

KR    20150099430    8/2015
KR    20160086183    7/2016

* cited by examiner

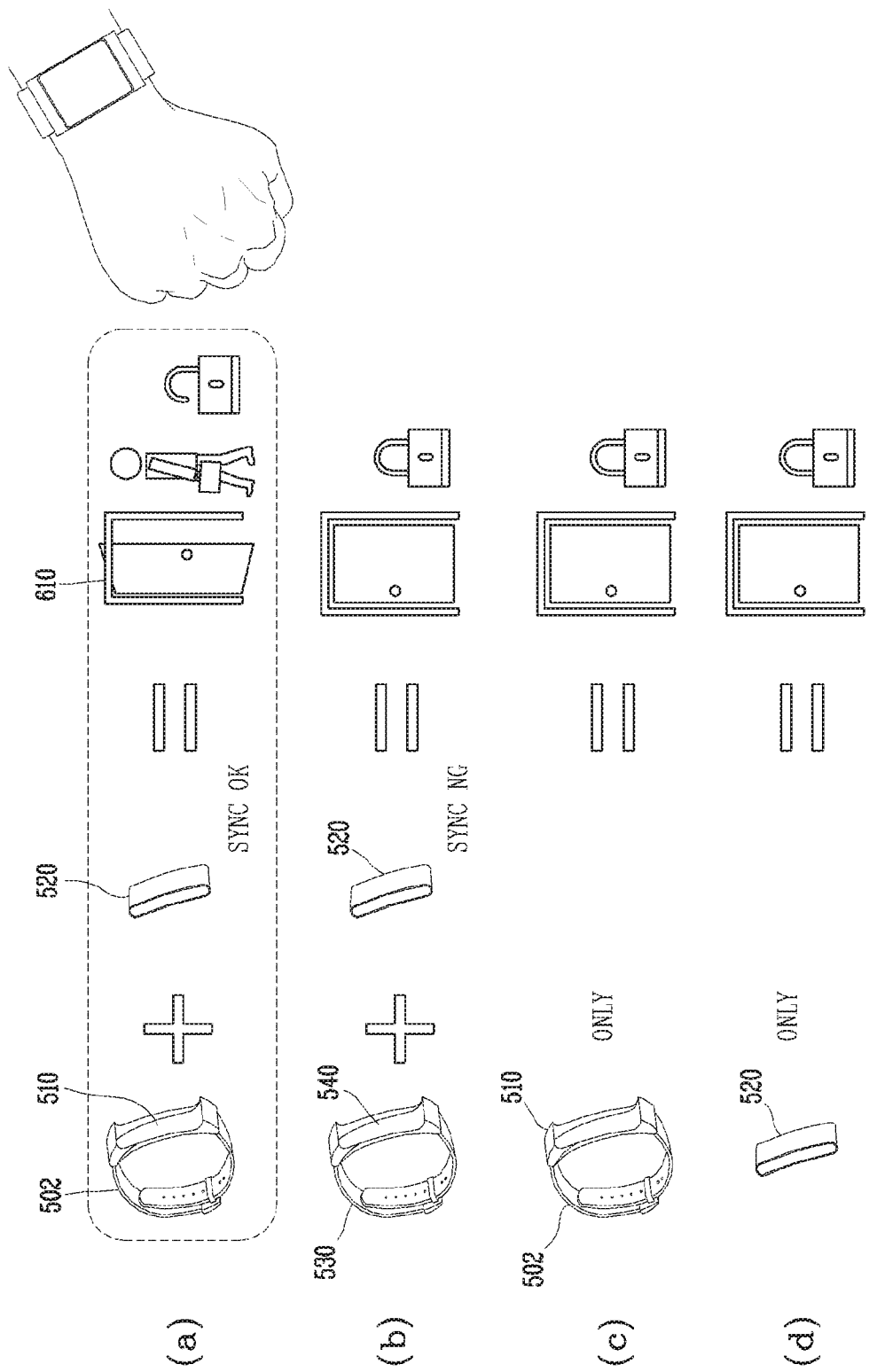

FIG. 6F
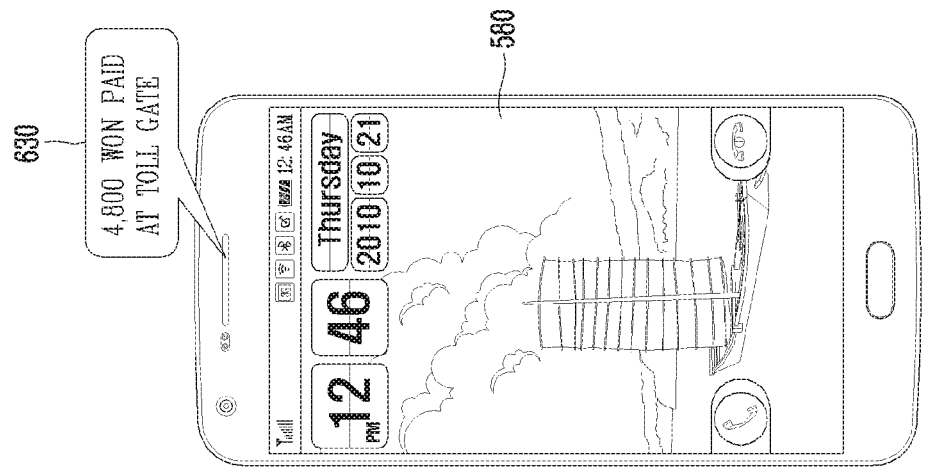
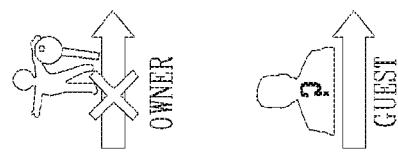
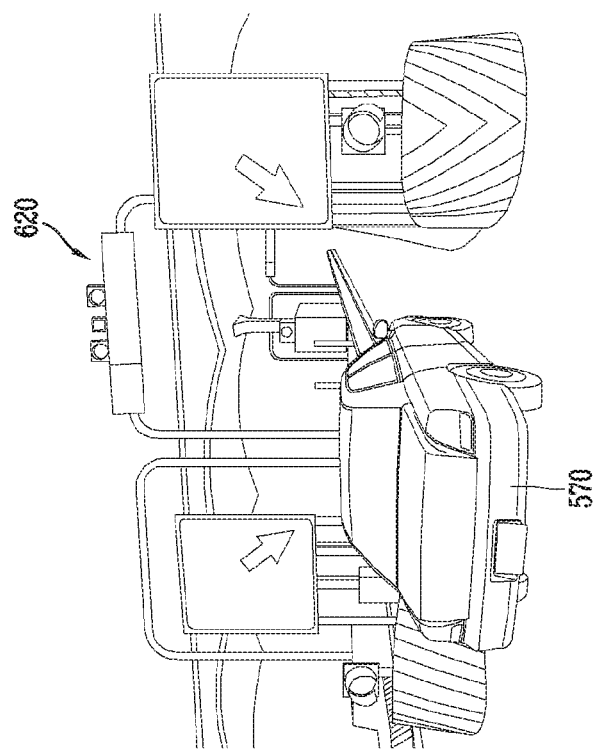

FIG. 7A
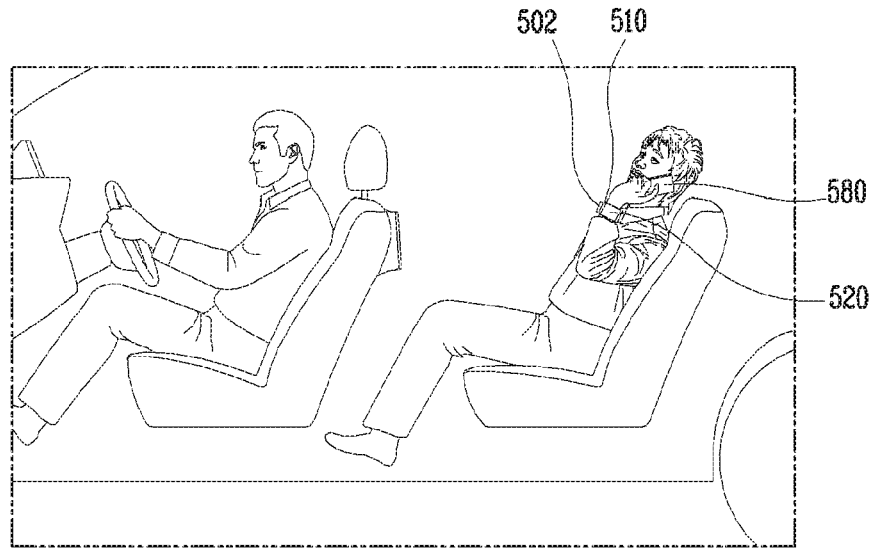
(a)
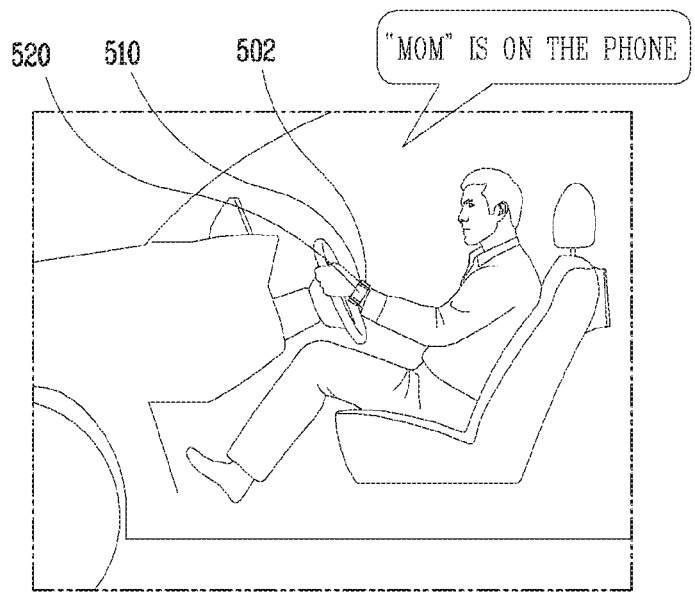
"MOM" IS ON THE PHONE
(b)

FIG. 7B
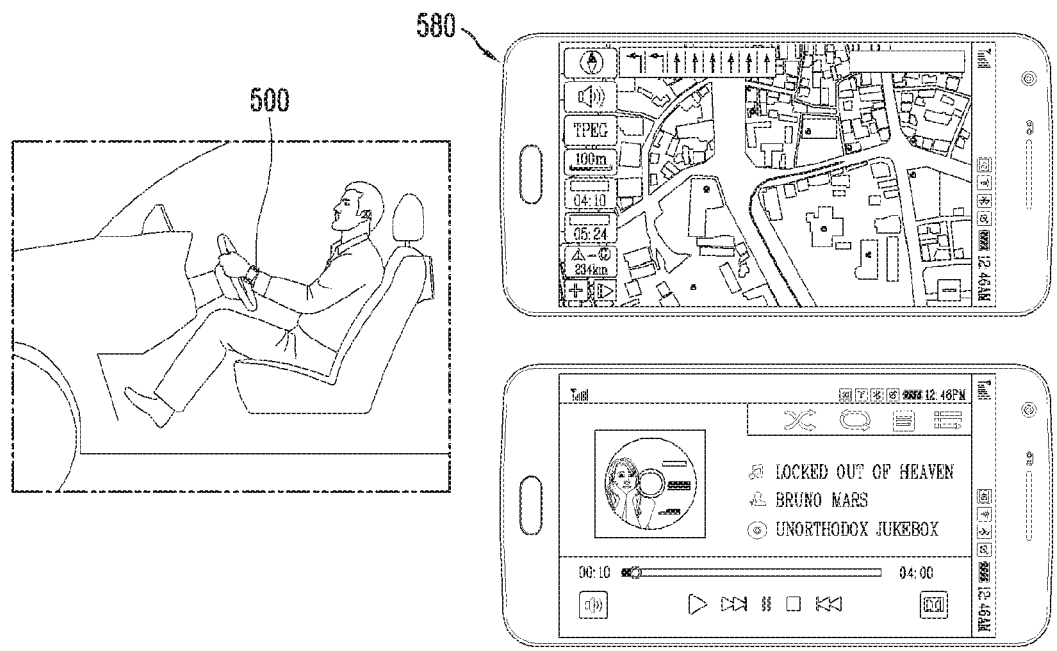
(a)
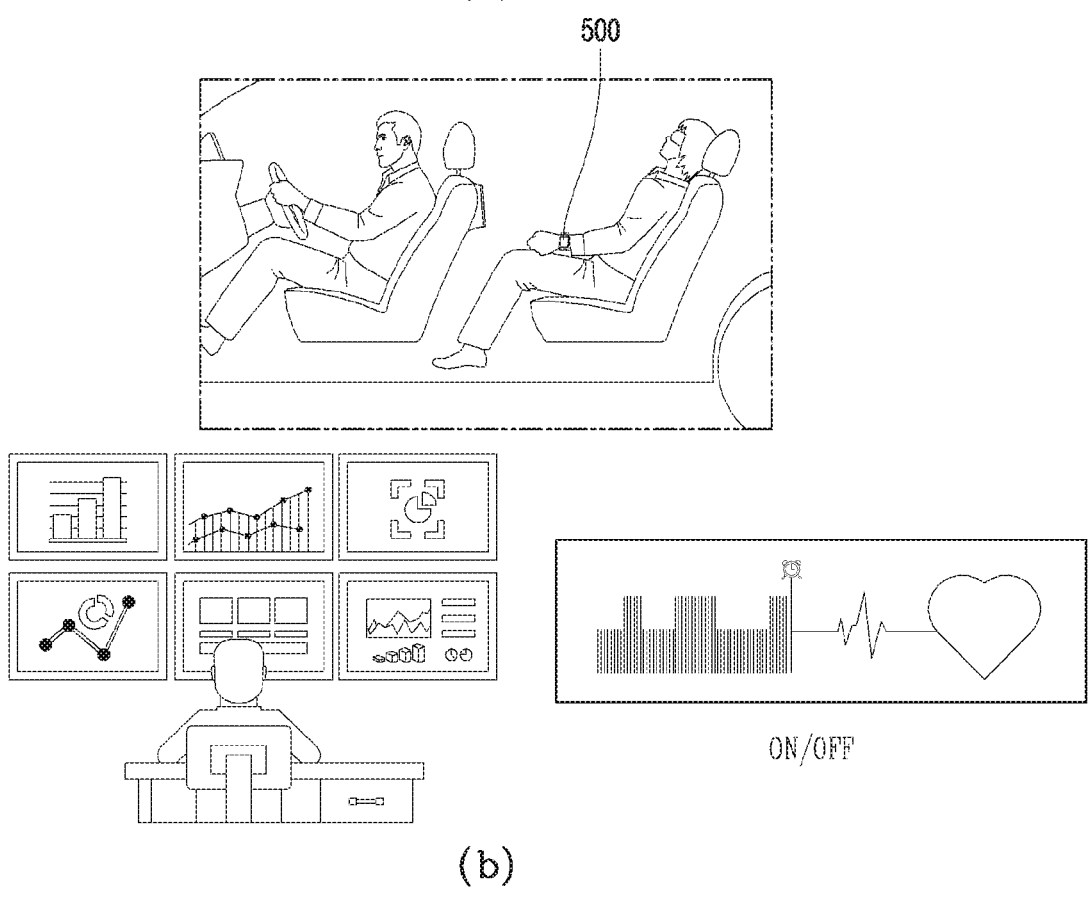
(b)

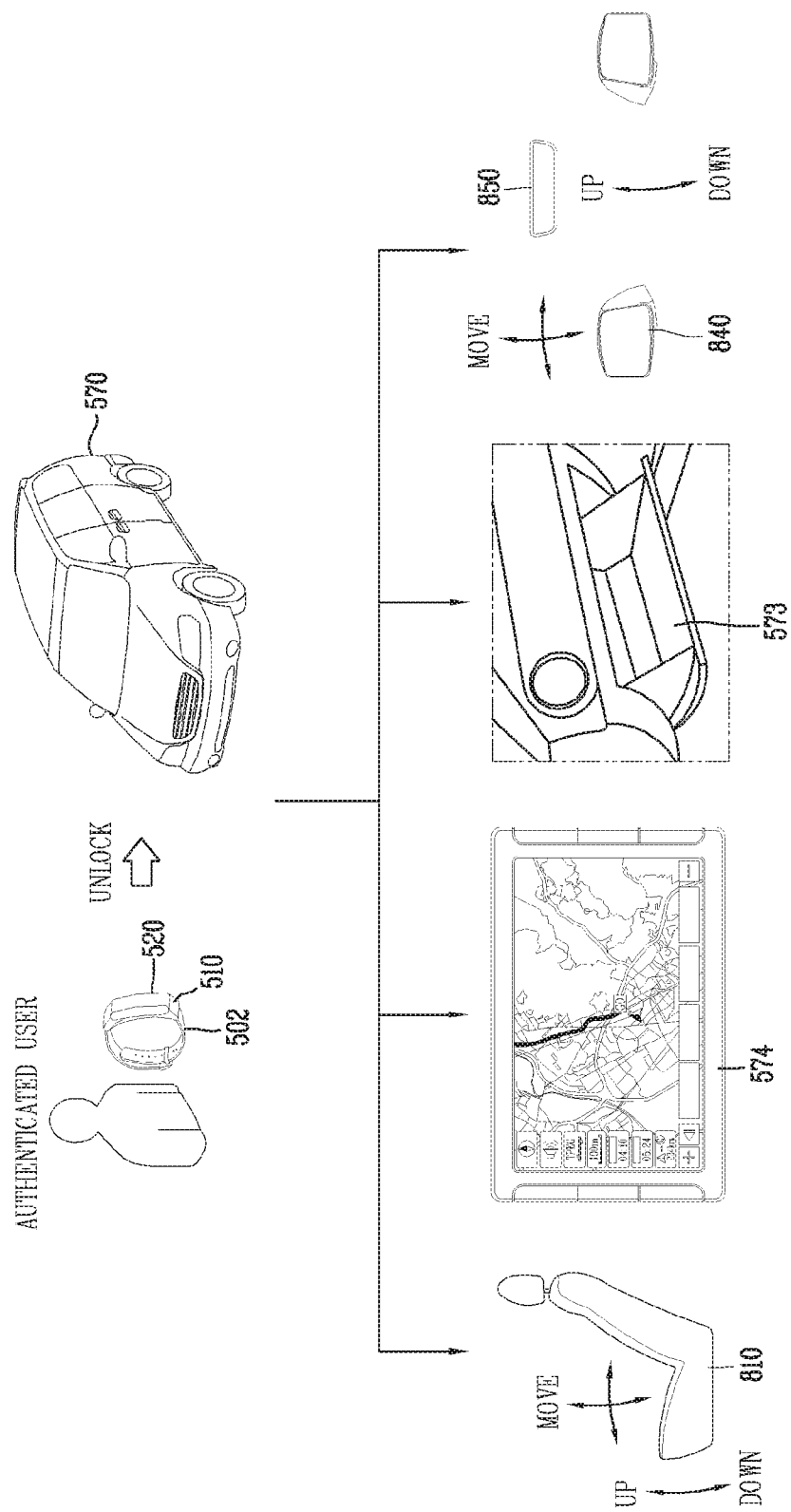

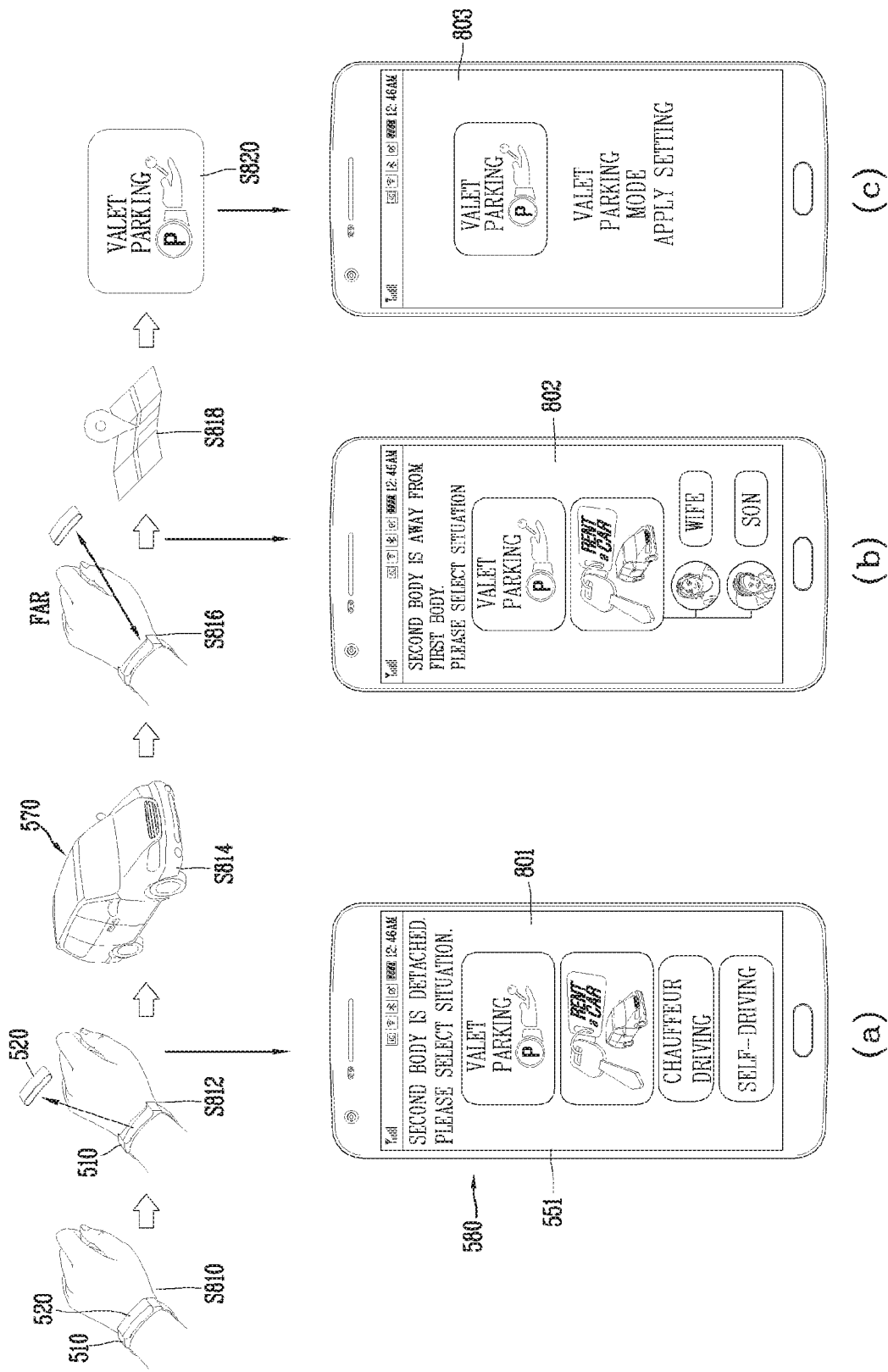

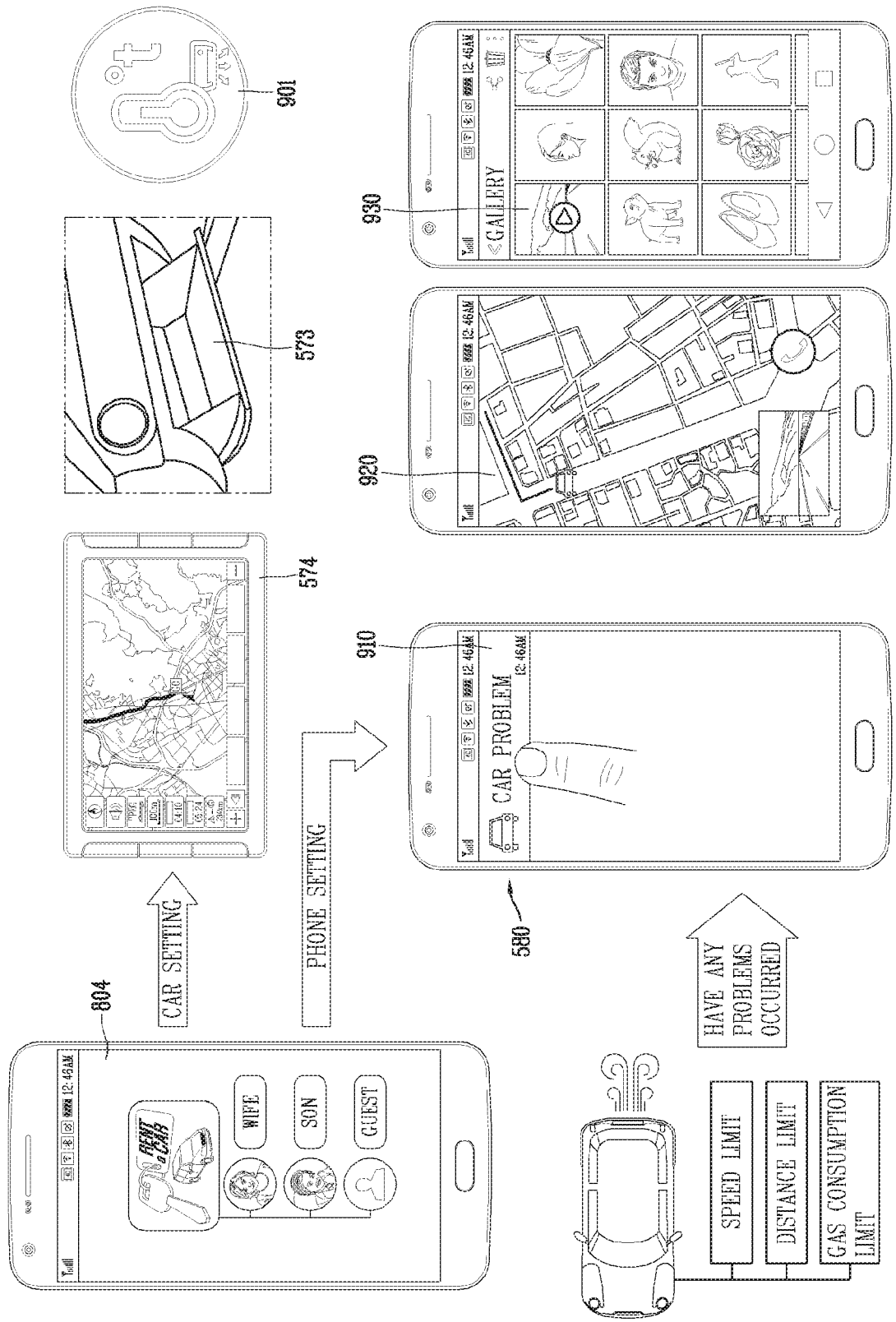

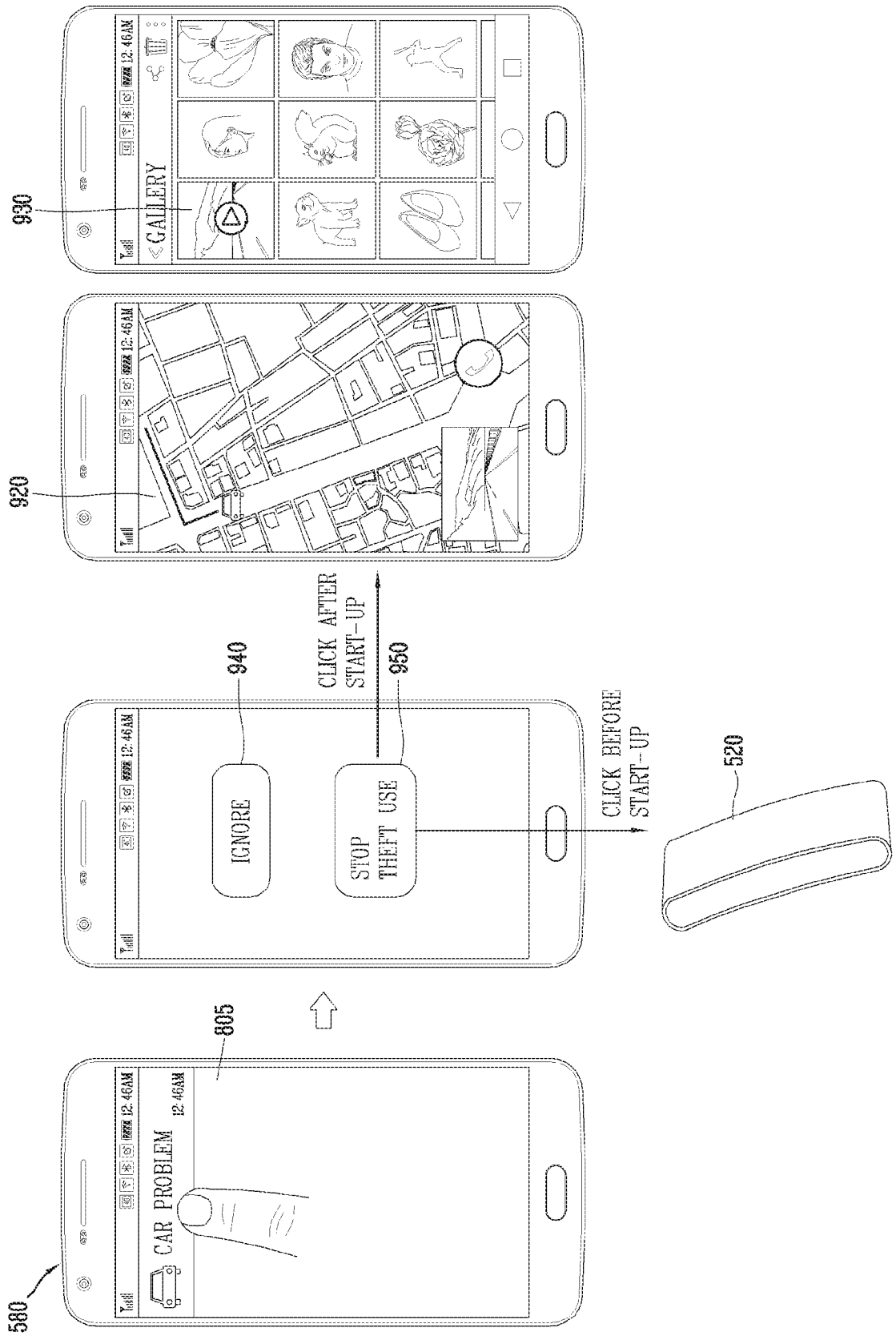

FIG. 11
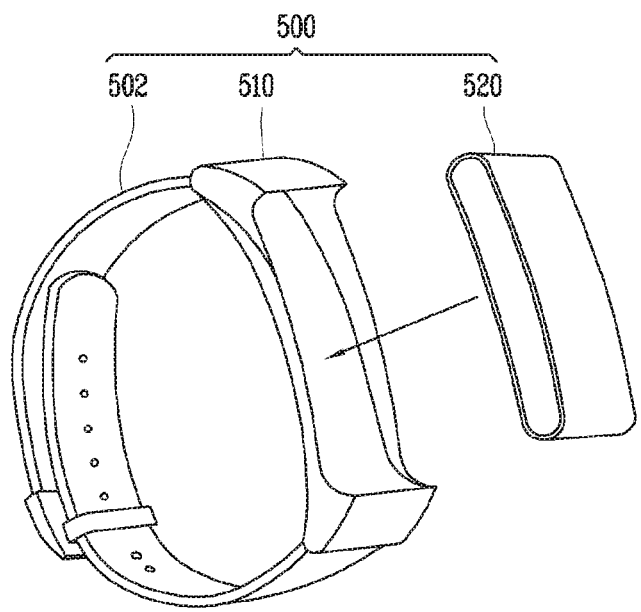
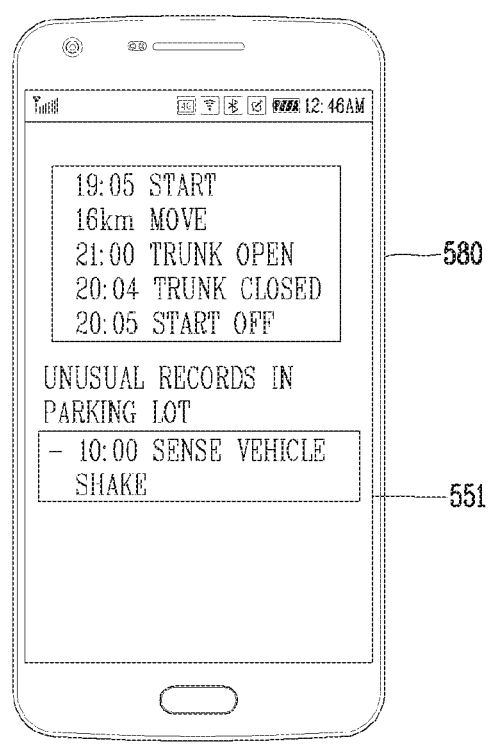

FIG. 14
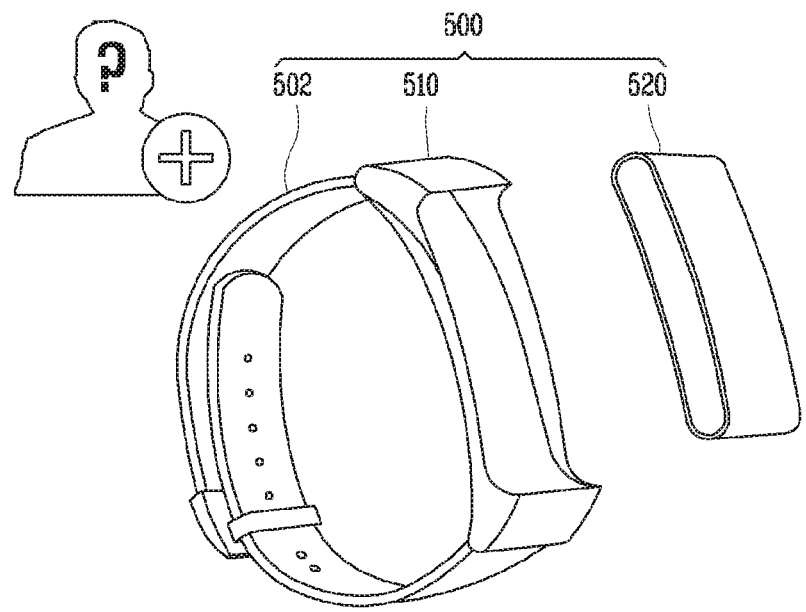
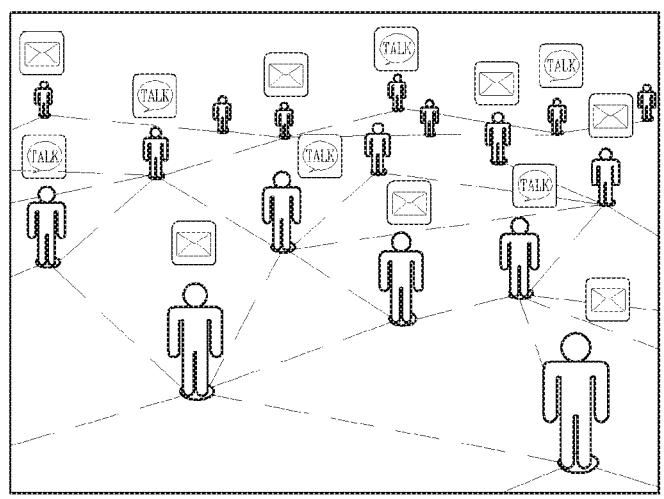
[EXISTING USER GROUP NOTIFICATION]

TYPE 2

FIG. 17
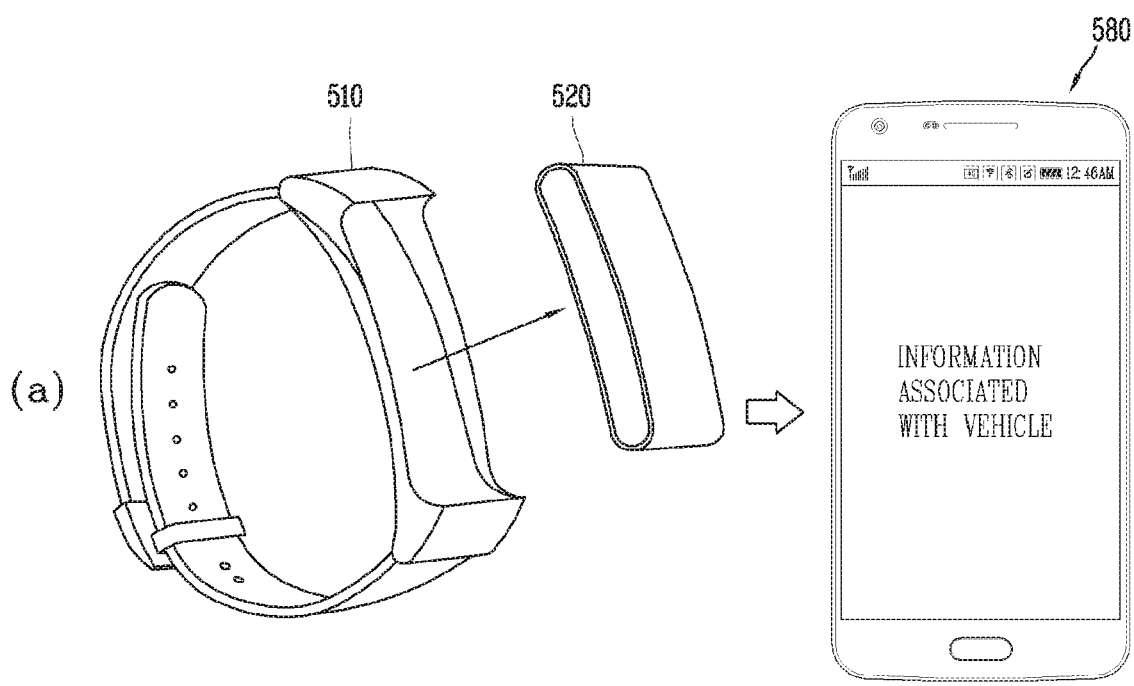
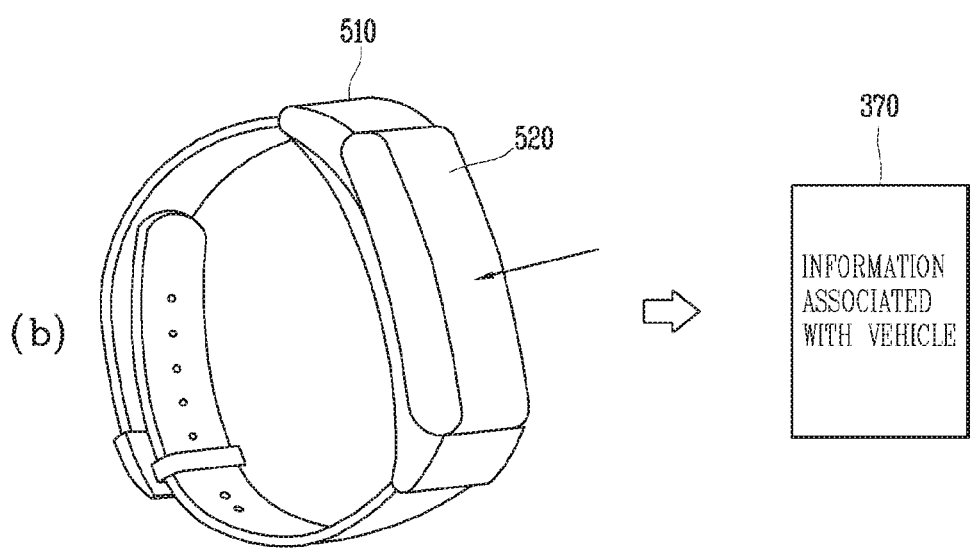

FIG. 18A
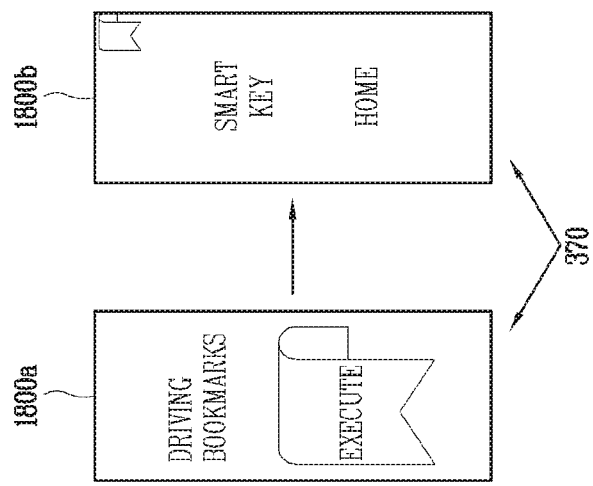
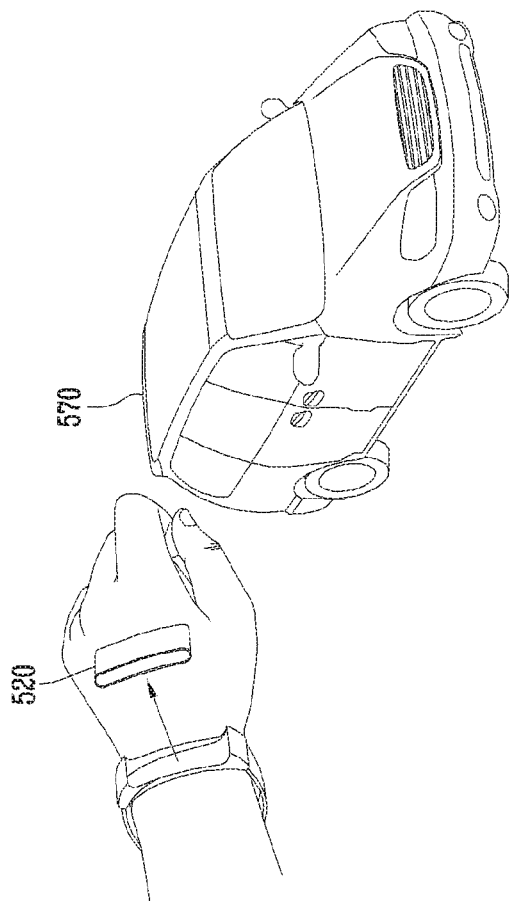

FIG. 19B
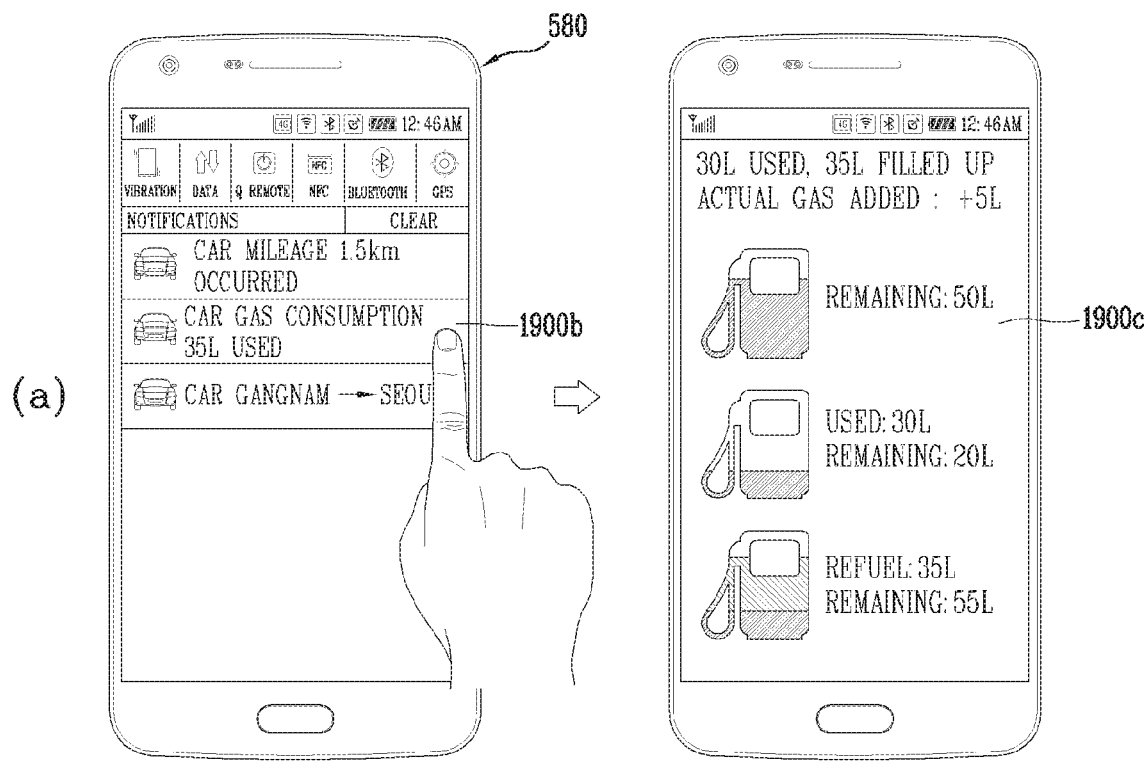
(a)
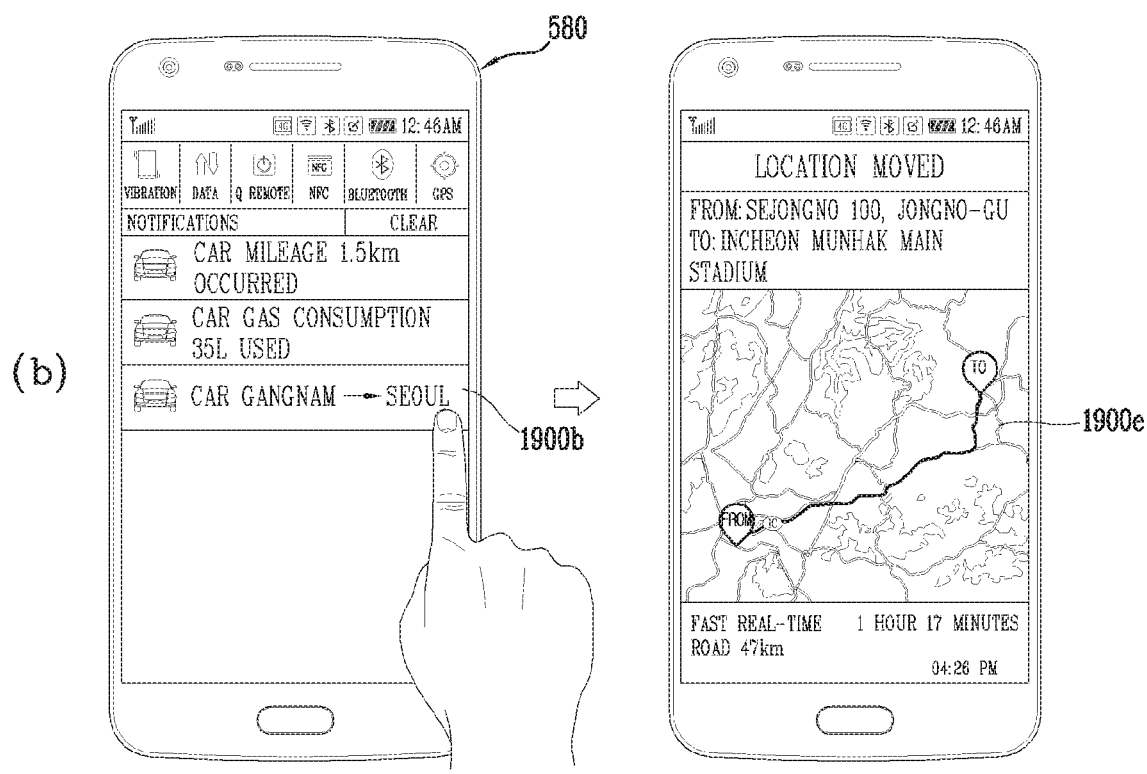
(b)

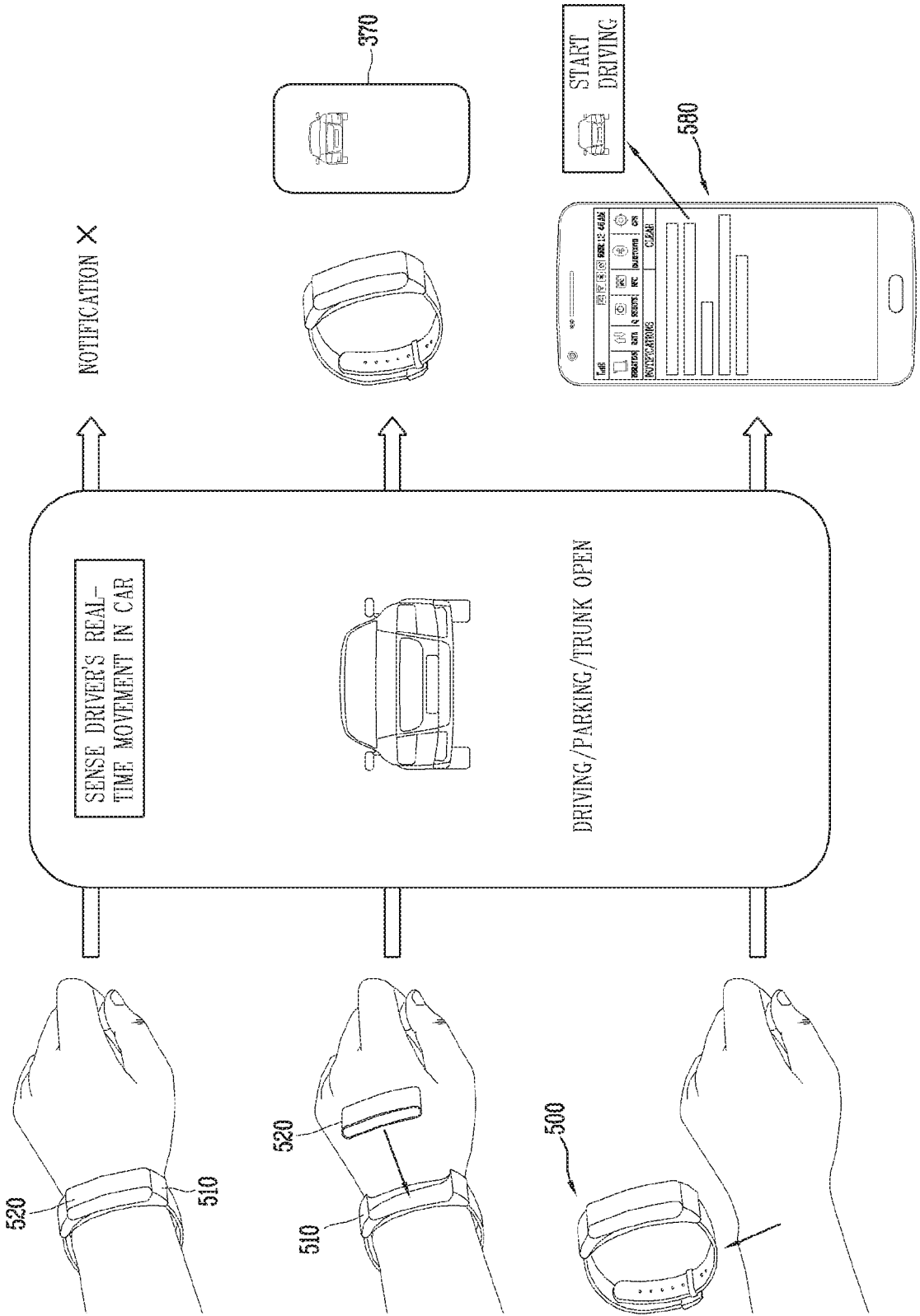

FIG. 22
(a)　　　　　　　　　　　(b)
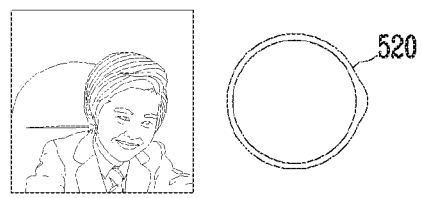　　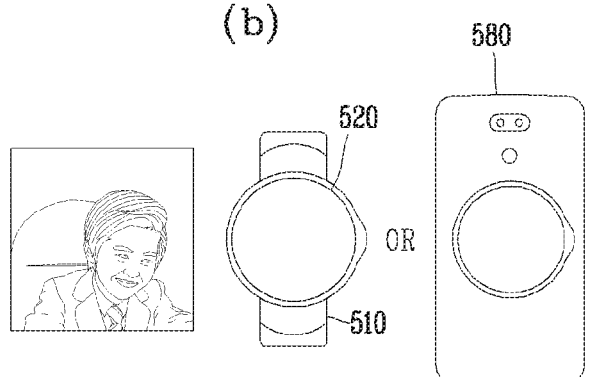
(c)　　　　　　　　　　　(d)
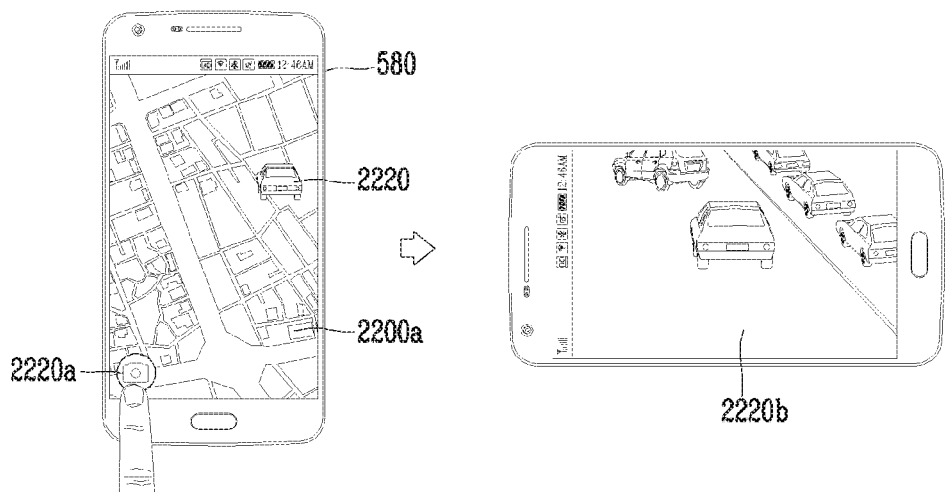
(e)

FIG. 23
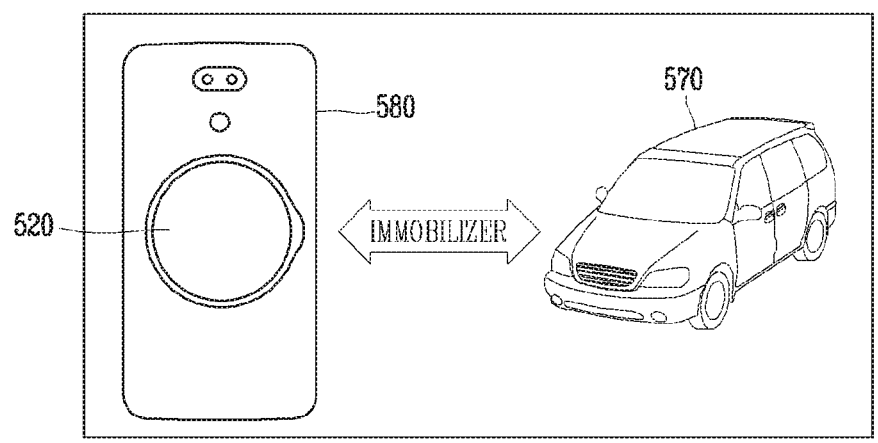
(a)
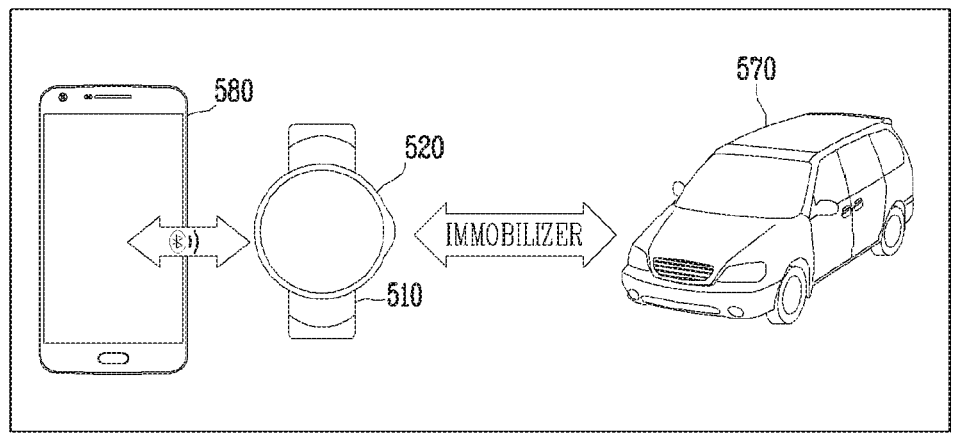
(b)

FIG. 25
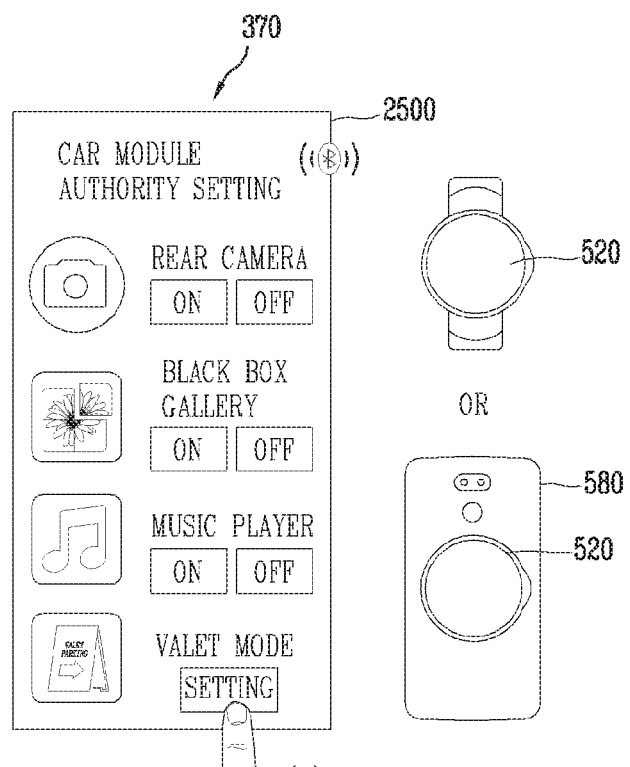
(a)
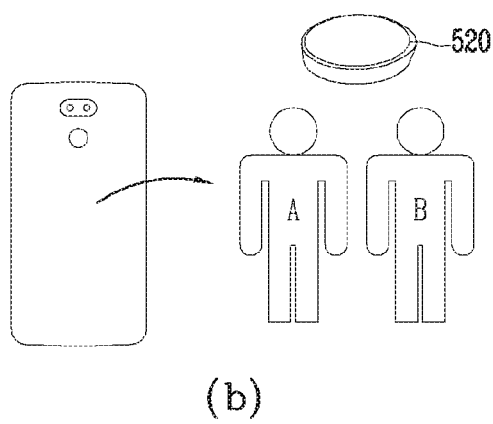
(b)

FIG. 26
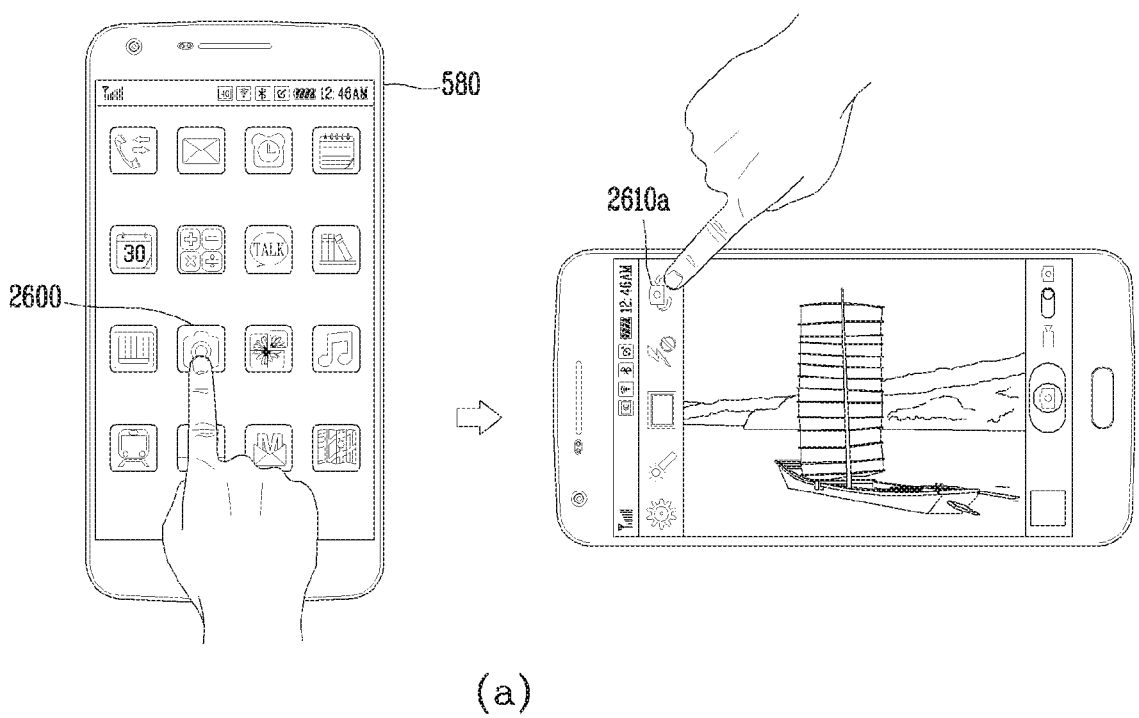
(a)
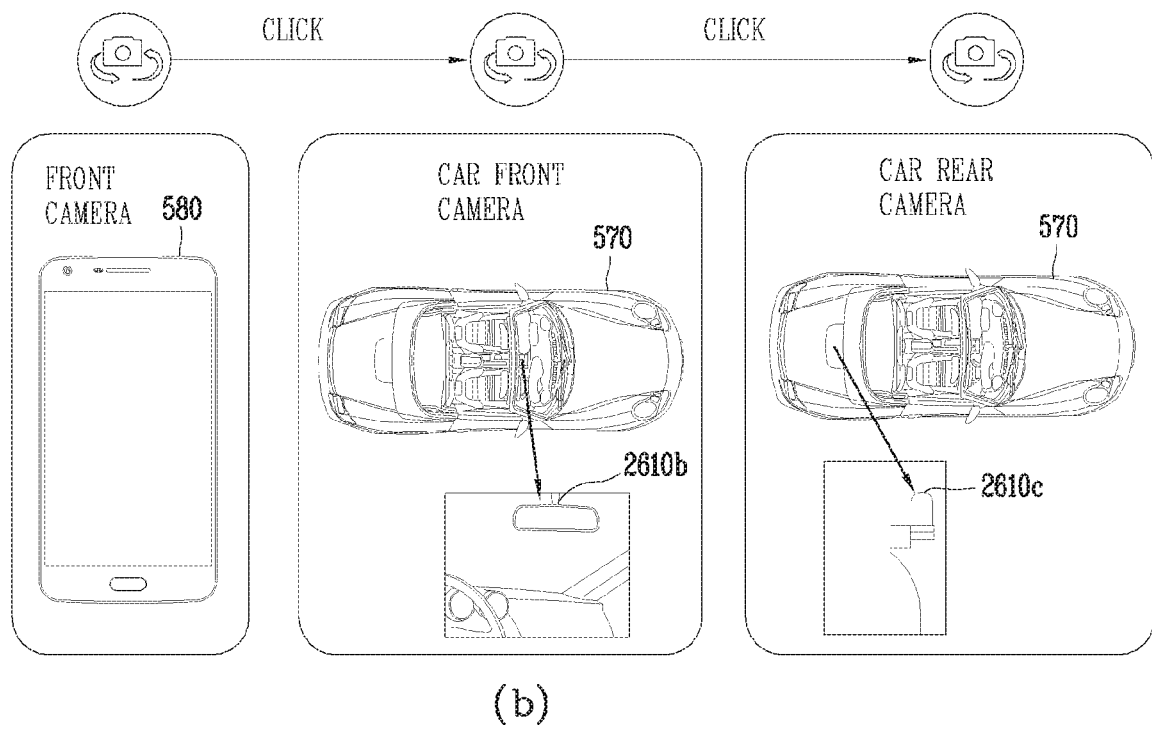
(b)

FIG. 28
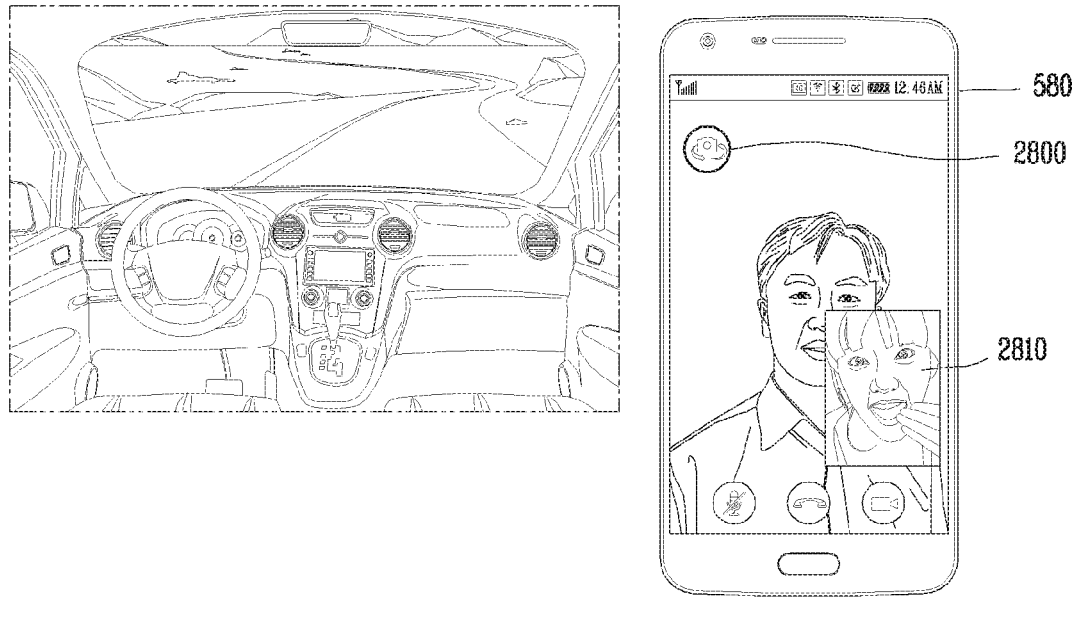
(a)
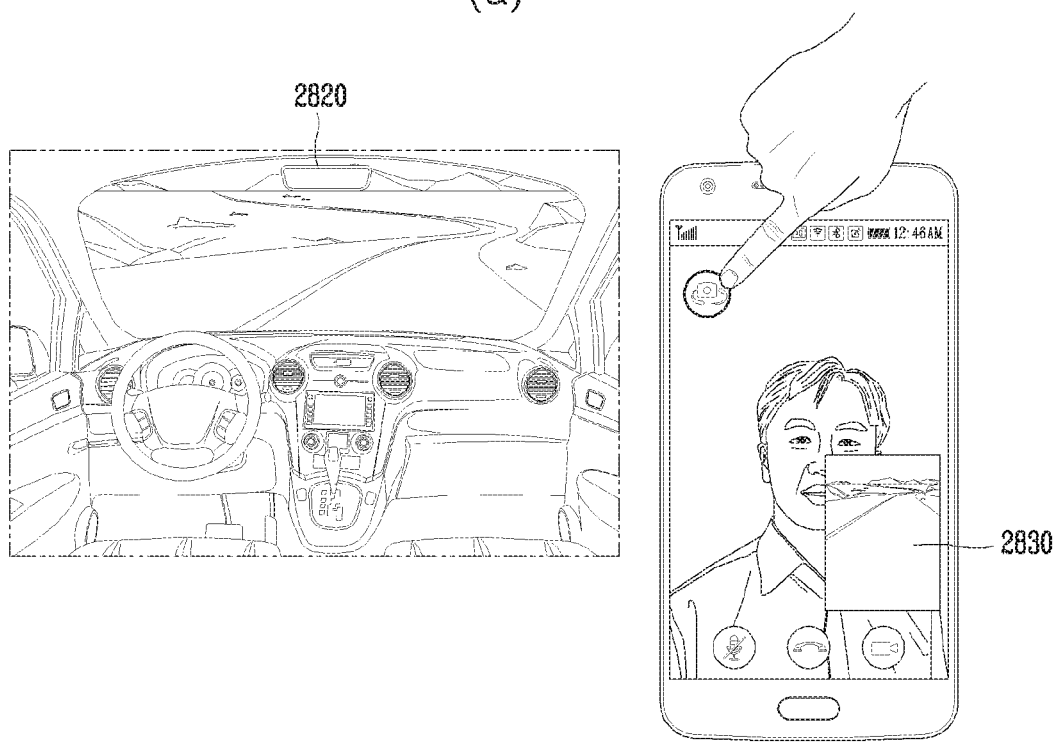
(b)

FIG. 32
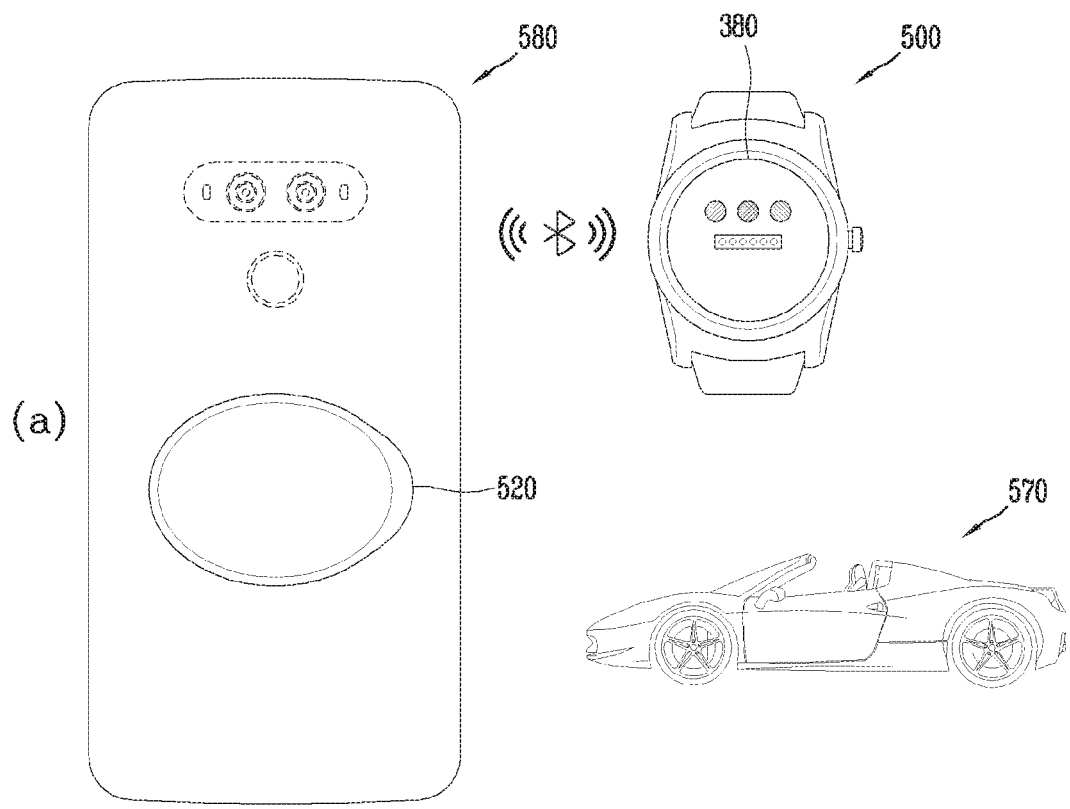
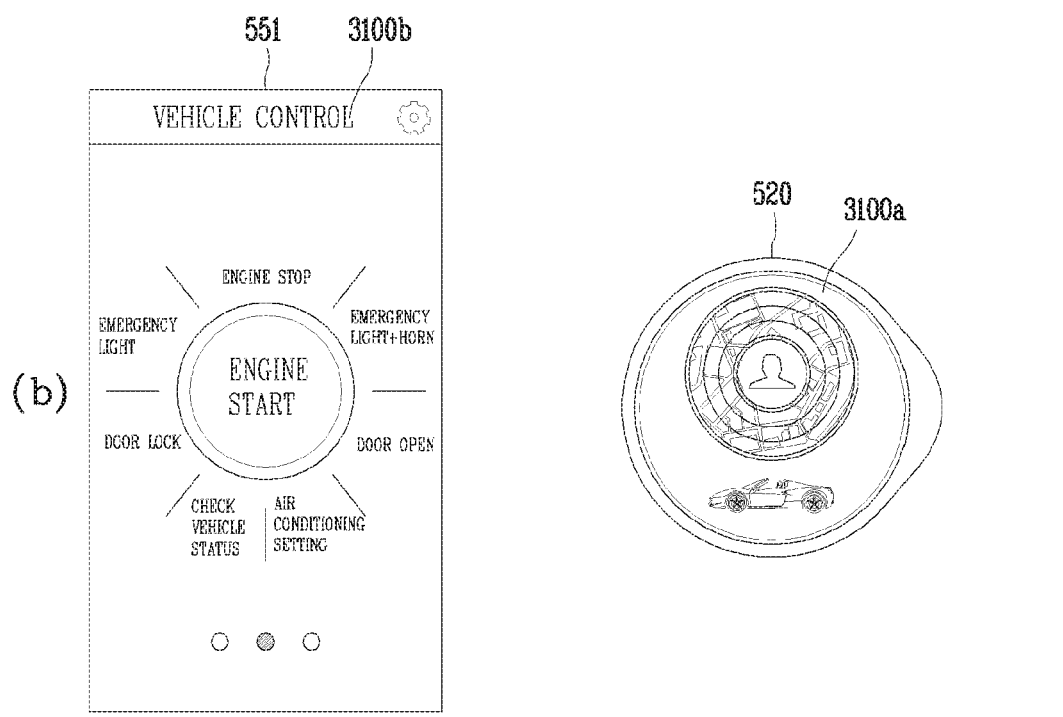

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2016/012926, filed on Nov. 10, 2016, which claims the benefit of earlier filing date and right of priority to Korean Application No. 10-2016-0127747, filed on Oct. 4, 2016, the contents of which are all hereby incorporated by reference herein in their entirety.

BACKGROUND OF THE INVENTION

1. Field of the Invention

The present disclosure relates to a mobile terminal formed to be wearable on a wrist and a control method thereof.

2. Description of the Conventional Art

Terminals may be classified into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

In recent years, remote keyless entry (RKE) for opening and closing a door is provided in a vehicle. Here, the RKE performs a function of allowing a driver to open or close the door of the vehicle using a lock button or an unlock button.

On the other hand, in daily life, the driver may have various situations such as carrying a load in both his hands or holding a kid. At this time, it is very difficult and burdensome for the driver to perform the process of pressing a lock button or an unlock button of the RKE.

Accordingly, in recent years, technologies for controlling a vehicle using a mobile terminal have been actively developed.

SUMMARY OF THE INVENTION

An object of the present disclosure is to provide a mobile terminal in which a part of the main body is formed to be detachable.

Furthermore, another object of the present disclosure is to provide a mobile terminal capable of controlling an external device in an optimized manner using a detached main body and a control method thereof.

In addition, still another object of the present disclosure is to provide a mobile terminal capable of providing information associated with an external device in an optimized manner when the main body is detached therefrom and a control method thereof.

A mobile terminal according to an embodiment of the present disclosure may include a band configured to be worn on a user's wrist to wrap the wrist, a first body connected to the band, a second body formed to be detachable from the first body, and a controller configured to output information associated with an external device to a different device when the first body and the second body are detached from or attached to each other.

According to an embodiment, the external device may include a vehicle.

According to an embodiment, the controller may output information associated with the external device to a preset external terminal when the first body and the second body are detached from each other, and display information associated with the external device on the second body when the first body and the second body are connected to each other.

According to an embodiment, a processor provided in the second body may display screen information capable of controlling the external device on the second body when the first body and the second body are detached from each other.

According to an embodiment, the processor may display different screen information based on whether or not the first body and the second body are within a predetermined distance from the external device when they are detached from each other.

According to an embodiment, the controller may display screen information capable of controlling the external device on the second body when the first body is detached from the wrist while the first body and the second body are combined with each other.

According to an embodiment, the controller may display different screen information based on whether or not the first body is within a predetermined distance from the external device when the first body are detached from the wrist.

According to an embodiment, when the second body is detached from the first body and then recombined with the first body, the controller may output event information generated from the external device to the second body while the second body is detached therefrom.

According to an embodiment, when an event is generated from the external device, the controller may output information associated with the generated event to at least one of the second body and a preset external terminal.

According to an embodiment, the processor provided in the second body may be formed to display an image received through a camera provided in the external device on a preset external terminal while the second body is attached to the preset external terminal subsequent to being detached from the first body.

According to an embodiment, the processor provided in the second body may display a graphic object linked to a function associated with the external device on a preset external terminal when the second body is attached to the preset external terminal subsequent to being detached from the first body.

A method of controlling a mobile terminal according to an embodiment of the present disclosure may include sensing whether the first body and the second body are detached from or attached to each other, and outputting information associated with an external device to a different device when the first body and the second body are detached from or attached to each other.

According to an embodiment, the external device may include a vehicle.

According to an embodiment, said outputting information may output information associated with the external device to a preset external terminal when the first body and the second body are detached from each other, and display information associated with the external device on the second body when the first body and the second body are connected to each other.

According to an embodiment, the method may further include displaying screen information capable of controlling the external device on the second body when the first body and the second body are detached from each other.

According to an embodiment, said displaying screen information on the second body may display different screen information based on whether or not the first body and the second body are within a predetermined distance from the external device when they are detached from each other.

According to an embodiment, when the second body is detached from the first body and then recombined with the first body, said outputting information may output event information generated from the external device to the second body while the second body is detached therefrom.

According to an embodiment, when an event is generated from the external device, said outputting information may output information associated with the generated event to at least one of the second body and a preset external terminal.

According to an embodiment, the method may further include displaying an image received through a camera provided in the external device on a preset external terminal while the second body is attached to the preset external terminal subsequent to being detached from the first body.

According to an embodiment, the method may further include displaying a graphic object linked to a function associated with the external device on a preset external terminal when the second body is attached to the preset external terminal subsequent to being detached from the first body.

The effects of a mobile terminal according to the present disclosure and a control method thereof will be described as follows.

The present disclosure may provide a new user interface capable of controlling an external device (vehicle) in various ways according to control authority set in a second body (or a first body).

Furthermore, the present disclosure may provide a watch type mobile terminal capable of performing various functions according to whether or not a user is driving while first control authority is set.

In addition, the present disclosure may provide a control method capable of setting control authority to limit other functions according to the state of a vehicle even when third control authority (or second control authority) is set as the second body is detached from the first body so as to control the vehicle using the second body in an optimized manner.

Besides, the present disclosure may provide a mobile terminal capable of outputting information associated with a vehicle to an optimized device based on whether the first body and the second body are detached from or attached to each other, and a control method thereof.

Moreover, the present disclosure may provide a control method capable of controlling a vehicle in an optimized manner using a preset external terminal when the second body is detached from the first body and attached to the external terminal.

Further scope of applicability of the present disclosure will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

FIGS. 6A, 6B, 6C, 6D, 6E and 6F are conceptual views for explaining a method of controlling an external device when first control authority is set in a second body of the present disclosure.

FIGS. 7A, 7B, and 7C are conceptual views for explaining a function being carried out according to a user's action in a state that first control authority is set in a watch type mobile terminal according to an embodiment of the present disclosure.

FIGS. 8A, 8B, 9A, 9B, 9C, 9D and 9E are conceptual views for explaining a method of controlling a vehicle according to control authority set in a watch type mobile terminal associated with the present disclosure.

FIGS. 10, 11, 12, 13 and 14 are conceptual views for explaining various embodiments associated with a case where a watch type mobile terminal associated with the present disclosure is detached.

FIG. 17 is a conceptual view for explaining the control method illustrated in FIG. 16.

FIGS. 18A, 18B, 18C, 18D, 19A, 19B, 20, 21, 22, 23, 24, 25, 26, 27, 28, 29, 30, 31 and 32 are conceptual views for explaining various embodiments associated with the present disclosure.

DETAILED DESCRIPTION OF THE PREFERRED EMBODIMENT

Figure 1A:
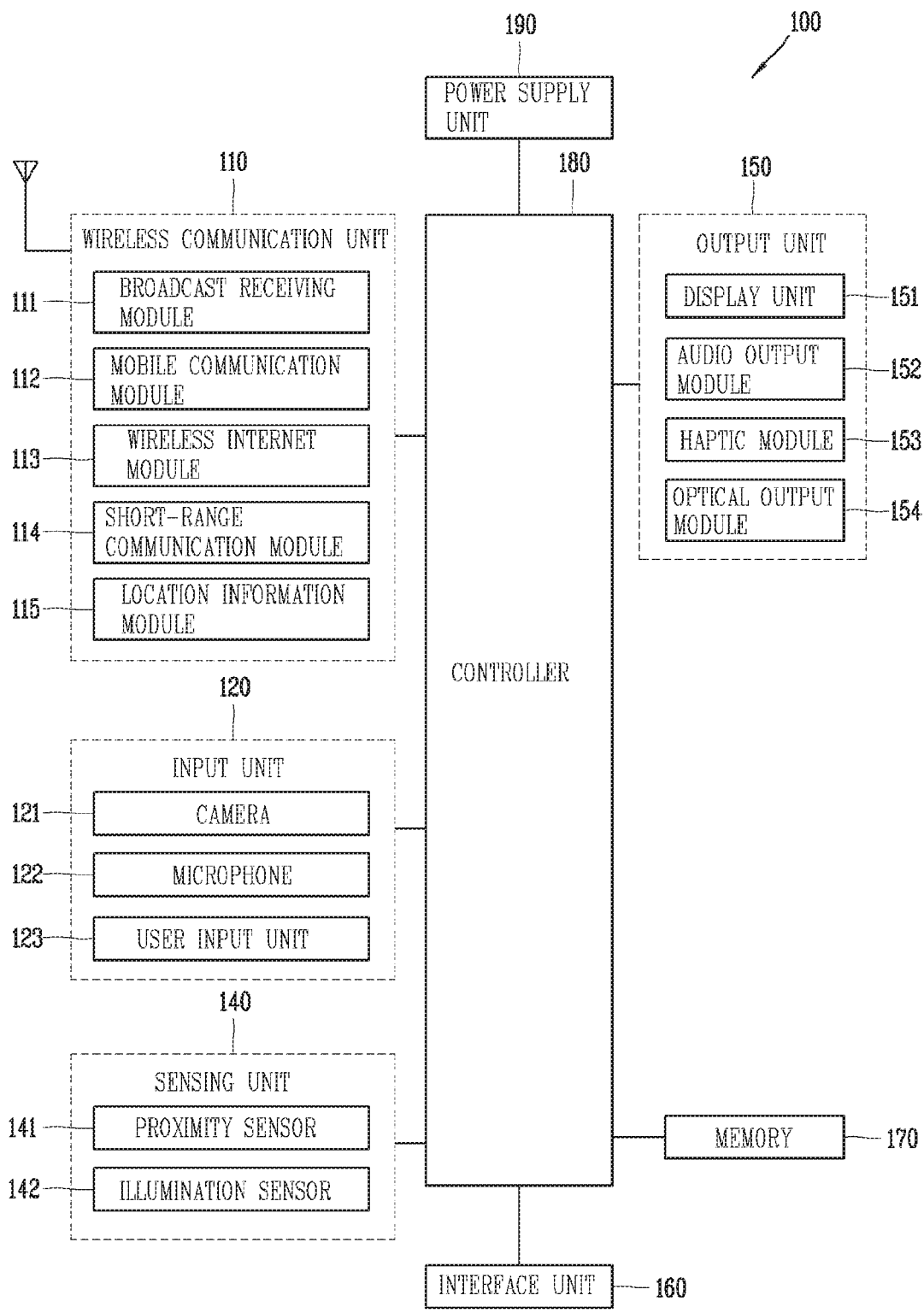
FIG. 1A is a block diagram for explaining a mobile terminal associated with the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
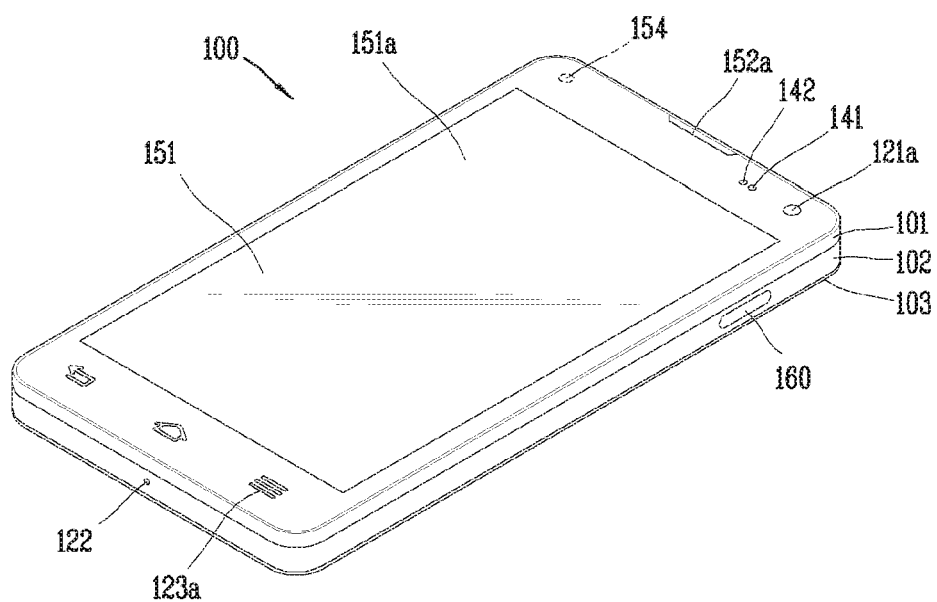
FIGS. 1B and 1C are conceptual views illustrating an example in which a mobile terminal associated with the present disclosure is seen from different directions.
Figure 1C:
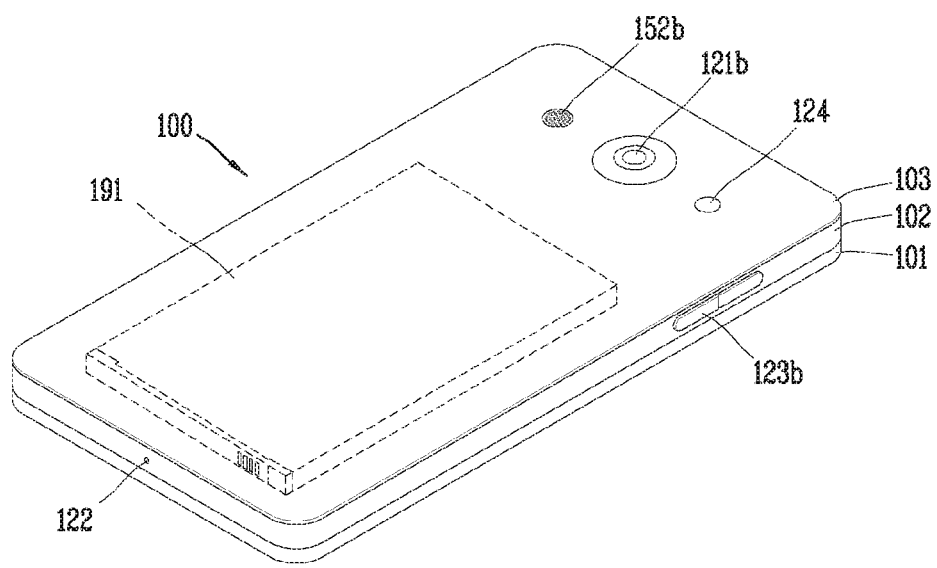

Referring to FIGS. 1A through 1C, FIG. 1A is a block diagram for explaining a mobile terminal associated with the present disclosure, and FIGS. 1B and 1C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

The input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be ended as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.).

The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring now to FIGS. 1B and 1C, the mobile terminal 100 is described with reference to a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example in which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger recognition sensor may be integrated into the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

On the other hand, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may be configured to exchange data with (or link with) another mobile terminal 100. The short-range communication module 114 may sense (recognize) a wearable device capable of communicating with the mobile terminal in the vicinity of the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
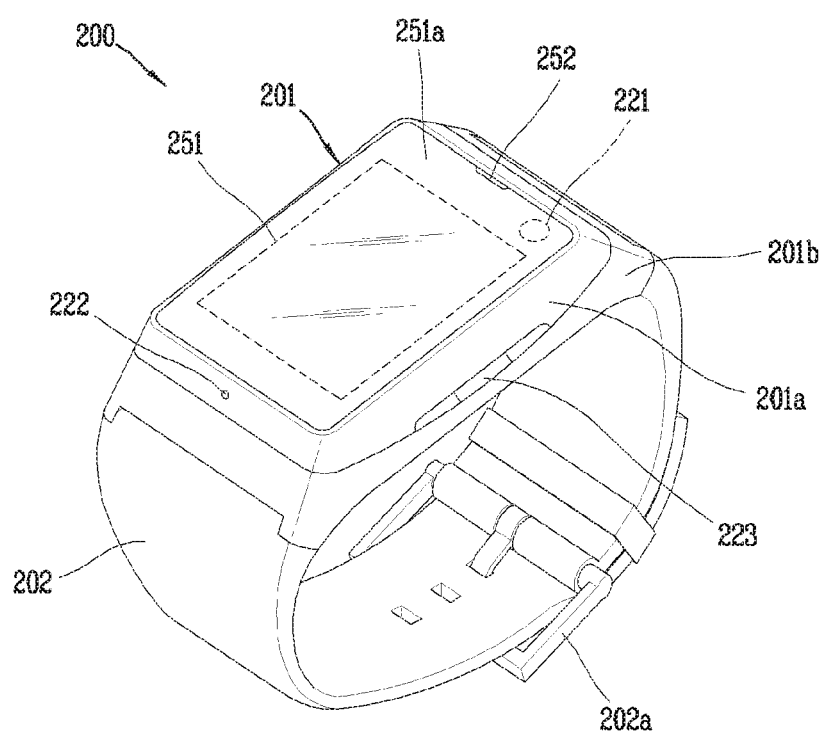
FIG. 2 is a perspective view illustrating an example of a watch type mobile terminal associated with another embodiment of the present disclosure.

FIG. 2 is a perspective view illustrating one example of a watch type mobile terminal 200 in accordance with another exemplary embodiment.

As illustrated in FIG. 2, the watch type mobile terminal 200 may include a main body 201 with a display unit 251, and a band 202 connected to the main body 201 to be wearable on a wrist. In general, the mobile terminal 200 may include the features of the mobile terminal 200 in FIGS. 1A through 1C or similar features thereof.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, a window 251a of the display unit 251 may be mounted onto the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as the touch screen, it may function as the user input unit 223, which may result in excluding a separate key on the main body 201.

The band 202 may be worn on a wrist to wrap the wrist. The band 302 may be made of a flexible material for facilitating the wearing. The band 202 is commonly worn on the user's wrist and may be made of a flexible material for facilitating wearing of the device. The band 202 may also be configured to be detachable from the main body 201. Accordingly, the band 302 may be replaceable with various types of bands according to a user's preference.

On the other hand, the band 202 may be used for extending the performance of the antenna. For example, the band may include therein a ground extending portion (not shown) electrically connected to the antenna to extend a ground area.

The band 202 may be provided with a fastener 202a. The fastener 202a may be implemented into a buckle type, a snap-fit hook structure, a Velcro type, or the like, and include a flexible section or material. The drawing illustrates an example that the fastener 202a is implemented into the buckle type.

A location information module 115 of the mobile terminal is configured to acquire a position of the mobile terminal. Such location information module 115 may include a Global Position System (GPS) module and a Wireless Fidelity (Wi-Fi) module. According to the need, the location information module 115 may perform any function of the other modules of the wireless communication unit 110 to obtain data on the location of the mobile terminal.

The GPS module 115 may measure an accurate time and distance from three or more satellites, and accurately calculate a current location of the mobile terminal according to trigonometry based on the measured time and distances. At present, there is widely used a method of calculating position and time information using three satellites and correcting an error of the calculated position and time information using another satellite. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The WiFi positioning system (WPS) refers to a location determination technology based on a wireless local area network (WLAN) using WiFi as a technology for tracking the location of the mobile terminal 100 using a WiFi module provided in the mobile terminal 100 and a wireless access point for transmitting and receiving wireless signals to and from the WiFi module.

The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, Service Set IDentification (SSID), Received Signal Strength Indicator (RSSI), Reference Signal Received Power (RSRP), Reference Signal Received Quality (RSRQ), channel information, privacy, network type, signal strength and noise strength.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. Information included therein is compared with the received wireless AP information to extract (analyze) the location information of the mobile terminal 100.

A method for extracting (analyzing) location information of the mobile terminal 100 may include a Cell-ID method, a fingerprint method, a trigonometry method, a landmark method, etc.

The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter.

In addition to these position location methods, various algorithms may be used to extract (analyze) location information of a mobile terminal.

Such extracted location information of the mobile terminal 100 is transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment where the mobile terminal 100 is positioned.

As aforementioned with reference to FIG. 1A, a short-range communication technique, such as Bluetooth™, Radio Frequency Identification (RFID), Infrared Data Association (IrDA), Ultra-Wideband (UWB), ZigBee and Near Field Communication (NFC), may be applicable to the mobile terminal according to the present disclosure.

An NFC module provided at the mobile terminal supports short-range wireless communication, a non-contactable type between mobile terminals, within about 10 cm. The NFC module may operate in one of a card mode, a reader mode and a P2P mode. The mobile terminal 100 may further include a security module for storing card information, in order to operate the NFC module in a card mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may be at least one of a user's name, a user's number (e.g., undergraduate number or staff number) and an entrance history.

In a case where the NFC module operates in a reader mode, the mobile terminal may read data from an external tag. The data received from the external tag by the mobile terminal may be coded into the NFC Data Exchange Format defined by the NFC Forum. The NFC Forum defines four record types. More specifically, the NFC Forum defines four RTDs (Record Type Definitions) such as Smart Poster, Text, URI (Uniform Resource Identifier) and General Control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call.

In a case where the NFC module operates in a peer-to-peer (P2P) mode, the mobile terminal may execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Hereinafter, embodiments associated with a control method which can be implemented in the mobile terminal having the foregoing configuration will be described with reference to the attached drawings. It should be understood by those skilled in the art that the present disclosure can be embodied in other specific forms without departing from the concept and essential characteristics thereof.

The present disclosure relates to a watch type mobile terminal, and may include at least one component illustrated in FIGS. 1A through 2. Hereinafter, a watch type mobile terminal according to an embodiment of the present disclosure will be described in more detail.

Figure 3A:
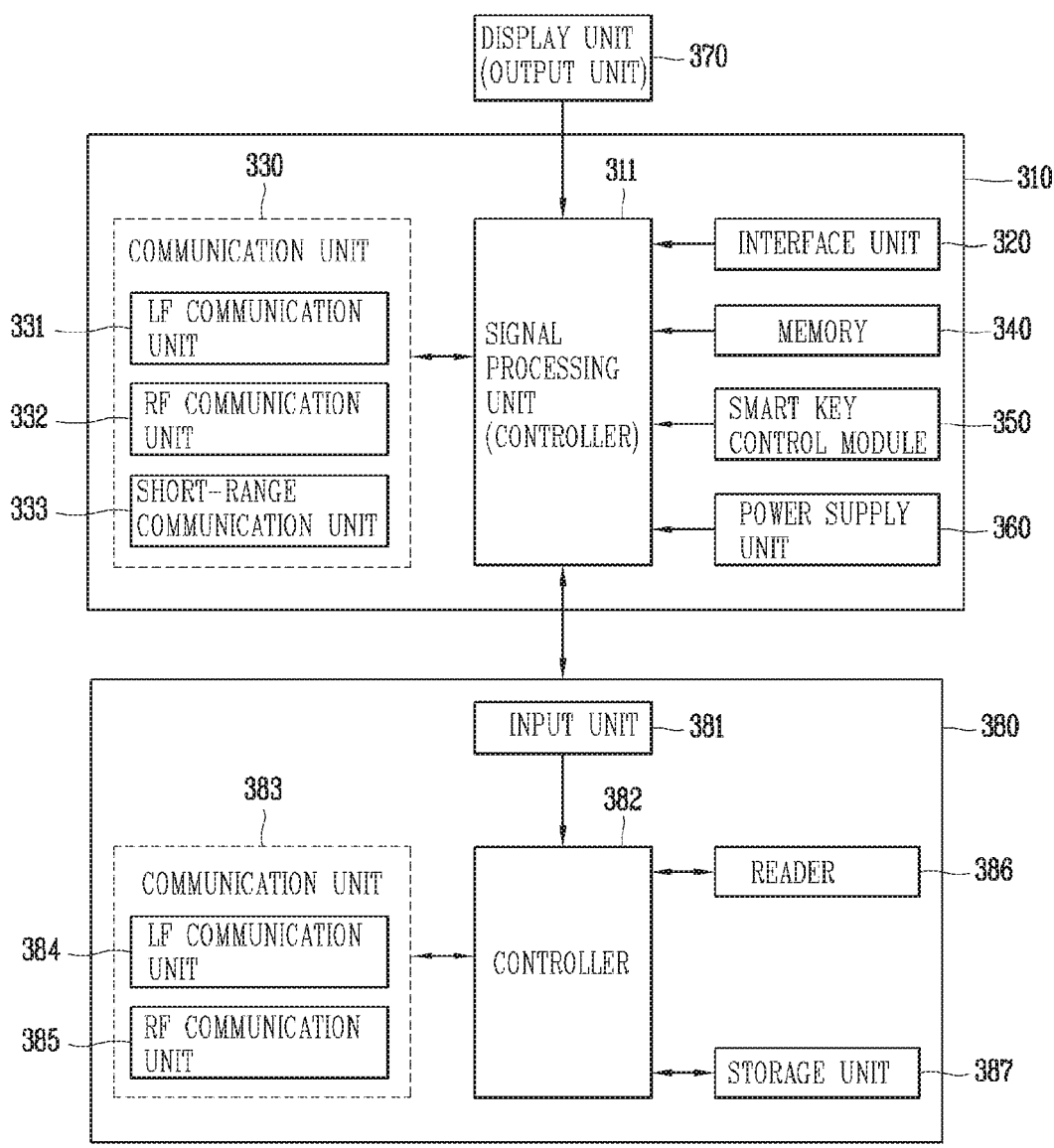
FIGS. 3A, 3B and 3C are conceptual views for explaining a watch type terminal according to an embodiment of the present disclosure.
Figure 3B:
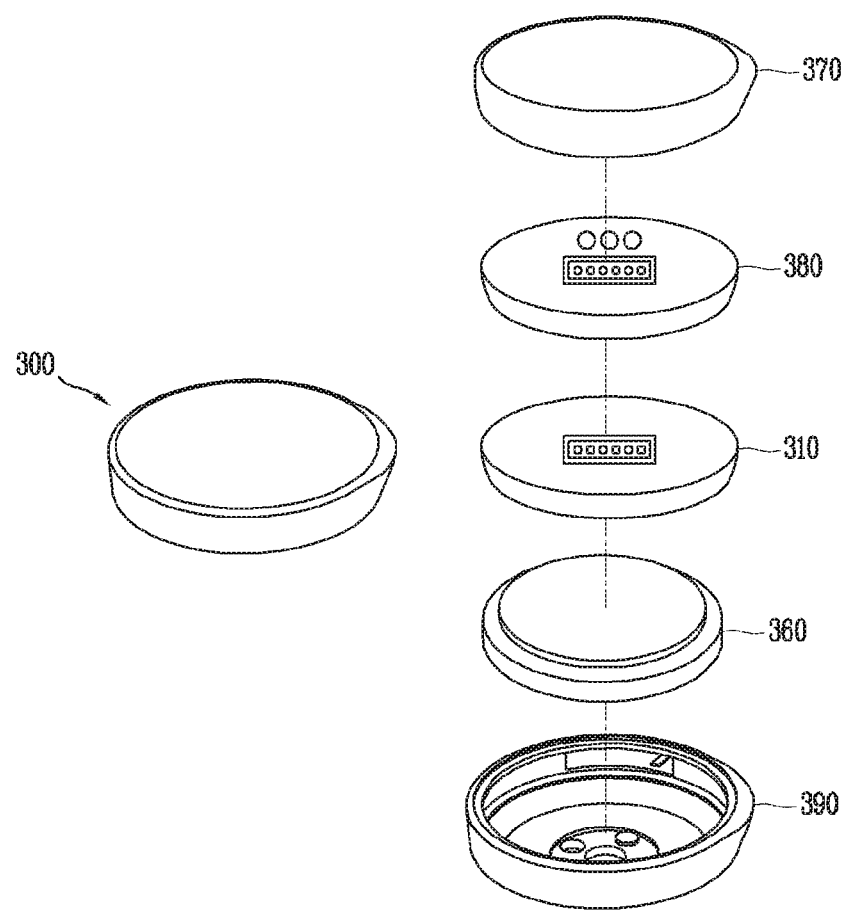
Figure 3C:
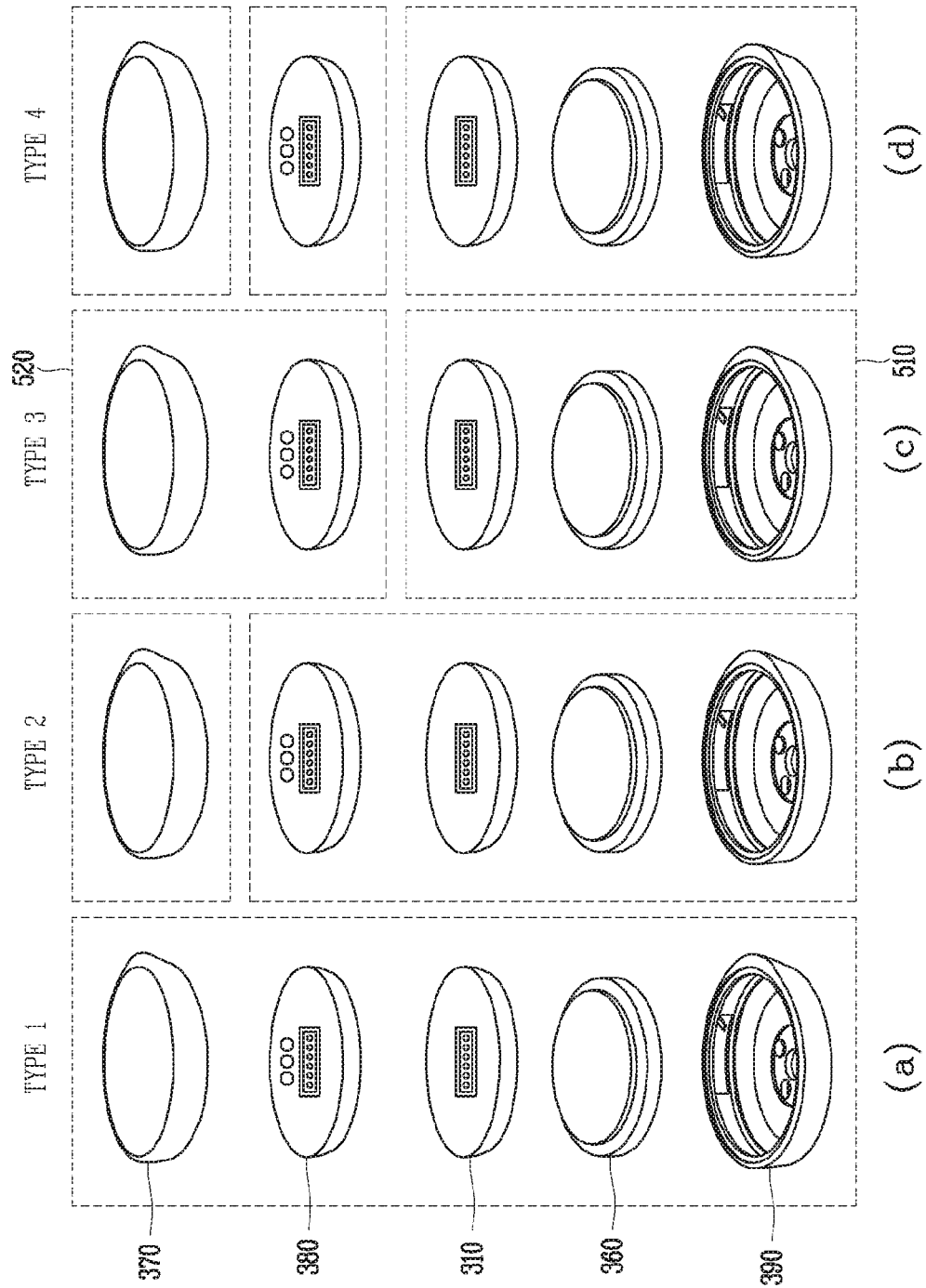

FIGS. 3A, 3B and 3C are conceptual views for explaining a watch type terminal according to an embodiment of the present disclosure.

First, referring to FIG. 3A, a watch type mobile terminal according to an embodiment of the present disclosure may include a FOB module capable of controlling a vehicle.

The FOB module is equipped with a function of controlling a vehicle (or a function related to a vehicle), and for an example, when a user input is received through a display unit or a user input unit provided in a watch type mobile terminal, the FOB module may control the vehicle to perform a function associated with the vehicle corresponding to the relevant input.

A watch type mobile terminal including the FOB module may be used in combination with the band 202 described in FIG. 2. From such a point of view, the watch type mobile terminal associated with the present disclosure may perform the role of a type of vehicle electronic key or smart vehicle key.

The FOB module may perform various functions provided in an existing vehicle smart key. For example, the FOB module may perform a vehicle door opening/closing function, a trunk opening/closing function, an emergency lighting function, a horn output function, an immobilizer function, and the like.

In addition, the FOB module may differentially set the control authority of the vehicle. The control authority of the vehicle may be set while the FOB module is attached to a main system or may be set through user authentication when the FOB module is detached from the main system or may be set through a pre-authenticated external terminal (for example, a mobile terminal owned by a user of a watch type mobile terminal, a mobile terminal that has performed authentication with a watch type mobile terminal).

A watch type mobile terminal according to an embodiment of the present disclosure may be referred to as a "FOB key," an "immobilizer key," an "electronic key," a "smart key," or the like.

FIG. 3A is a block diagram illustrating a configuration of a watch type mobile terminal according to an embodiment of the present disclosure.

Referring to FIG. 3A, a watch type mobile terminal 200 according to an embodiment of the present disclosure may include a main system 310. Here, the main system 310 may be formed in a module form or a substrate form, and may be electrically and physically detachable from the above-described FOB module (see FIG. 3B).

The main system 310 may include a signal processing unit 311, an interface unit 320, a communication unit 330, a memory 340, a smart key control module 350, and a power supply unit 360.

The signal processing unit 311 (or controller 180) may process signals transmitted between the respective components of the main system 310. In addition, the main system 310 may include at least one of the components described with reference to FIG. 1A.

The signal processing unit 311 may be, for an example, the controller 180 described with reference to FIG. 1A.

The interface unit 320 may be connected to a vehicle control unit provided in the vehicle so as to perform wired/wireless communication. The interface unit 320 may include at least one button linked to a function associated with the vehicle, and may receive a user command through each button. Here, the interface unit 320 may transmit the user command received through the button to the smart key control module 350 through the signal processing unit 311.

In addition, the interface unit 320 may be connected to the vehicle control unit (or vehicle drive unit) in a wired/wireless manner, and may be connected to the FOB module 380 to enable wired/wireless communication.

When a signal is received from the FOB module 380 through the communication unit 330, the interface unit 320 may transmit the signal to the vehicle control unit. For an example, when a start-up signal is received from the FOB module 380, the interface unit 320 may transmit the start-up signal to the vehicle control unit In addition, the interface unit 320 may be the interface unit 160 described with reference to FIG. 1A.

The communication unit 330 may include a communication module that supports a communication interface unit for transmitting and receiving signals to and from the FOB module 380. For an example, the communication unit 330 may include an LF communication unit 331 for transmitting an LF (low frequency) signal of a preset frequency band, for example, 125 kHz, 134 kHz or the like, to the FOB module 380, and may include an RF communication unit 332 for receiving a radio frequency (RF) signal of a preset frequency band, for example, 433 MHz or the like from the FOB module 380.

On the other hand, the communication unit 330 may further include a communication module that supports a communication interface unit for transmitting and receiving signals to and from the mobile terminal 100 in the vicinity. For an example, the communication unit 330 may include a short-range communication unit 333 for transmitting and receiving signals to and from the mobile terminal through a communication method such as near field communication (NFC) and Bluetooth.

In addition, the communication unit 330 may be the wireless communication unit 110 described with reference to FIG. 1A. Besides, the communication unit 110 may be provided not only in the main system 310 of the present disclosure, but also in the FOB module 380 and/or the display unit 370, respectively.

In the memory 340, a set value for the operation of the main system 310 may be stored. For an example, the memory 340 may store the frequency information of a signal of the FOB module 380 defined for transmitting and receiving signals to and from the FOB module 380. Moreover, the memory 340 may include information associated with control authority and information associated with user authentication for controlling the vehicle. Furthermore, the memory 340 may be stored with a control algorithm that generates a control command for controlling the operation of the vehicle using a signal received from the FOB module 380. In addition, information set to transmit and receive signals to and from the mobile terminal 100 and may store a control algorithm for controlling the power level of the mobile terminal 100 may be stored in the memory 340. The memory 340 may be the memory 170 described with reference to FIG. 1A.

When a function provided in the vehicle is executed, the smart key control module 350 receives a signal associated with the executed function through the interface unit 220. When a signal associated with a function executed in the vehicle is received, the smart key control module 350 generates a drive signal (wake-up) for driving the FOB module 380 and transmits the drive signal to the FOB module 380 through the LF communication unit 331.

Here, the smart key control module 350 determines that the authentication of the relevant FOB module 380 is successful when the data of a response signal received from the FOB module 380 matches pre-registered data. Then, the smart key control module 350 causes a control command inputted through the interface unit 320 to be transmitted to the FOB module 380 through the LF communication unit 331. At this time, when a start signal corresponding to a request signal is received through the RF communication unit 232, the smart key control module 350 allows a command for driving the relevant drive unit of the vehicle to be output through the interface unit 220 based on the start signal.

On the other hand, when the data of the response signal received through the RF communication unit 332 does not match pre-registered data, the smart key control module 350 determines that the authentication of the relevant FOB module 380 has failed.

In the above, or for convenience of explanation, the smart key control module 350 is described as a separate component, but the present disclosure is not limited thereto. All the configurations/functions/characteristics carried out by the smart key control module 350 may be carried out by the signal processing unit 311 (or the controller 180).

A power supply unit 360 for supplying power to the mobile terminal 200 may be provided in the watch type mobile terminal 200. The power supply unit 360 may be embedded in the watch type mobile terminal 200 or may be a battery 360 detachably formed on the watch type mobile terminal 200. The power supply unit 360 may be the power supply unit 190 described with reference to FIG. 1A.

The battery may receive power via a power source cable connected to the interface unit 320.

Furthermore, the battery may be configured to allow wireless charging via a wireless charger. The wireless charging may be implemented by magnetic induction or electromagnetic resonance.

Furthermore, the FOB module 380 according to an embodiment of the present disclosure includes a processor 382, an input unit 381, a communication unit 383, a reader 386, and a storage unit 387.

The processor 382 (or controller) controls the operation of each configuration of the FOB module 380.

The FOB module 380 may be provided with at least one operation button (not shown). Here, the input unit 381 may input a command corresponding to a button operated during the operation of the button provided in the FOB module 380.

The communication unit 383 may include a communication module that supports a communication interface for transmitting and receiving signals to and from the main system 310. For an example, the communication unit 383 may include an LF communication unit 384 for receiving an LF (low frequency) signal such as 125 kHz, 134 kHz or the like from the main system 310, and an RF communication unit 385 for transmitting a radio frequency (RF) signal such as 433 MHz or the like, to the smart key main system 310. Here, the communication unit 383 may be the wireless communication unit 110 described with reference to FIG. 1A.

The reader 386 reads a signal received through the LF communication unit 284. For an example, the reader 386 may read a drive signal received through the LF communication unit 384, and may read a request signal received through the LF communication unit 384 when the authentication of the FOB module 380 is completed. Here, the processor 382 generates a response signal corresponding to the read result of the reader 386, and transmits the response signal to the main system 310 through the RF communication unit 385. At this time, the processor 382 may compare the read result of the reader 386 with data stored in the storage unit 387 to generate a response signal according to the result.

In other words, when a drive signal is received from the main system 310, the processor 382 compares the read result of the reader 386 with data stored in the storage unit 387 to transmit the response signal to the main system 310. On the other hand, the processor 382 compares the read result of the reader 386 with data stored in the storage unit 387, and determines that an error has occurred to transmit an error signal to the main system 310.

Here, communication setting values for signal transmission/reception between the FOB module 380 and the main system 310 may be stored in the storage unit 387, and information for signal generation may be stored therein.

On the other hand, the display unit 370 displays (outputs) information processed in at least one of the FOB module 380 and the main system 310. For example, the display unit 370 may display execution screen information of an application program driven in at least one of the FOB module 380 and the main system 310 or user interface (UI) and graphic user interface (GUI) information according to the execution screen information.

Furthermore, the display unit 370 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

FIG. 3B is an exploded perspective view of a watch type mobile terminal according to an embodiment of the present disclosure. A main body 300 or 201 of the watch type mobile terminal according to an embodiment of the present disclosure may include the FOB module 380 formed to control a vehicle.

As illustrated in FIG. 3B, the main body 201 or 300 of the watch type mobile terminal 200 according to an embodiment of the present disclosure may include the display unit 370, the FOB module 380, the main system 310, the power supply unit 360, and a main frame 390.

The main frame 390 may denote at least one of the first case 201a and the second case 201b described with reference to FIG. 2, or a combination thereof.

The main frame 390 may perform the role of a case for coupling at least one of the display unit 370, the FOB module 380, the main system 310 and the power supply unit (battery) 360 described above thereto. In addition, the main frame 390 may be formed to be coupled to the band 202 described with reference to FIG. 2.

In FIG. 3B, it is illustrated that the main body 300 of the watch type mobile terminal 200 has a circular shape, but the present disclosure is not limited thereto but may have an elliptical shape or a polygonal shape.

The main body 300 of the watch type mobile terminal having the above-described structure may be integrally formed (first type), or at least one of the display unit 370, the FOB module 380 and the main system 310 in the configuration of the mobile terminal may be detached therefrom to be used (operated) independently.

For example, only the display unit may be used separately (second type) from the remaining components of the configuration, or the display unit and the FOB module may be integrally formed but used separately from the remaining components of the configuration (third type), or the FOB module may be selectively combined with the display unit or the main system to be used (fourth type).

In other words, according to an embodiment of the present disclosure, the display unit may be used alone, or the display unit and the FOB module may be formed into one module and used separately from the main system 310, or all the display unit, the FOB module and the main system 310 may be individually separated and used.

Even when at least one of the display unit 370, the FOB module 380 and the main system 310 is used separately, a communication unit (for example, the wireless communication unit 110 in FIG. 1A) may be provided in each configuration to perform communication.

Meanwhile, the watch type mobile terminal 200 according to an embodiment of the present disclosure may be used in conjunction with another mobile terminal, for example, a smart phone.

For example, the mobile communication terminal and the vehicle perform wireless communication using an LF (low frequency) and a radio frequency (RF) communication method over a mobile communication network, and the watch type mobile terminal 200 and another mobile terminal perform wireless communication using a Bluetooth communication method. Here, the another mobile terminal may be a smart phone in which a dedicated application associated with various functional operation units of the vehicle is installed in the internal system to operate the dedicated application. Here, the smartphone refers to a mobile terminal described with reference to FIGS. 1A through 1C, and the mobile terminal may include any wireless communication device capable of performing wireless communication via a mobile communication network, Bluetooth communication or the like, such as a mobile phone, a notebook computer, a digital broadcasting terminal, a PDA (Personal Digital Assistants), a PMP (Portable Multimedia Player), a tablet PC, and the like. Hereinafter, for convenience of explanation, another mobile terminal will be described as a "smart phone" or a "preset external terminal".

At this time, the FOB module 380 may include any device capable of performing wireless communication with a smart key control unit provided in a vehicle regardless of the type of a FOB key or a card type key, as described above to apply a predetermined electrical signal.

Hereinafter, usage examples of the first to fourth types related to the watch type mobile terminal of the present disclosure will be described.

The first to fourth types are distinguished by selective coupling of the detachable FOB module 380. In other words, the FOB module 380 may be used in combination with the display unit 370 and the main system 310. For this purpose, connector are formed on upper and lower portions of the FOB module 380, and a connection terminal electrically connected to the FOB module is formed on the main system 310.

The first type may be, for an example, a case where the FOB module is mounted on a band. When used as the first type, it operates like a typical smart watch and is identical to the smartwatch in appearance.

The second type may be a case where only the display unit 370 is detached to mount the display unit 380 on a preset external terminal, but the FOB module 380 and the main system 310 are attached to each other to be connected to the band. In the case of the second type, the display unit 370 may be disposed (coupled, attached) on a rear surface of a preset external terminal to provide a display unit, which is different from a front display unit provided on a front surface of the terminal body, on a rear surface of the terminal body. Hereinafter, the display unit provided in the preset external terminal will be referred to as a first display unit, and the display unit 380 provided in the watch type mobile terminal 200 will be referred to as a second display unit.

Since the second display unit provided on a rear surface of the mobile communication terminal is small in size, information on the user or the automobile may be displayed in brief without displaying a large amount of information. At this time, the second display unit may input information by a touch operation as in the first display unit.

At this time, in the case of the second type, the FOB module 380 coupled to the band may be used without a display, and brief information may be displayed by an output unit other than the second display unit. Even at this time, since the FOB module 380 is coupled to the band, it performs the same function as an activity tracker. For example, the watch type mobile terminal 200 from which the display unit is detached may be used merely as a pedometer or a health care function using a heart rate sensor or the like may be carried out. However, since the FOB module 380 is coupled to the band, it is possible to control the external device (vehicle).

Meanwhile, the third type is a case where the second display unit 370 is attached to the FOB module 380, and the FOB module 380 and the main system 310 are used separately. For an example, the FOB module 380 and the display unit 370 detached from the main system 310 may be mounted and used on a rear surface of a preset external terminal. At this time, since the FOB module 380 in addition to the second display unit 520 are coupled (connected, attached) together to a preset external terminal, an external device (vehicle) may be controlled through the preset external terminal. In addition, a series of information and a user interface for controlling the external device (vehicle) may be displayed on the second display unit 370.

At this time, the main system may be connected to the band, and the FOB module 380 may perform control on the external device (vehicle) even when detached. For an example, the control function of the external device (vehicle) provided in the FOB module 380 may be provided in the main system 310 as well. Accordingly, even when the FOB module 380 is detached from the main system 310, the user may perform control on the external device (vehicle) using the main system 310.

Here, the present disclosure may set different control authorities to the FOB module 380 and the main system 310. For an example, first control authority for performing only a predetermined function provided in the external device may be set in the FOB module 380, and a second control authority, which is higher than the first control authority, capable of performing all the functions provided in the external device may be set in the main system 310.

On the other hand, when control authority function for the external device is set only in the FOB module 380, the main system 310 coupled to the band may perform only a predetermined function such as an activity tracker.

The fourth type may be a type in which the display unit 370, the FOB module 380, and the main system 310 are all detachable, but individually usable. Accordingly, the FOB module 380 may be used in combination with the main system 310, or may be used in combination with the display unit 370, or may be used independently.

The fourth type may be a case in which the mounting position of the FOB module 380 is switchable selectively, and may be a case similar to the second type described above when the FOB module is used in combination with the main system, or may be similar to a case of the third type described above when the FOB module is used in combination with the second display unit.

The display unit 370 and the FOB module 380 are each provided with a battery and a predetermined processor (not shown) such that at least one of the display unit 370 and the FOB module 380 can be used separately according to the second through fourth types.

Furthermore, the display unit 370, the POD module 380, and the main system 310 may include the wireless communication unit 110 for each component to communicate with each other.

Hereinafter, as illustrated in (c) of FIG. 3C, a case where the main body 300 of the watch type mobile terminal 200 associated with the present disclosure is used as a third type that is divided into a first body 510 and a second body 520, will be described as an example.

The first body 510 may include the main frame 390, the power supply unit 360, and the main system 310.

In addition, the second body 520 may include the FOB module 380 and the display unit 370 (or display module).

At least one of the FOB module 380 and the display unit 370 of the second body 520 may be provided with a battery. Due to this, even when the second body 520 is detached from the first body 510, the second body 520 may be driven by the battery.

The controller 180 described with reference to FIG. 1A may be provided in the first body 510, for an example. For example, the controller 180 may be provided in the main system 210 to control the first body 510 and the second body 520.

At least one of the FOB module 380 and the display unit 370 included in the second body 520 may be provided with a processor. The processor may control the external device based on a signal (or user input) received through the FOB module 380 and the display module 370 or transmit predetermined information to the controller 311 or 180 provided in the first body.

Furthermore, the first body 510 and the second body 520 (the display unit 370 and the FOB module 380) may each include the wireless communication unit 110 described with reference to FIG. 1A. Accordingly, the first body 510 and the second body 520 may communicate with each other or communicate with an external device through at least one of the various communication methods described above.

In addition, each of the first body 510 and the second body 520 (the display unit 370 and the FOB module 380) may include the sensing unit 140 described with reference to FIG. 1A. Accordingly, even when the first body 510, the display unit 370, and the FOB module 380 are detached in any form, each of the detached components may independently sense information that is sensible through a sensor using the relevant sensor included in the sensing unit 140.

As described above, the watch type mobile terminal 200 associated with the present disclosure may include a band 502 configured to be worn on a user's wrist so as to wrap the wrist. The band 502 may be the band 202 described above with reference to FIG. 2.

The band 502 may be connected to the main frame 390 provided in the first body 510. In other words, the first body 510 may be formed to be connected to the band 502.

The first body 510 may include the main system 310, the power supply unit 360, and main frame 390, as illustrated in (c) of FIG. 3C. The main system 310 may include at least one of the components described with reference to FIG. 1A.

In addition, the watch type mobile terminal 200 associated with the present disclosure may include the second body 520 formed to be detachably attached to the first body.

The second body 520 may be provided with the FOB module 380 and the display unit 370, as illustrated in (c) of FIG. 3C.

The second body 520 may be separated from or connected to the first body 510 by the user. Here, connecting the first body 510 to the second body 520 may include physically connecting the first and second main bodies 510, 520 to each other, and electrically connecting the main system 310 of the first body 510 and the FOB module 380 of the second body 520 to each other through a connector.

Hereinafter, for convenience of explanation, it will be described that the FOB module 380 and the display unit 370 are included in the second body 520, and described that the processor 382 of the second body 520 is provided in the FOB module 380.

However, the present disclosure is not limited thereto, and the description of the first body and the second body will be analogically applicable to a case where the FOB module 380 and the main system 310 are included in the first body and the second body is the display unit 370 in the same or similar manner. In the case where the second body includes only the display unit 370, the processor described below may be provided in the display unit 370.

The controller 311 (hereinafter, described with reference numeral 180 described with reference to FIG. 1A) of the first body 510 may sense whether the second body 520 is detached therefrom or attached thereto.

Furthermore, the processor 382 provided in the second body 520 may sense whether the second body 520 is detached from or attached to the first body 510.

When the detached second body 520 is attached to an external device, the processor 382 may perform different functions based on the type of the attached external device.

Here, the external device may include all types of devices (or objects) formed to attach (connect) the second body 520 thereto.

For example, when the external device is the first device (vehicle), the processor 382 may control the second body 520 to perform functions associated with the vehicle.

For example, the processor 382 may include an output function for allowing the second body 520 to output information associated with the vehicle, a sensing function for sensing information associated with the vehicle through the sensing unit provided in the second body 520, and a control function for allowing the second body 520 to control the vehicle.

For another example, the processor 382 may control the second body 520 to perform functions associated with the mobile terminal when the external device is a second device (a mobile terminal (or another unauthenticated terminal)).

For example, the processor 382 may include an output function for allowing the second body 520 to output information associated with the mobile terminal, a processing function for processing a job requested by the mobile terminal, a payment function, a user authentication function, and the like.

In addition, the processor 382 may classify the users according to the type of the attached mobile terminal, and may set control authority differently to control the vehicle differently from one another for each of the classified users.

For another example, when the second body 520 is detached and then attached to a simple band rather than an electronic device, the processor 382 may be controlled to perform only relatively simple functions such as a function of allowing the second body 520 to acquire biometric information of a body in contact with the second body 520, a sleep management function, a date/time/calendar output function, a pedometer function, and the like.

Moreover, when the external device is a device requiring additional control, the second body 520 may control the external device based on at least one of a user control command received through the display unit 370 or the FOB module 380 provided in the second body 520 and a control command received via the first body 510.

Meanwhile, the watch type mobile terminal associated with the present disclosure may also consider whether or not the second body 520 is detached from the first body 510, as well as whether or not the first body 510 is detached from the user's wrist to differently control the control authority of the second body 520.

Hereinafter, various embodiments of the watch type mobile terminal associated with the present disclosure will be described in detail with reference to the accompanying drawings.

Figure 4:
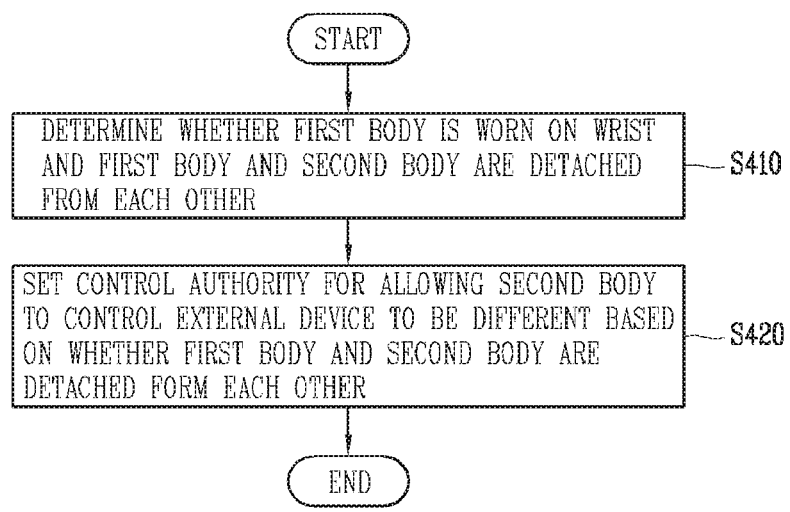
FIG. 4 is a flowchart for explaining a control method according to an embodiment of the present disclosure.
Figure 5A:
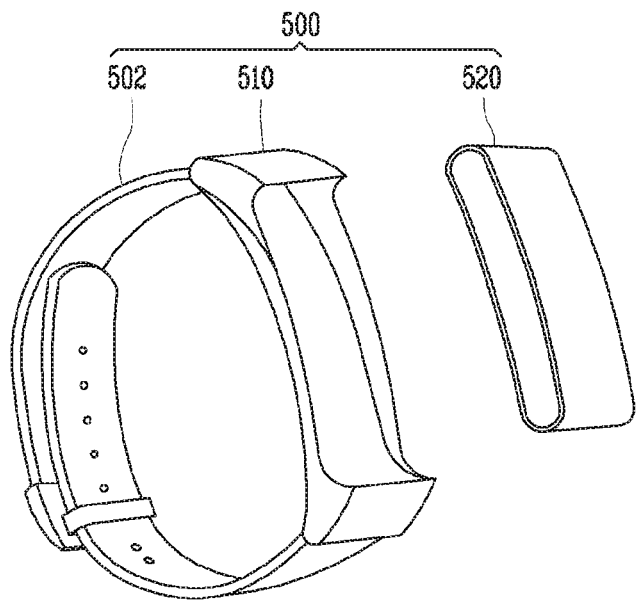
FIGS. 5A and 5B are conceptual views for explaining the control method illustrated in FIG. 4.
Figure 5B:
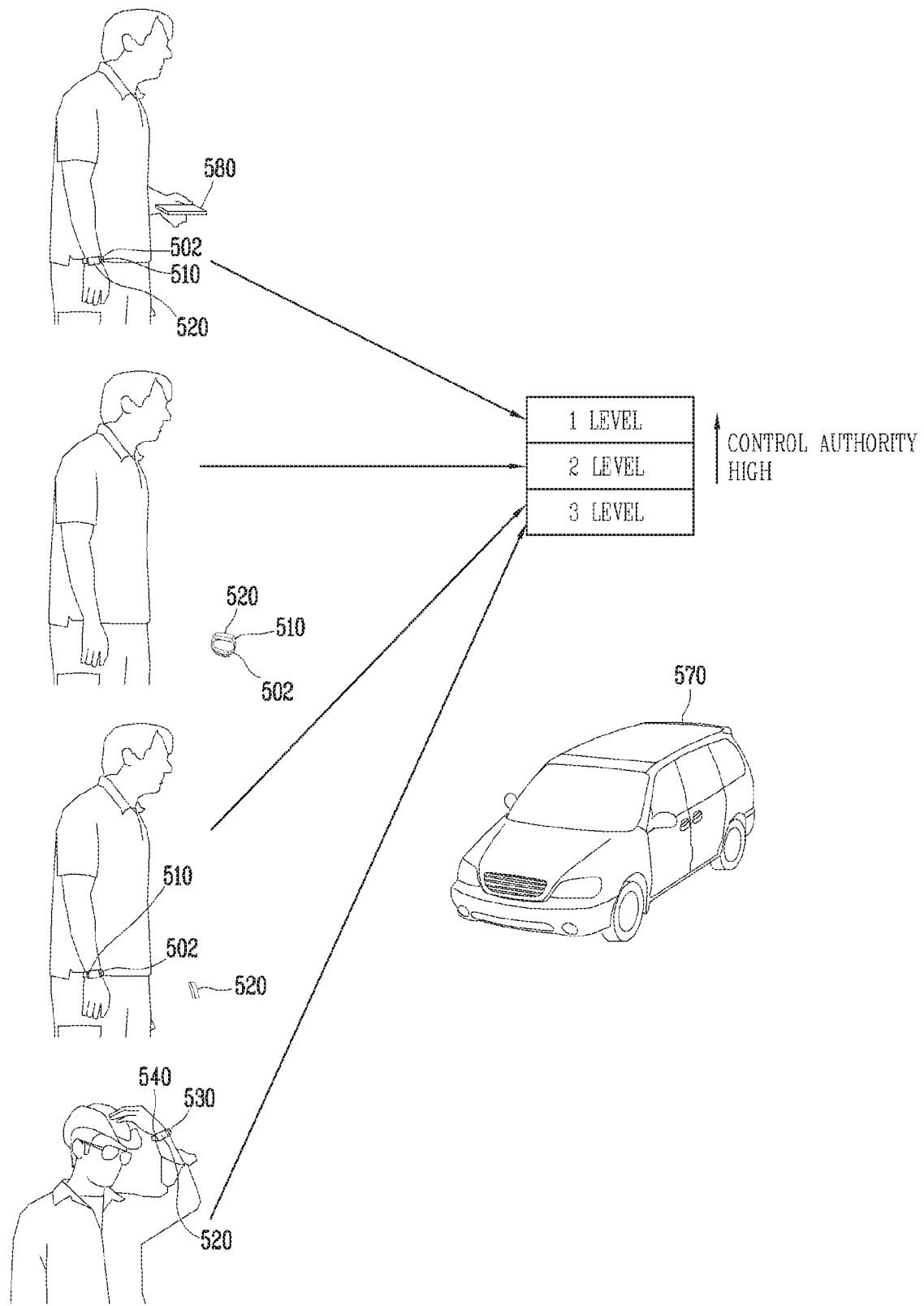

FIG. 4 is a flowchart for explaining a representative control method of the present disclosure, and FIGS. 5A and 5B are conceptual views for explaining the control method illustrated in FIG. 4.

First, as illustrated in FIG. 5A, reference numeral 500 of the watch type mobile terminal 200 associated with the present disclosure will be described.

The watch type mobile terminal 500 associated with the present disclosure may include at least one of the components described with reference to FIGS. 1A through 3C.

The watch type mobile terminal 500 may include the band 502 configured to be worn on a user's wrist to wrap the wrist, the first body 510 connected to the band 502, and the second body 520 formed to be detachable from the first body.

The first body 510 may be worn on or detached from the wrist by a fastener 202a (a buckle, a snap-fittable hook structure or Velcro: trademark) or the like provided in the band 502.

The first body 510 and the second body 520 may be formed in a physically and electrically detachable (connectable or separable) manner. The manner in which the first body 510 and the second body 520 are physically connected (attached, coupled) to each other may vary.

Furthermore, the first body 510 and the second body 520 may be electrically connected to each other based on a connector provided in the main system 310 of the first body 510 and a connector provided in the FOB module 380 of the second body 520 being in contact with each other.

The first body 510 and the second body 520 being electrically connected to each other may transmit and receive data therebetween.

First, referring to FIG. 4, according to the present disclosure, the process of determining whether the first body 510 is worn on the wrist by the band 502 and whether the first body 510 and the second body 520 are detached from each other is carried out (S410).

The controller 180 of the first body 510 may determine (sense, decide, detect, extract) that the first body 510 and the second body 520 are detached from each other when the electrical connection is broken.

The first body 510 may include the sensing unit 140 described with reference to FIG. 1A. The controller 180 of the first body 510 may determine that the first body 510 and the second body 520 are detached from each other using various sensors included in the sensing unit 140.

The controller 180 may determine (sense, decide, detect, extract) whether the first body 510 is worn on or detached from (not worn on) the user's wrist through the sensing unit 140.

For an example, when the sensing unit 140 is in contact with a body (e.g., a wrist) or a distance between the sensing unit 140 and the body is within a predetermined distance, the controller 180 may determine that the first body 510 is worn on the wrist.

For another example, when the sensing unit 140 is not in contact with the body or is out of a predetermined distance from the body, the controller 180 may determine that the first body 510 is not attached to (or detached from) the wrist.

Then, according to the present disclosure, the process of setting control authority for allowing the second body to control the external device to be different from each other based on whether or not the first body is worn on the wrist by the band and whether or not the first body and the second body are detached from each other is carried out (S420).

The controller 180 may set control authority for allowing the second body to control the external device to be different from each other in consideration of whether the first body 510 is worn on the wrist and whether the first body 510 and the second body 520 are connected to each other.

Specifically, when the first body 510 is worn on the wrist and the first body 510 and the second body 520 are connected to each other (first case), when the first body 510 is detached from (not worn on) the wrist while the first body 510 and the second body 520 are connected to each other (second case), and when the second body 520 is detached from the first body 510 while the first body 510 is worn on the wrist (third case), different control authorities may be set in the second body 520.

For example, referring to FIG. 5B, the controller 180 may set control authority for allowing the second body to control the external device to first control authority (Level 1) when the first body 510 is worn on the wrist by the band 502 and the first body 510 and the second body 520 are connected to each other (first case).

Furthermore, the controller 180 may set the control authority to second control authority (Level 2) different from the first control authority when the first body 510 and the second body 520 are connected to each other but the first body 510 is not worn on the wrist (second case).

In addition, the controller 180 may set the control authority to third control authority (Level 2) different from the first and second control authorities when the first body 510 and the second body 520 are detached from each other (third case).

Here, the third control authority (Level 3) may be control authority lower than the first and second control authorities, and the second control authority (Level 2) may be control authority lower than the first control authority (Level 1). In other words, Level 1 is the highest control authority and may be sequentially set to lower control authority.

On the other hand, the controller 180 may maintain the control authority for controlling the external device at Level 3 when the second body 520 detached from the first body 510 is coupled to the third main body 540 other than the first body (fourth case).

Here, the third main body 540 may dente the first body 510 worn by another person (or an unauthorized user) while being coupled to the second body 520.

In the above, it is described that the first control authority is set in the first case, the second control authority is set in the second case, the third control authority is set in the third case, and the third control authority is maintained in the fourth case, but the present disclosure is not limited thereto.

For example, as shown in an example where the third control authority is set in the second body 520 in the second case, and the second control authority is set in the second body 520 in the third case, according to the present disclosure, it is possible to set various control authorities based on whether or not the first body 510 is worn on the wrist and whether or not the second body 520 is connected to the first body 510.

Furthermore, according to the present disclosure, even though the detached second body 520 is connected to the third main body 540, when the authentication of a user wearing the third main body 540 is carried out, it is possible to have various applications such as changing the third control authority to another control authority (e.g., second control authority).

The external device described above, that is, the external device that can be controlled by the second body 520, may be, for an example, a vehicle 570.

For example, first control authority set (assigned) in the second body 520 may be control authority capable of controlling all the functions of the vehicle 570.

For another example, second control authority set (assigned) in the second body 520 may be control authority for limiting a predetermined function or a predetermined operation of the vehicle. For an example, when the second control authority is set in the second body 520, the vehicle 570 may be restricted from opening a specific box of the vehicle, some of the functions of vehicle navigation may be restricted, or a driving speed, a driving range, and the like of the vehicle may be restricted.

For another example, the third control authority set (assigned) in the second body 520 may be control authority for restricting more functions/operations than the second control authority.

The function/operation to be restricted for each control authority may be determined by user setting.

On the other hand, the controller 180 may set the first control authority in the second body 520 when the user of a wrist wearing the first body 510 by the band 502 is an authenticated user. In other words, the controller 180 may set the control authority of the second body 520 for controlling the external device to be different from each other based on whether or not the user of the wrist wearing the first body 510 by the band 502 is an authenticated user.

For example, when the first body 510 is worn on the wrist by the band 502 and the second body 520 is connected to the first body 510 (first case), the first control authority may be set (assigned) in the second body 520 only when the user wearing the first body 510 is an authenticated user.

If the user wearing the first body 510 is an unauthenticated user, the controller 180 may set the second body 520 to have control authority (e.g., second, or third control authority) different from the first control authority.

The controller 180 may determine whether or not the user wearing the first body 510 by the band 502 is an authenticated user based on the satisfaction of a predetermined condition.

For example, at least one of the first body 510 and the second body 520 may be provided with a biosensor.

The controller 180 may determine whether or not the user wearing the first body 510 is an authenticated user using the biosensor.

Here, the authenticated user may denote an owner of the watch type mobile terminal 500, for an example, and may also include a person who has been preset (registered) to use of the watch-type mobile terminal 500 by the owner.

At least one of the first body 510 and the second body 520 may be provided with a memory, and biometric information for each user may be prestored in the memory.

The controller 180 may acquire biometric information of the user wearing the first body 510 using the biosensor, and perform user authentication using the acquired biometric information and the prestored biometric information.

For an example, when the acquired biometric information matches the prestored biometric information, the controller 180 may determine that the user wearing the first body 510 is an authenticated user.

For another example, when the user authentication is successful in a preset external terminal (or previously authenticated external terminal) while the first body 510 is worn, the controller 180 may determine that the user wearing the first body 510 is an authenticated user.

Here, as illustrated in FIG. 5B, the preset external terminal 580 (or previously authenticated external terminal) may be a mobile terminal possessed by the owner of the watch type mobile terminal 500, a mobile terminal connected to communicate with the watch-type mobile terminal 500, or a mobile terminal authenticated to communicate with a watch type mobile terminal 500, or the like.

The preset external terminal 580 may be implemented in a shape described with reference to FIG. 1B, for an example, and may perform user authentication (e.g., fingerprint recognition, iris recognition, etc.) using a fingerprint recognition sensor or a camera.

When the user authentication is successful while the first body 510 is worn, the controller 180 may determine the user wearing the first body as an authenticated user.

Furthermore, the controller 180 may determine whether or not the user wearing the first body 510 is an authenticated user based on a distance between the preset external terminal 580 and the first body 510.

The controller 180 may determine that the user wearing the first body is an authenticated user when a distance between the first body and the preset external terminal 580 is within a predetermined distance.

For an example, the predetermined distance may be a distance at which the first body 510 and the preset external terminal 580 can communicate with each other. However, the present disclosure is not limited thereto, and the predetermined distance may be a distance set by the user or may vary.

For example, when the preset external terminal 580 is present within a communicable distance with the first body 510, the controller 180 may determine that the user wearing the first body 510 is an authenticated user.

On the other hand, when a distance between the first body 510 and the preset external terminal 580 is within the predetermined distance (e.g., communicable distance) even though the first body 510 is not worn, the controller 180 may determine that the user possessing the first body 510 is an authenticated user.

When the user wearing the first body 510 is an authenticated user while the first body 510 and the second body 520 are coupled to each other, control authority for allowing the second body 520 to control the external device may be set as first control authority.

Hereinafter, various embodiments for controlling the external device when first control authority is set in the second body 520 will be described in detail with reference to the accompanying drawings.

FIGS. 6A, 6B, 6C, 6D, 6E and 6F are conceptual views for explaining a method of controlling an external device when first control authority is set in a second body of the present disclosure.

The external device described herein may be a vehicle 570, for an example. The vehicle 570 may be provided with a vehicle control unit to control components constituting the vehicle.

Furthermore, the FOB module 380 (or the display unit 370 or the main system 310 provided in the first body 510) provided in the second body 520 may perform communication with the vehicle control unit through the wireless communication unit 110.

The wireless communication unit 110 described with reference to FIG. 1A is provided in each of the FOB module 380 provided in the second body 520, the display unit 370, and the main system 310 provided in the first body 510.

When the FOB module 380, the display unit 370, and the main system 310 are all detached, each component may independently control an external device (vehicle).

The controller 180 may set control authority for controlling the vehicle to the watch body type mobile terminal 500 in the second body 520 (or the first body 510) as first control authority.

The first control authority may be set in the second body 520 (or the first body 510) when the first body 510 is worn on a wrist by the band 502, and the first body 510 and the second body 520 are connected to each other (first case), or when the user wearing the first body 510 is an authenticated user in the state of the first case.

As described above, the first control authority may be first control authority set so as to be able to perform all the functions of the vehicle.

Figure 6A:
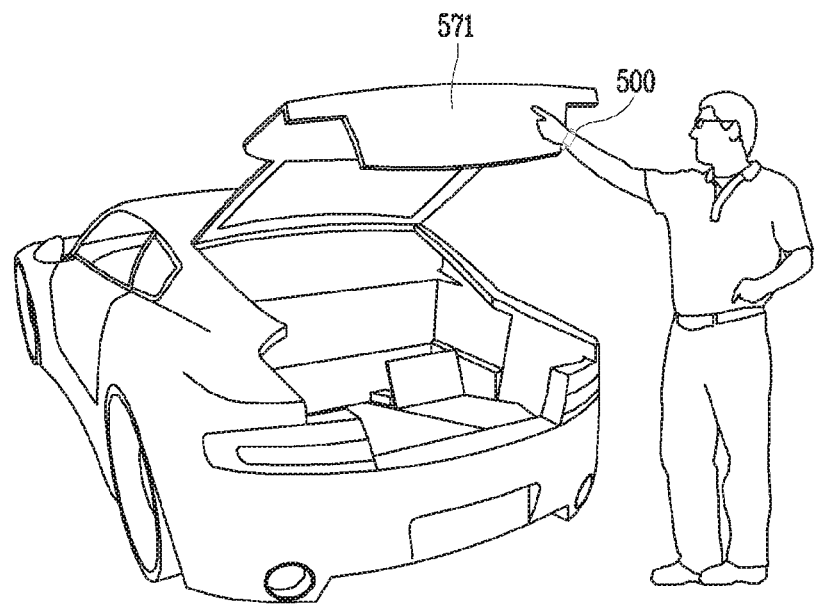

When the first control authority is set, as illustrated in FIG. 6A, the trunk 571 of the vehicle may be open.

For an example, the trunk 571 of the vehicle may be open when the second body 520 enters the trunk 571 of the vehicle within a predetermined distance, or a control command for opening the trunk is received through the display unit 370 (or button) provided in the second body 520, or a specific gesture is applied to a lower end of the trunk of the vehicle in a state where the second body 520 is adjacent to the trunk 571 of the vehicle, or a button for opening the trunk provided in the vehicle is pressed.

The second body 520 (or the first body 510) set with the first control authority may transmit information allowing the opening of the vehicle trunk through the wireless communication unit to the vehicle control unit. The vehicle control unit may open the trunk 571 of the vehicle when a control command for opening the trunk is received while the information is received.

The control command for opening the trunk may denote a distance between the trunk 571 of the vehicle and the second body 520 (or the first body 510), a user input received through the second body 520, a user input applied to the vehicle, a specific gesture applied to the trunk (or in the vicinity of the trunk), a user input to applied to a button provided in the trunk, and the like.

For an example, the trunk 571 of the vehicle may be open when the second body 520 enters the trunk 571 of the vehicle within a predetermined distance, or a control command for opening the trunk is received through the display unit 370 (or button) provided in the second body 520, or a specific gesture is applied to a lower end of the trunk of the vehicle in a state where the second body 520 is adjacent to the trunk 571 of the vehicle, or a button for opening the trunk provided in the vehicle is pressed.

Figure 6B:
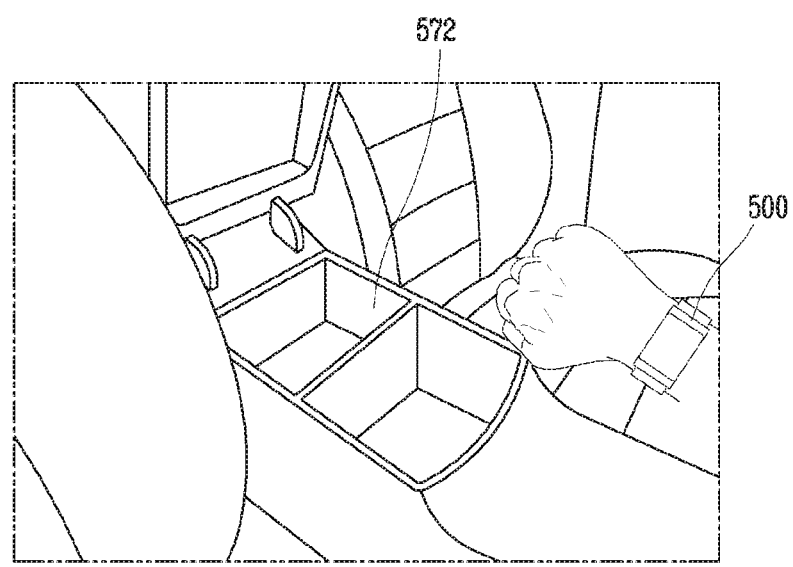
Figure 6C:
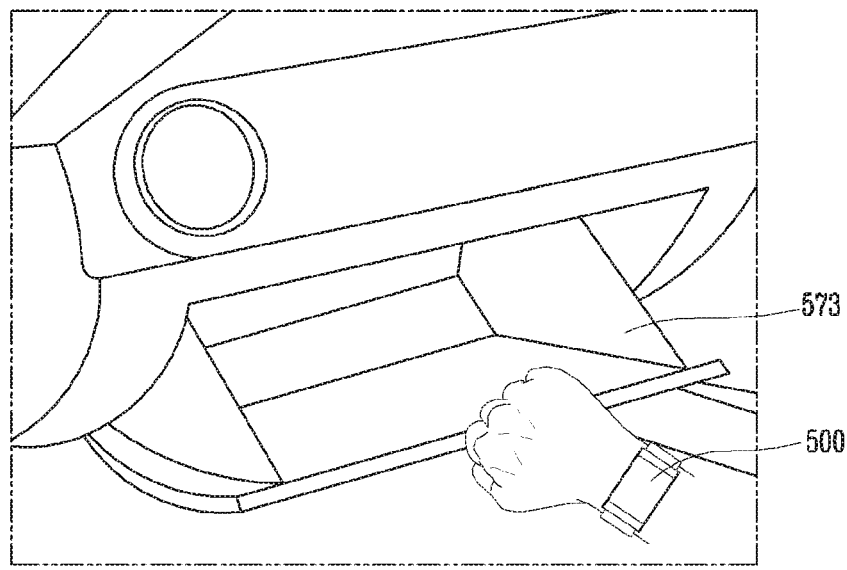
Figure 6D:
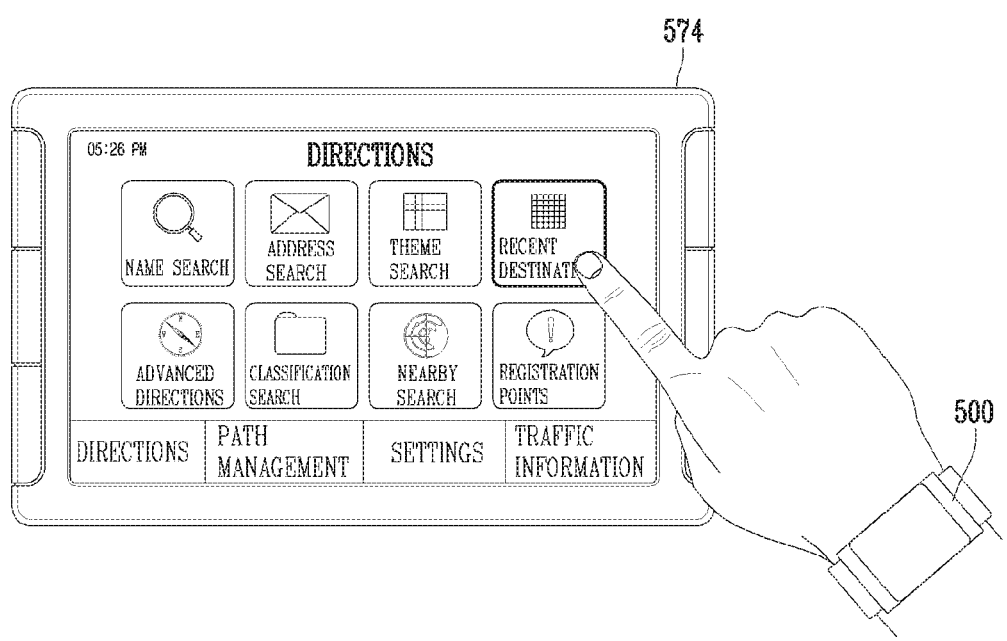

For another example, when the first control authority is set, a specific box of the vehicle (for example, a console box 572 and a glove box 573) may be open, as illustrated in FIGS. 6B and 6C.

The second body 520 (or the first body 510) set with first control authority may transmit information allowing the opening of the specific box of the vehicle to the vehicle control unit through the wireless communication unit. The vehicle control unit may open the specific box when a control command for opening the specific box is received while the information is received.

For an example, the specific box 572, 573 may be open based on whether the watch type mobile terminal 500 (the second body 520 or the first body 510) having the first control authority is present in the vehicle or enters within a predetermined distance from the specific box.

Furthermore, the specific box 572, 573 may be open based on whether an opening button provided in the specific box is operated while the watch type mobile terminal 500 having the first control authority is present within the vehicle or within a predetermined distance from the specific box.

For another example, when first control authority is set in the second body 520 (or the first body 510), navigation provided in the vehicle may display all the information such as latest destination information, favorites, history, and the like.

On the other hand, when second control authority other than the first control authority is set in the second body 520 (for example, the second control authority is lower than the first control authority), the execution of at least one of functions described in FIGS. 6A through 6D may be restricted.

Furthermore, when third control authority other than the second control authority is set in the second body 520 (for example, the third control authority is lower than the second control authority), the execution of more functions than a case where the second control authority is set may be restricted.

On the other hand, the external device is not limited to the vehicle.

For example, as illustrated in FIG. 6E, the external device may be a preset opening/closing device 610 (for example, a front door lock device).

As illustrated in (a) in FIG. 6E, when the first body 510 and the second body 520 are attached to each other and the first body 510 is worn on the wrist (or, when the user of the wrist is an authenticated user while the first and second main bodies 510, 520 are attached to each other and the first body 510 is worn on the wrist), the first control authority may be set in the second body 520. In this state, when the second body 520 enters within a predetermined distance from the preset opening/closing device or is tapped on the preset opening/closing device, the locked state of the preset opening/closing device 610 may be released.

On the other hand, as illustrated in (b) through (d) of FIG. 6E, when first control authority is not set, but control authority other than the first control authority is set in the second body 520 (or the first body 510), the locked state of the preset opening/closing device 610 may be maintained. In this case, the preset opening/closing device 610 may be opened only when an additional open command is received.

On the other hand, as illustrated in FIG. 6F, there may exist a case where the vehicle 570 passes through a region 620 requiring payment (e.g., toll gate, high-pass region, etc.) while the second body 520 set with first control authority is present in the vehicle 570 (a case where the owner (authenticated user) is wearing the first body and the first and second main bodies are connected to each other). In this case, the controller 180 may not transmit payment information 630 paid by a payment element provided in the vehicle 570 to the preset external terminal 580.

On the contrary, there may exist a case where the vehicle 570 is driven by the second body 520 set with control authority other than the first control authority (e.g., second or third control authority) (for example, when an unauthenticated user is wearing the first body 510, or the second body 520 is attached to the third main body 540, or only the second body 520 is present in the vehicle 570), and the vehicle 570 passes through the region 620 requiring payment.

In this case, the controller 180 may transmit payment information 630 paid by the payment element provided in the vehicle 570 to the preset external terminal 580, as illustrated in FIG. 6F. In this case, the payment information 630 may be displayed on the preset external terminal 580.

As described above, the present disclosure may provide a new user interface capable of controlling the external device (vehicle) in various ways according to control authority set in the second body (or first body).

Meanwhile, the present disclosure may perform various functions according to the state of the user holding the second body while first control authority is set in the second body.

Figure 7C:
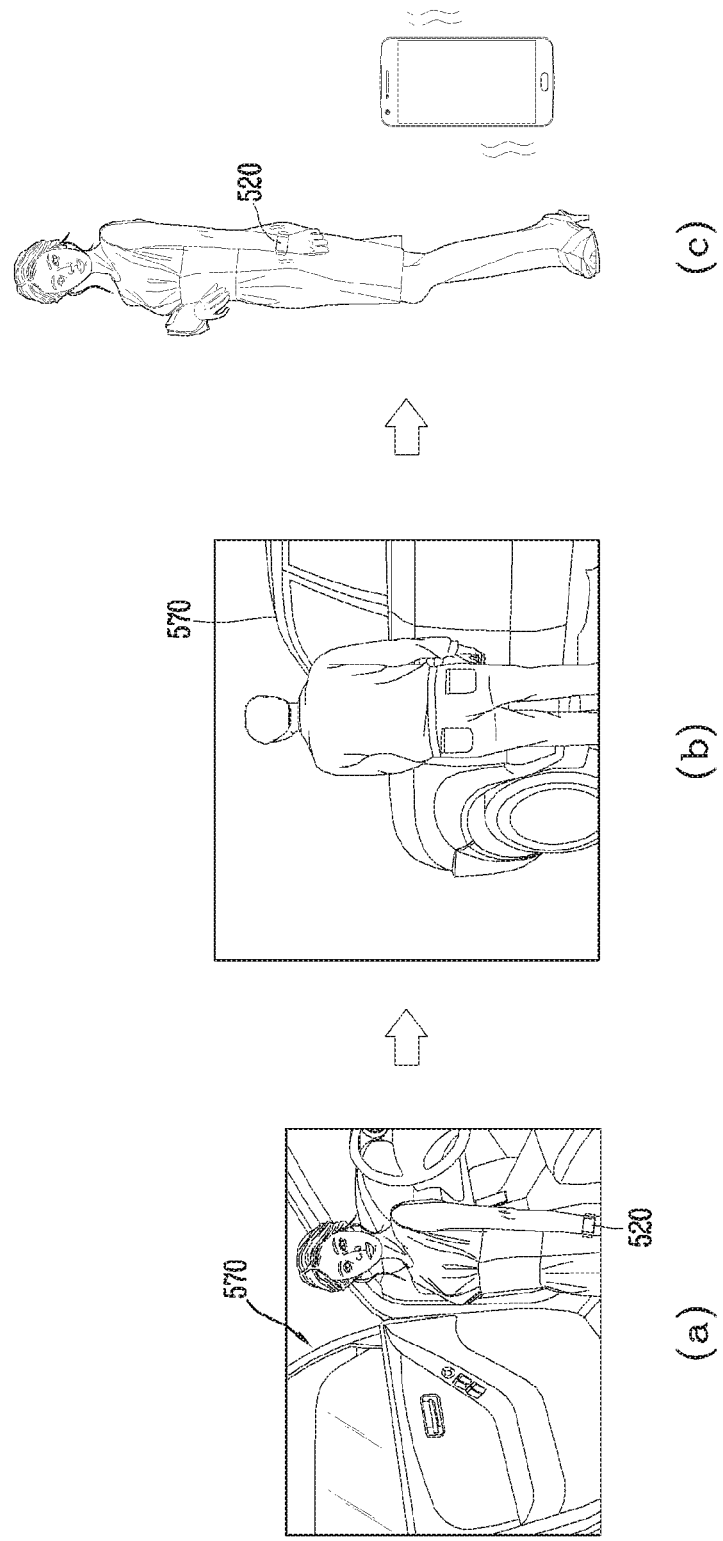

FIGS. 7A, 7B, and 7C are conceptual views for explaining a function being carried out according to a user's action in a state that first control authority is set in a watch type mobile terminal according to an embodiment of the present disclosure.

When the first body and the second body are worn by an authenticated user while being connected to each other, and the mobile terminal 500 is present in the external device, the controller may perform different functions depending on whether or not the authenticated user is driving the vehicle.

Specifically, when the first body and the second body are worn by an authenticated user while being connected to each other, the controller 180 may set first control authority in the watch type mobile terminal 500 (the second body 520 or the first body 510).

In this state, when the watch type mobile terminal 500 is present in the external device, the authenticated user (or a general user wearing a watch type mobile terminal set with first control authority) may perform different functions depending on whether or not he or she is driving the vehicle.

For example, when the authenticated user operates the vehicle, the controller 180 may execute a first function in response to the generated event.

For another example, the controller 180 may execute a second function different from the first function in response to the generated event when the authenticated user does not operate the vehicle.

The controller 180 may sense whether or not the watch type mobile terminal 500 set with first control authority is present in the vehicle through the sensing unit 140 (or the wireless communication unit 110).

Furthermore, the controller 180 may sense the movement (or location) of the watch type mobile terminal 500 through the sensing unit 140, and determine whether the authenticated user is driving based on the sensing.

As illustrated in (a) of FIG. 7A, when an authenticated user does not operate the vehicle, an event (e.g., a call) is generated from the watch type mobile terminal (or the preset external terminal 580), the controller 180 may execute a first function (e.g., a general call function) in response to the event.

On the other hand, as illustrated in (b) of FIG. 7A, when an authenticated user operates the vehicle, an event (e.g., a call) is generated from the watch type mobile terminal (or the preset external terminal 580), the controller 180 may execute a second function (e.g., a speakerphone function) different from the first function in response to the event.

Meanwhile, the controller 180 may sense the state of the authenticated user through the sensing unit 140 provided in the first body 510 (or the second body 520), and when the sensed state of the user enters a preset state (for example, a drowsy state), the controller 180 may perform different functions depending on whether or not the authenticated user is driving.

For example, as illustrated in (a) of FIG. 7B, when the authenticated user enters a preset state (e.g., a drowsy state) while the user is driving, the controller 180 may perform a third function (e.g., a function of changing to a detour route or a specific music playback function) linked to be carried out when entering a preset state while driving.

For another example, as illustrated in (b) of FIG. 7B, when the authenticated user enters the preset state (e.g., drowsy state) while the authenticated user is not driving, the controller 180 may perform a fourth function (e.g., a function of measuring biometric information (pulse, biorhythm, brain wave), etc.) different from the third function.

As described above, the present disclosure may provide a watch type mobile terminal capable of performing various functions according to whether a user is driving while first control authority is set.

On the other hand, when the watch type mobile terminal moves away from the vehicle 570 by a predetermined distance or more while the vehicle 570 is started, the controller 180 may output notification information on an event generated from the vehicle 570.

As illustrated in (a) of FIG. 7C, the user wearing the watch type mobile terminal (second body 520) set with first control authority may get out of the vehicle 570 while being started due to a personal matter.

The controller 180 may sense a distance between the vehicle 570 and the watch type mobile terminal through the sensing unit 140 (or a communication intensity to the vehicle control unit).

As illustrated in (b) of 7C, the vehicle control unit may sense an event (e.g., a case where a car door is opened by another person other than the user or an impact is applied to the vehicle) generated from the vehicle 570 while the distance between the watch type mobile terminal and the vehicle is increased by a predetermined distance or more.

In this case, the vehicle control unit may transmit notification information associated with the generated event to the watch type mobile terminal 500 or the preset external terminal 580.

Accordingly, the notification information may be displayed on the watch type mobile terminal 500 or the preset external terminal 580, as illustrated in (c) of FIG. 7C. Accordingly, the user wearing the watch type mobile terminal 500 set with first control authority may quickly receive notification on an event generated from the vehicle when the user gets out of a predetermined distance from the vehicle.

In addition, when the notification information is output, the controller 180 may limit at least one of the functions of the vehicle (e.g., start-up, driving, door opening) based on a user input for limiting the function of the vehicle.

Hereinafter, with reference to the accompanying drawings, a method of controlling a vehicle when a first control authority or a second control authority (or a third control authority) different from the first control authority is set will be described in more detail.

FIGS. 8A, 8B, 9A, 9B, 9C, 9D and 9E are conceptual views for explaining a method of controlling a vehicle according to control authority set in a watch type mobile terminal associated with the present disclosure.

As illustrated in FIG. 8A, when the first body 510 and the second body 520 are worn on an authenticated user while being connected to each other, the controller 180 may set first control authority in the second body 520.

In this case, the second body 520 may perform all the functions of the vehicle 570. For example, when the second body 520 set with first control authority enters within a predetermined distance from the vehicle 570, the door of the vehicle 570 may be open.

Furthermore, when the vehicle is controlled by the second body 520 set with first control authority, all the functions of navigation 574 may be carried out, and the opening and closing of a specific box (e.g., glove box 573) of the vehicle may be carried out.

In addition, setting values such as a seat 810, a side mirror 840, and a room mirror 850 for each user (or authenticated user) holding the second body 520 (watch type mobile terminal) set with first control authority may be prestored in the vehicle 570.

Then, when the user holding the second body 520 set with the first control authority gets on the vehicle 570 (or opens the door of the vehicle 570, or starts the vehicle 570), or enters within a predetermined distance from the vehicle 570), at least one of the seat 810, the side mirror 840, and the room mirror 850 may be changed (set) to a previously stored setting value.

On the other hand, when the second body is detached from the first body or the first body is separated from the wrist, the second body set with first control authority may be set with control authority (for example, second or third control authority) different from the first control authority. The second control authority and the third control authority may be viewed as control authority different from the first control authority in terms of restricting the execution of a predetermined function of the vehicle.

Hereinafter, an embodiment in which third control authority is set will be described in more detail. The third control authority described below may also be analogically applicable to a case where the second control authority is set in the same/similar manner.

Figure 8B:
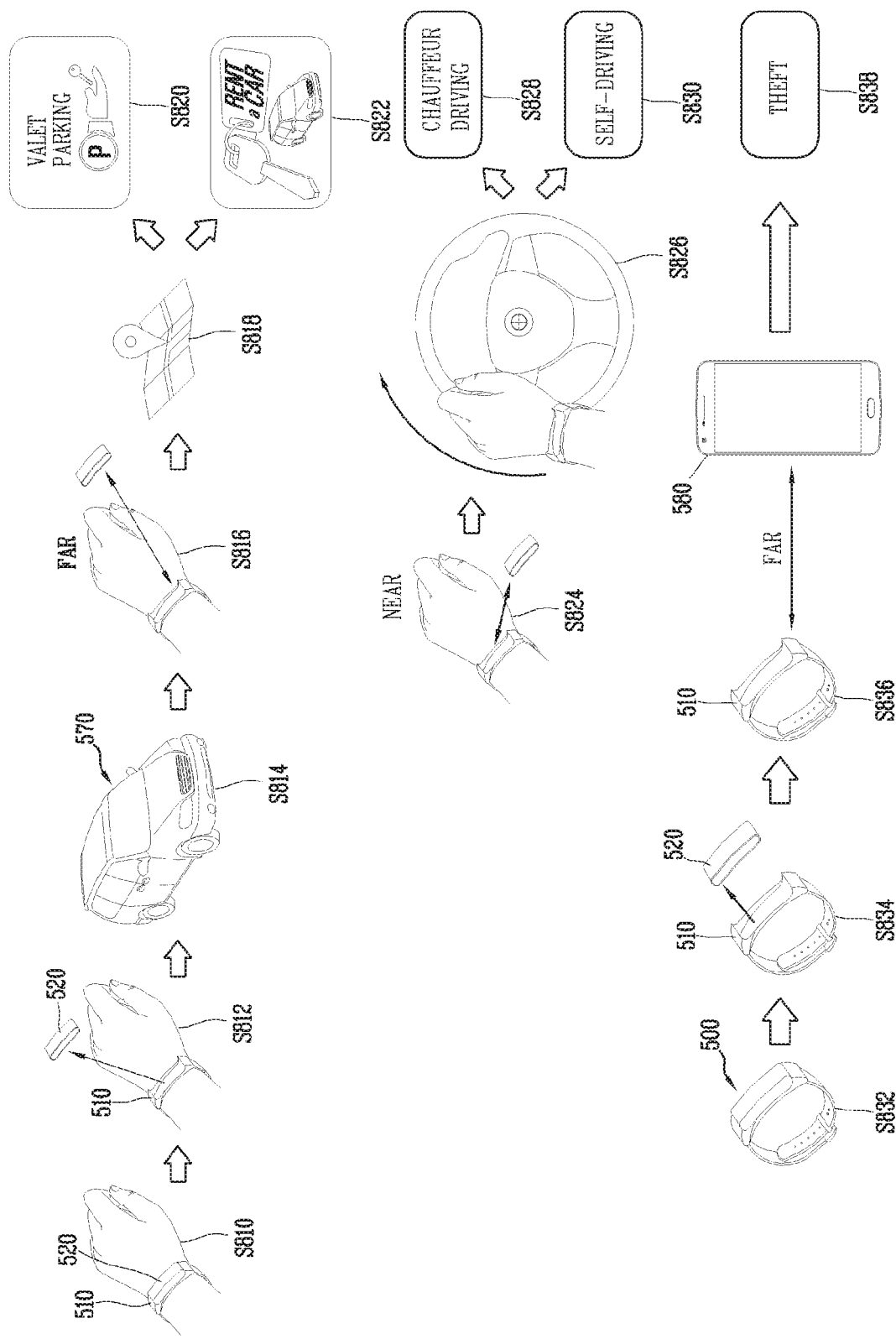

Referring to FIG. 8B, the first control authority may be set in the second body 520 based on whether the first body 510 is worn on the wrist of the user (or authenticated user) while the first body 510 and the second body 520 are connected to each other (S810).

In this state, when the second body 520 is detached from the first body 510, the controller 180 may change control authority allowing the second body 520 to control the vehicle 570 from the first control authority to the third control authority (or the second control authority) (S812, S814).

In this case, the controller 180 may determine the state of the vehicle based on a distance between the first body 510 and the second body 520 after the first body 510 and the second body 520 are detached from each other.

Here, the state of the vehicle may denote a driving form of the vehicle, a rental form of the vehicle, whether or not it is driven by another person, and the like.

For example, when the second body 520 is detached from the first body 510 and then the first body 510 is separated from the first body 510 by a predetermined distance or more, the controller 180 may track the location of the second body 520 (or the vehicle 570) (S816, S818).

The, the controller 180 may determine whether the vehicle controlled by the second body 520 set with the third control authority is in a valet parking state (a state parked by another person) (S820) or in a rental state (a state in which the vehicle is rented to another person for a predetermined period of time) (S822) based on the location of the second body 520.

For another example, the controller 180 may sense the movement of the first body 510 when a distance from the first body 510 is less than the predetermined distance after the second body 520 is detached from the first body 510 (S824, S826).

The controller 180 may determine whether the vehicle is in a chauffeur driving state (S828) or in a state where the user himself/herself wearing the first body 510 is driving (S830) based on the movement of the first body 510.

On the other hand, when a distance between the first body and the preset external terminal 580 is greater than a predetermined distance after the first body and the second body are connected and disconnected (S832, S834, S836), the controller 180 may determine that the watch type mobile terminal 500 (or the vehicle) associated with the present disclosure is stolen (S838).

Meanwhile, the first body 510 may be provided with a touch screen capable of displaying predetermined information. The touch screen may be switched from an inactive state to an active state when the second body 520 is detached from the first body 510 or when a touch is applied to the touch screen after the second body 520 is detached from the first body. The touch screen may be, for an example, the display unit (or the touch screen 151) described with reference to FIG. 1A.

When the first body 510 and the second body 520 are detached from each other, the controller 180 may display first screen information on at least one of a display provided in the first body and the preset external terminal.

Furthermore, the controller 180 may change the first screen information to second screen information corresponding to the determined state of the vehicle, based on the determined state of the vehicle.

For example, as illustrated in (a) of FIG. 9A, when the second body 520 is detached from the first body 510 in a state where the second body 520 is connected to the first body 510 while the first body 510 is worn on a wrist of a user (or an authenticated user), the controller 180 may display first screen information 801 on a touch screen provided in the first body 510 or a touch screen 551 of the preset external terminal 580.

The first screen information 801 may include a user interface that allows the user to directly set the control state of the vehicle.

Then, the controller 180 may determine the state of the vehicle based on a distance between the first body 510 and the second body 520 (or a distance between the first body 510 and the preset external terminal 580.

For example, when the distance between the first body 510 and the second body 520 is increased by a predetermined distance or more (S816) as illustrated in (b) of FIG. 9, the controller 180 may activate only the state of the vehicle to be generated when the distance between the first body 510 and the second body 520 is above a distance in the screen information 801. In other words, a graphic object capable of selecting the state of the vehicle when the distance between the first body 510 and the second body 520 is less than a predetermined distance among predetermined information (graphic object) included in the first screen information 801 may disappear or be changed to another object (802).

Then, when the final state of the vehicle is determined based on the location of the second body 520, the controller 180 may display the first screen information 801, 802 as second screen information (e.g., screen information 803 corresponding to a valet parking state) corresponding to the determined state of the vehicle.

The controller 180 may set control authority to restrict different functions for each of the S820, S822, S828, S830, and S838 (i.e., for each state of the vehicle) while third control authority (or second control authority) is set in the second body 520.

In other words, the controller 180 may limit predetermined functions of the vehicle based on the state of the vehicle.

Here, setting control authority to restrict different functions may denote that the types of available functions and available function setting values that can be carried out by the vehicle are different for each state (mode).

Hereinafter, an example of limiting a predetermined function of the vehicle according to the state of each vehicle will be described.

Figure 9B:
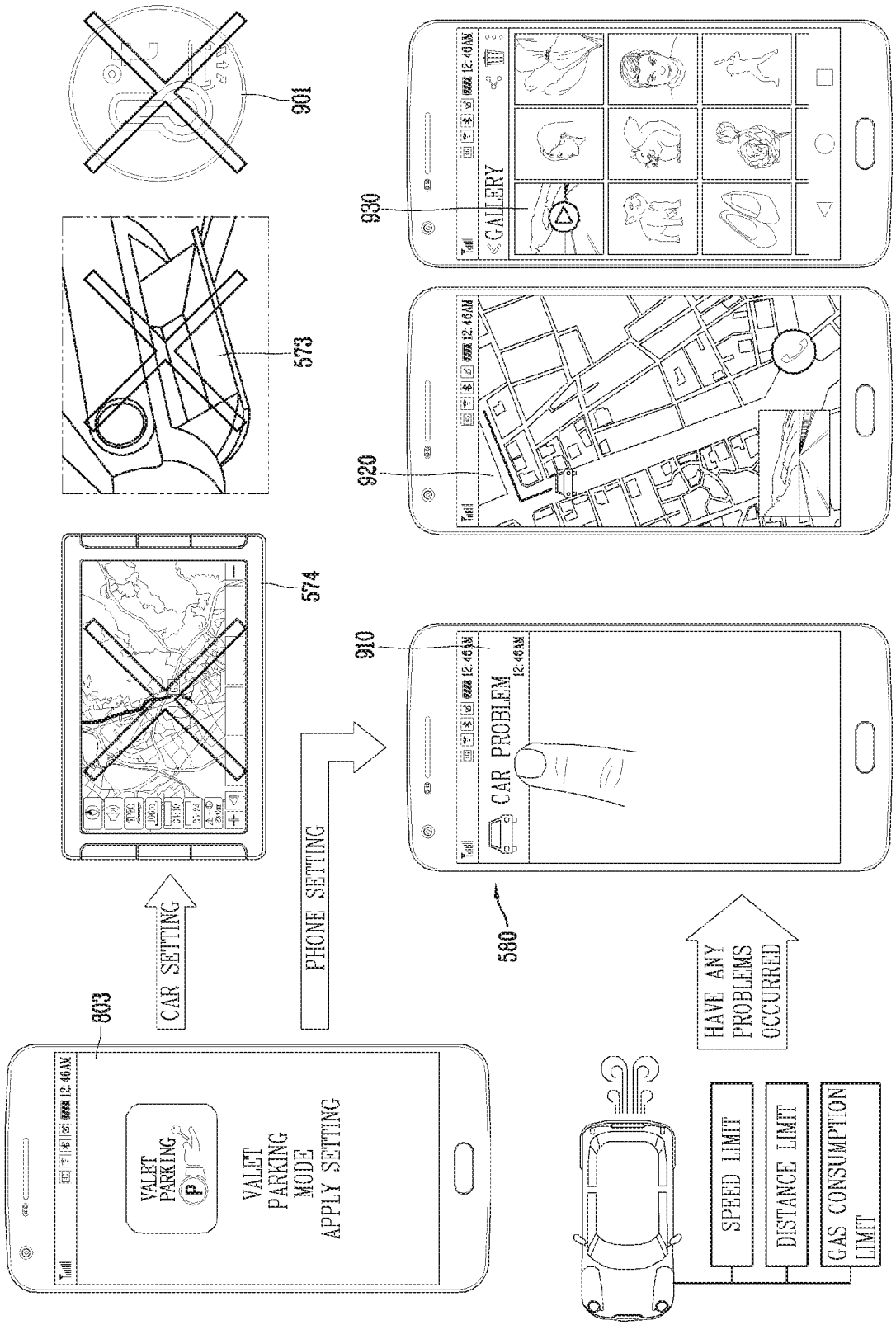
Figure 9D:
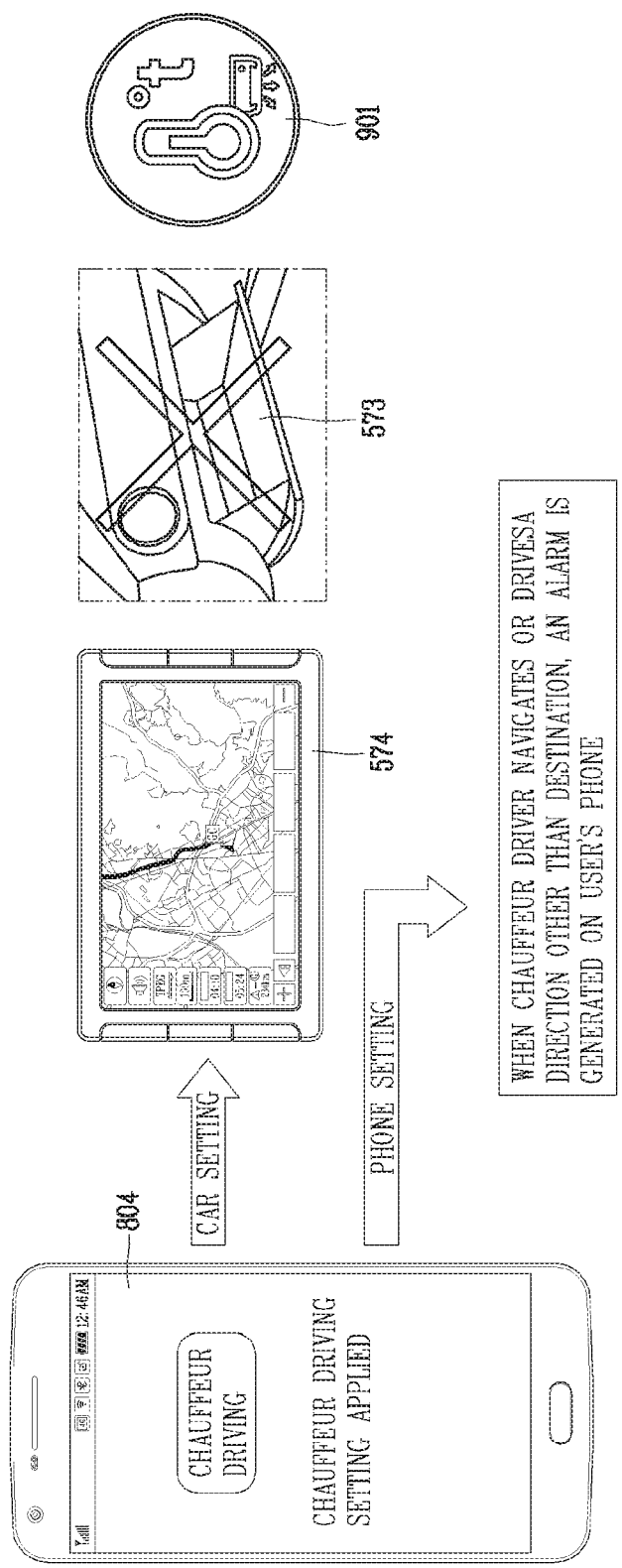

When the state of the vehicle controlled by the second body 520 is a first state (for example, a valet parking state 803) after the second body 520 is detached from the first body 510, as illustrated in FIG. 9B, third control authority (or second control authority) incapable of performing a navigation function 547, an opening function of the specific box 573, and an air conditioning/heating function of the vehicle may be set in the second body 520.

Accordingly, the function of the navigation 547 of the vehicle controlled by the second body 520 is not carried out, and the controller of the vehicle may restrict the opening of the specific box 573 and prevent the air conditioning/heating function from being executed.

In addition, the third control authority may be set to limit a speed of the vehicle, a travel distance of the vehicle, and fuel consumption consumed.

When information indicating that an operation exceeding the control authority is received from the external device (vehicle), the controller 180 may display screen information associated with the external device on at least one of a display provided in the first body and a preset external terminal.

For example, when an operation exceeding the limit set in the third control authority is carried out in the vehicle, the second body 520 (or the vehicle control unit) may transmit notification information 910 to the preset external terminal 580 (or the first body 510). As a result, the notification information 910 may be displayed on the preset external terminal 580 (or the first body 510).

Furthermore, when an operation exceeding the limit is carried out in the vehicle, the second body 520 (or the vehicle control unit) may transmit at least one of the location information 920 of the second body 520 (or the vehicle) and an image 930 photographed by the camera (or black box) provided in the vehicle to the preset external terminal 580 (or the first body 510). Accordingly, at least one of the location information 920 and the image 930 may be displayed on the preset external terminal 580 (or the first body 510).

On the other hand, when the state of the vehicle controlled by the second body 520 is in a second state (e.g., a rental state 804) after the second body 520 is detached from the first body 510, as illustrated in FIG. 9C, third control authority (or second control authority) capable of performing a navigation function 547, an opening function of the specific box 573, and an air conditioning/heating function of the vehicle may be set in the second body 520.

Accordingly, the function of the navigation 547 of the vehicle controlled by the second body 520, the opening function of the specific box 573 and the air conditioning/heating function controlled by the second body 520 may be executed by a user operation (or control through the second body 520).

In addition, the third control authority may be set to limit a speed of the vehicle, a travel distance of the vehicle, and fuel consumption consumed.

When an operation exceeding the limit set in the third control authority is carried out in the vehicle, the second body 520 (or the vehicle control unit) may transmit notification information 910 to the preset external terminal 580 (or the first body 510). As a result, the notification information 910 may be displayed on the preset external terminal 580 (or the first body 510).

Furthermore, when an operation exceeding the limit is carried out in the vehicle, the second body 520 (or the vehicle control unit) may transmit at least one of the location information 920 of the second body 520 (or the vehicle) and an image 930 captured by the camera (or black box) provided in the vehicle to the preset external terminal 580 (or the first body 510). Accordingly, at least one of the location information 920 and the image 930 may be displayed on the preset external terminal 580 (or the first body 510).

On the other hand, when the state of the vehicle controlled by the second body 520 is in a third state (e.g., a chauffeur driving state 805) after the second body 520 is detached from the first body 510, as illustrated in FIG. 9C, third control authority (or second control authority) capable of performing a navigation function 547 and an air conditioning/heating function of the vehicle, but restricting an opening function of the specific box 573 may be set in the second body 520.

Accordingly, the function of the navigation 547 and the air conditioning/heating of the vehicle controlled by the second body 520 may be executed by a user operation (or by control through the second body 520), but the opening function of the specific box 573 may not be carried out.

This is because, in the case of chauffeur driving, the navigation function and the air conditioning/heating function are set to be executable but the opening of the specific box is restricted because the user (or the owner) of the watch type mobile terminal is aboard the vehicle but not in driving.

On the other hand, when the state of the vehicle is the third state, the second body 520 (or the vehicle control unit) may sense that the destination is set to another place or is moving to a place other than a preset destination. In this case, the second body 520 (or the vehicle control section) may transmit notification information to the first body 510 (or the preset external terminal).

Accordingly, the notification information may be output to the first body 510 (or the preset external terminal).

On the other hand, when the state of the vehicle controlled by the second body 520 is a fifth state (e.g., a vehicle theft state) after the second body 520 is detached from the first body 510, as illustrated in FIG. 9E, the second body 520 may display a graphic object 805 associated with the theft on the first body 510 (or the preset external terminal 580).

When the graphic object 805 is selected, a graphic object 940 for ignoring a current state and a graphic object 950 for stopping the use of the vehicle or the second body 520 may be displayed on the display 551 of the first body 510 (or the preset external terminal 580).

If the vehicle is in the fifth state prior to starting the vehicle, the controller 180 of the first body may stop the use of the second body 520. Accordingly, control authority set in the second body 520 may disappear.

Furthermore, if the vehicle is in the fifth state subsequent to starting the vehicle, the second body 520 (or the vehicle control unit) may transmit at least one of the location information 920 of the second body 520 (or the vehicle) and the image 930 captured by the camera (or black box) provided in the vehicle to the preset external terminal 580 (or the first body 510). Accordingly, at least one of the location information 920 and the image 930 may be displayed on the preset external terminal 580 (or the first body 510).

Through such a configuration, the present disclosure may set control authority to restrict other functions depending on the state of the vehicle even though third control authority (or second control authority) is set as the second body is detached from the first body, thereby providing a control method capable of controlling the vehicle using the second body in an optimized manner.

FIGS. 10, 11, 12, 13 and 14 are conceptual views for explaining various embodiments associated with a case where a watch type mobile terminal associated with the present disclosure is detached.

Figure 10:
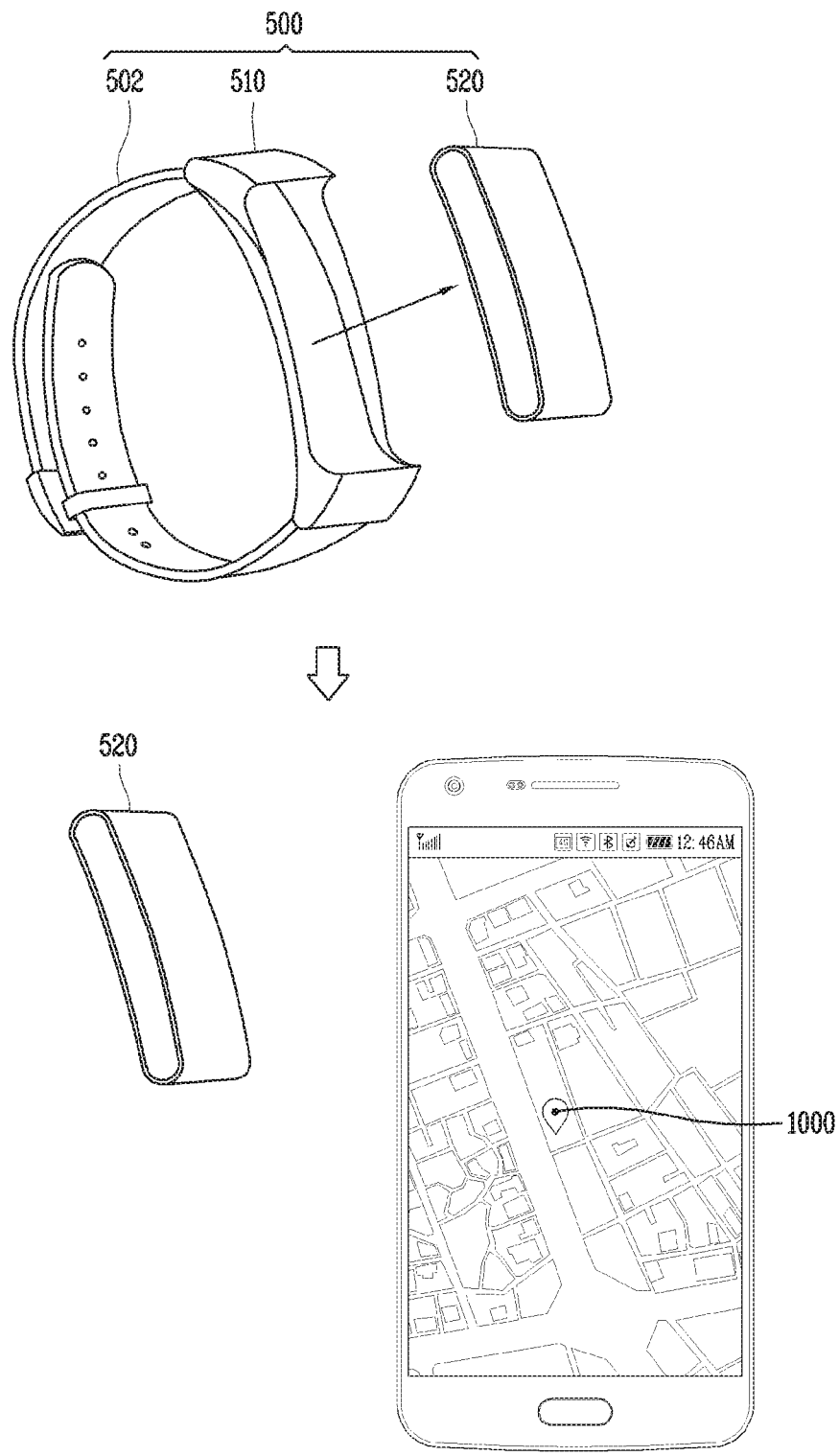

Referring to FIG. 10, the controller 180 may track the location of the second body 520 when the first body 510 and the second body 520 are detached from each other.

For an example, the second body 520 may include a location information module. When the processor of the second body 520 is detached from the first body 510, the location information module may be activated to transmit the location of the second body 520 to the first body 510 (or GPS satellite) in real time (or periodically or at specific time points).

The controller 180 of the first body 510 may receive the location of the second body 520 from the first body 510 (or GPS satellite) in real time (or periodically or at specific time points) from the time point when the second body 520 is detached.

In addition, the controller 180 may display the location information of the second body 520 on the touch screen of the first body.

Referring to FIG. 11, when the first body 510 and the second body 520 are detached from each other and then connected to each other, the controller 180 may display a history in which the second body 520 has controlled the external device (e.g., vehicle) while the second body 520 is detached on at least one of the display unit 370 provided in the second body and the touch screen 551 of the preset external terminal 580.

The history may include information on the configuration, operation and time when the external device (e.g., vehicle) is controlled, remark information, and the like.

Figure 12:
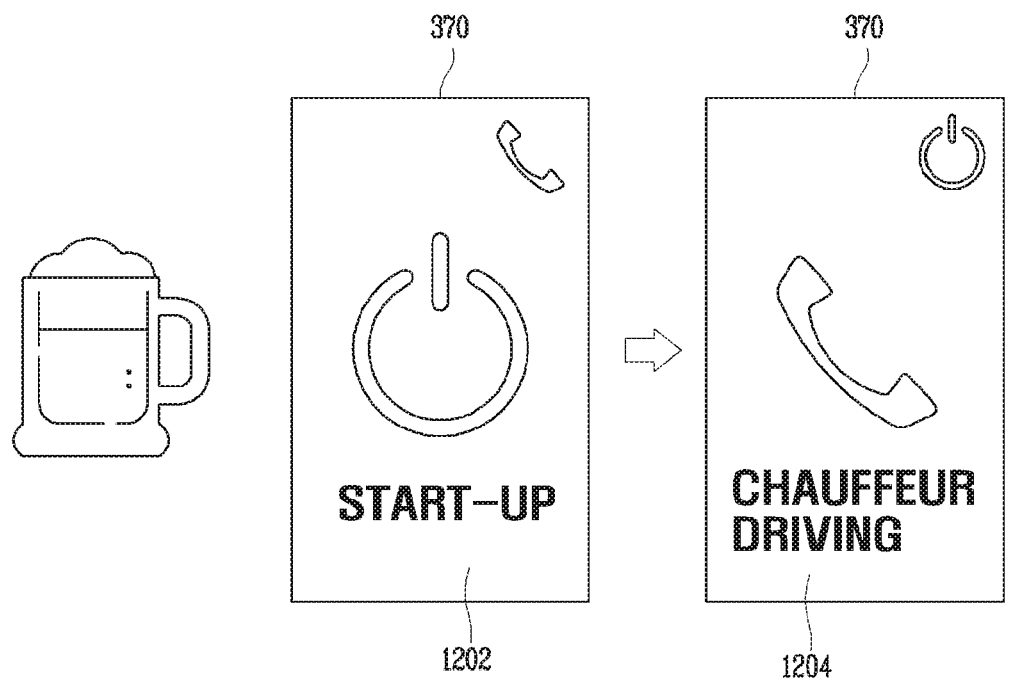

Referring to FIG. 12, the controller 180 of the first body 510 may sense the state of the user wearing the first body 510 through the sensing unit 140. For example, based on information sensed through the sensing unit 140, the controller 180 may determine whether or not the user is in a vehicle driving enable state (or whether the user is drunken, whether the user is legally permitted to drive the vehicle).

When the user wearing the first body 510 is in a vehicle driving enable state, the controller 180 (the processor of the second body) may display screen information 1202 capable of controlling the vehicle on the display unit 370, as illustrated in FIG. 12.

On the contrary, when the user wearing the first body 510 is in a vehicle driving disable state, the controller 180 (or the processor of the second body) may display screen information 1204 capable of performing a call connection function to a prestored phone number (e.g., a phone number of a chauffeur driver) on the display unit 370.

The sensing of the screen information 1202, 1204 and the user status may be carried out when the second body 520 is detached from the first body 510 or when the second body 520 is connected to the first body 510, or when a specific user input is received.

Figure 13:
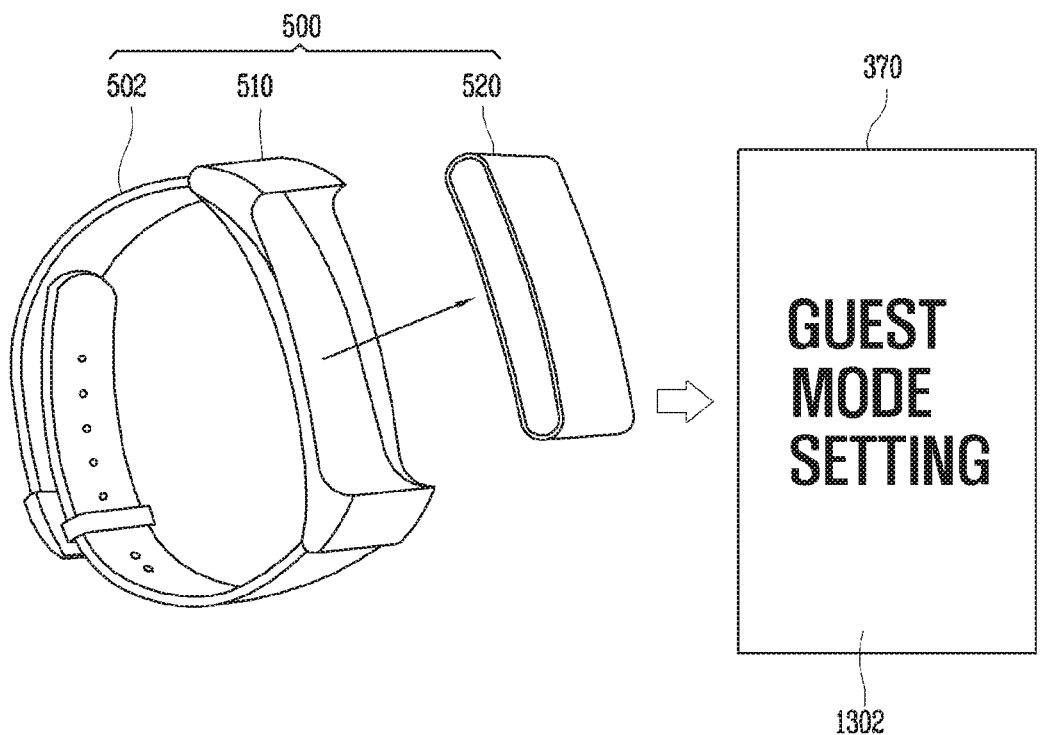

Referring to FIG. 13, when the second body 520 is detached from the first body 510, the controller 180 (or the processor of the second body) may display screen information capable of allowing the second body 520 to set control authority for controlling the external device (e.g., vehicle).

The screen information may be displayed for a predetermined period of time after the second body is detached from the first body, or may be output only when a distance from the first body is within a predetermined distance.

If a predetermined period of time has elapsed without an additional user input while the screen information is displayed or the second body is out of the first body within a predetermined distance, the controller 180 (or the processor of the second body) may set the control authority for controlling the external device to third control authority (1302).

Referring to FIG. 14, when the user wearing the first body is not an authenticated user, or the detached second body is connected to a third main body (e.g., a first body 540 worn by an unauthenticated user), the processor (or the controller 180) of the second body may transmit notification information to a preset contact group in the memory.

At least one of the foregoing operations carried out by the controller 180 provided in the first body may be carried out by the processor 382 provided in the second body.

Through such a configuration, the present disclosure may provide a new user interface capable of controlling an external device (vehicle) in various ways according to control authority set in the second body (or the first body).

Furthermore, the present disclosure may provide a watch type mobile terminal capable of performing various functions according to whether or not a user is driving while first control authority is set.

In addition, the present disclosure may provide a control method capable of setting control authority to limit other functions according to the state of a vehicle even when third control authority (or second control authority) is set as the second body is detached from the first body so as to control the vehicle using the second body in an optimized manner.

On the other hand, the watch type mobile terminal associated with the present disclosure may control an external device based on whether the detached second body is attached to the external device (e.g., vehicle). However, the present disclosure is not limited thereto, and the present disclosure may control the external device when the second body is present in the external device or present within a predetermined distance (within a communicable distance) from the external device.

The processor 382 of the second body may perform different functions depending on the location attached to the vehicle 600.

For example, the second body 520 detached from the first body 510 may be mounted on various modules provided in the vehicle.

The processor 382 may perform functions associated with a first module when the second body 520 is attached to the first module of the vehicle, and perform functions associated with a second module when the second body 520 is attached to the second module different from the first module of the vehicle.

Furthermore, the processor 382 may set the control authority of the vehicle differently according to whether user authentication is successful while the second body 520 is attached to a start button 610.

The user authentication may be fingerprint recognition (or fingerprint authentication), for an example. The second body 520 may be provided with a fingerprint recognition sensor. The fingerprint recognition sensor may be provided on the display unit 370, for an example.

The processor 382 may activate the fingerprint recognition sensor when the second body 520 is mounted on one module (e.g., the first module (start button)) of the vehicle (or the second body 520 is mounted on one module of the vehicle and then pressed).

In addition, the processor 382 may set first control authority capable of controlling all the functions of the vehicle when fingerprint authentication is successful. On the contrary, when fingerprint authentication has failed, the processor 382 may set second control authority for restricting the opening of a specific box of the vehicle, restricting some of the functions of vehicle navigation, or restricting a driving speed, a driving range, and the like of the vehicle.

When the second body 520 is attached to the start button, the second body 520 may be used as an ignition key.

In addition, when the second body 520 is attached to the start button, the second body 520 may transmit the attachment to the first body 510. Accordingly, when the second body 520 is transferred to another person, the first body 510 may monitor the use status of the second body 520 in real time.

Furthermore, when the driving of the vehicle is started after the second body 520 is attached to the start button, information associated with the driving of the vehicle may be transmitted to the first body 510.

When the second body 520 is attached to one module (e.g., an OBD charger, a lighter socket) of the vehicle, the processor 382 of the second body 520 may display one piece of information (e.g., vehicle internal information) associated with the vehicle on the display unit 370.

At this time, when new information is sensed through the OBD module (e.g., vehicle external information), the processor 382 may control the display unit 370 to display the sensed vehicle external information.

The vehicle internal information may include acceleration information, coolant information, engine rotation (rpm) information, fuel information, and the like.

Furthermore, information associated with the vehicle that can be displayed on the display unit 370 of the second body 520 may include brake pad warning information, washer fluid/air pressure warning information, anti-lock brake system (ABS) warning information, manual brake warning information, electronic stability program (ESP) warning information, collision possibility notification information, and the like.

In other words, the processor 382 of the second body 520 may sense the state of the vehicle attached to one module of the vehicle, and control the display unit 370 to display different screen information according to the state of the vehicle. In other words, on the display unit 370 of the second body 520, different screen information may be displayed according to the state of the vehicle.

Furthermore, the processor 382 of the second body 520 may change information associated with the vehicle being displayed on the display unit 370, based on a predetermined type of touch on the display unit 370 (e.g., a short touch, a long touch, a drag touch, a swipe touch, a flick touch, or the like) applied to the display unit 370.

On the other hand, even though the second body 520 is provided in the vehicle, when the first body 510 is present within a predetermined distance from the second body 520 (for example, the user wearing the first body 510 is driving the vehicle or aboard the vehicle), the controller 180 of the first body 510 may continuously sense the state of the user using the sensing unit 140 provided in the first body 510.

Then, when the state of the user corresponds to a preset state (for example, when the fatigue value is above a predetermined level or when the state of the user corresponds to a sudden emergency situation (e.g., a heart attack)), the controller 180 of the first body 510 may control the second body 520 to perform a function linked to be carried out in the preset state.

The second body 520 may perform the linked function based on the control command of the first body 510, and display information associated with the function on the display unit 370.

On the other hand, when the location of the vehicle to which the second body 520 is attached is changed, the processor 382 may control the display unit 370 provided in the second body 520 to vary information associated with the vehicle displayed on the display unit 370.

The vehicle 570 may be provided with at least one location where the second body 520 can be attached.

For example, when the second body 520 detached from the first body 510 of the watch type mobile terminal 200 is attached to a first location (e.g., windshield) of the vehicle, the processor 382 may control the sensing unit 140 to sense first information (e.g., weather information, ambient brightness, an object around the vehicle, etc.).

For another example, when the second body 520 is attached to a second location (e.g., around a cluster) different from the first location, the processor 382 may control the sensing unit 140 to sense second information (e.g., information associated with vehicle driving, such as vehicle speed, fueling amount, etc.) different from the first information.

Meanwhile, the watch type mobile terminal associated with the present disclosure may display information associated with the external device (vehicle) on different devices based on whether the first body and the second body are detached from or attached to each other.

Hereinafter, various embodiments that can be carried out by a watch type mobile terminal associated with the present disclosure will be described in detail with reference to the accompanying drawings.

Figure 15A:
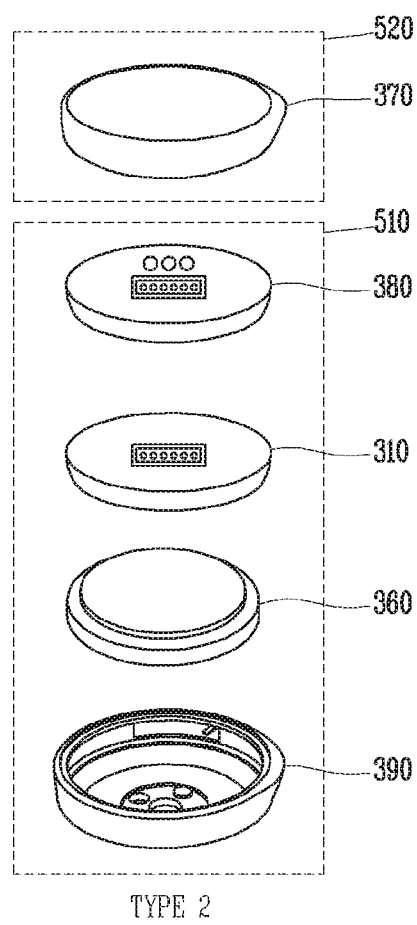
FIGS. 15A and 15B are conceptual views for explaining a detachment mode in a watch type mobile terminal associated with the present disclosure.
Figure 15B:
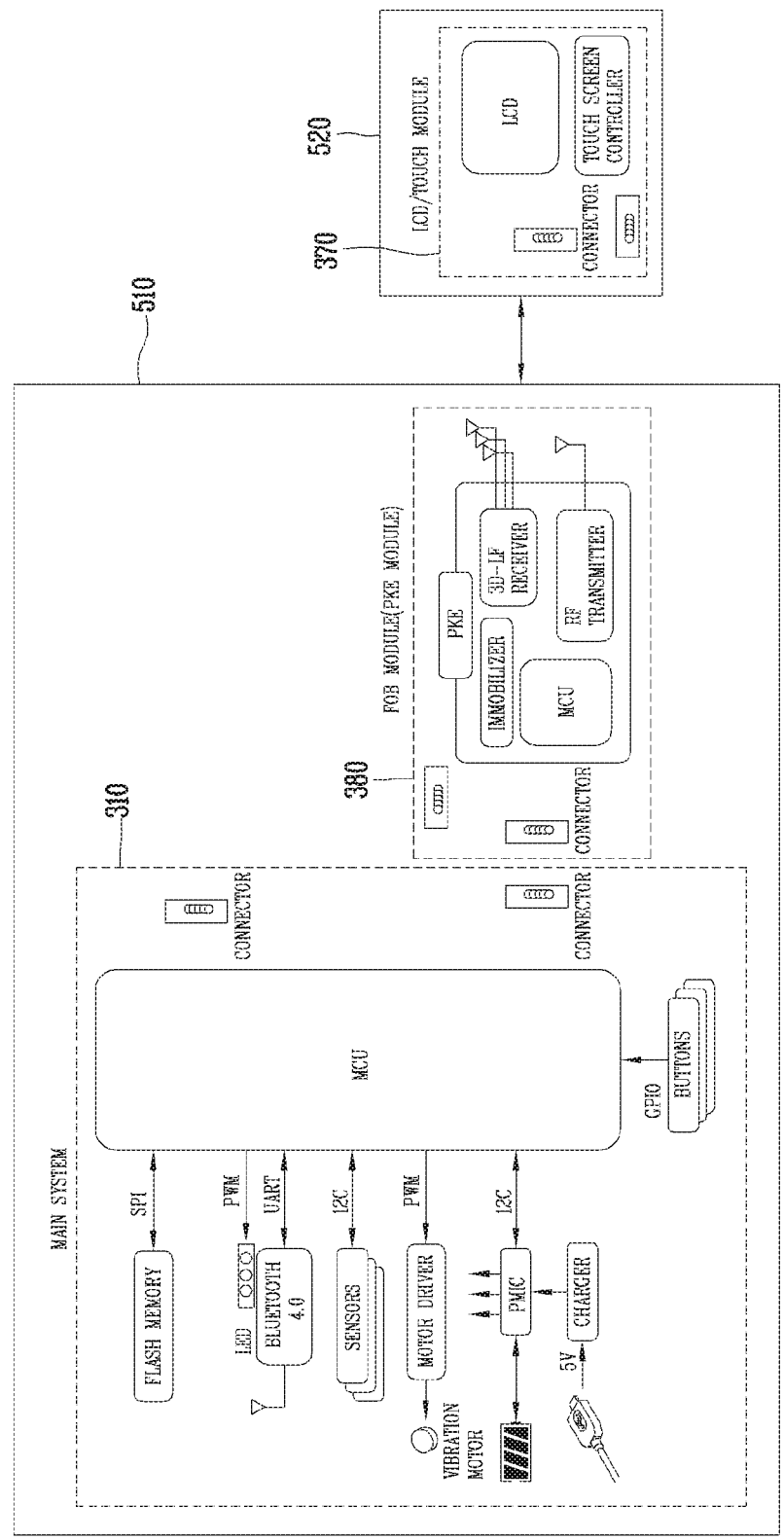

FIGS. 15A and 15B are conceptual views for explaining a detachment mode in a watch type mobile terminal associated with the present disclosure.

Hereinafter, as illustrated in FIG. 15A, it is illustrated an example in which the watch type mobile terminal associated with the present disclosure is used as a second type.

In this case, the first body 510 of the mobile terminal may include the FOB module 380, the main system 310, the power supply unit 360, and the main frame 390. In addition, the second body 520 of the mobile terminal may include the display unit 370.

The display unit 370 associated with the present disclosure may include a processor and a communication unit. In other words, even when only the display unit 370 is included in the second body 520, the display unit 370 may perform all the features of the FOB module 380.

For example, even though the second body 520 includes only the display unit 370, the display unit 370 may be set (given) to have control authority capable of controlling an external device (vehicle) to control the external device.

For another example, the processor of the display unit 370 may perform an immobilizer function associated with the external device (vehicle).

In other words, even when the second body 520 includes only the display unit 370 and the FOB module 380 is attached to the first body 510, all the foregoing description of FIGS. 4 through 14 will be analogically applicable thereto in the same or similar manner. In this case, the processor of the second body 520 described with reference to FIGS. 4 through 14 may be a processor of the display unit 370.

On the other hand, hereinafter, for convenience of explanation, a case where the mobile terminal is used as a second type as illustrated in FIG. 15A will be described as an example, but the present disclosure is not limited thereto. In other words, the following description will be analogically applicable to the case of a third type in which the display unit 370 and the FOB module 380 are included in the second body 520 or a fourth type in which the display unit 370 and the FOB module 380 are independently used, in the same or similar manner.

FIG. 15B illustrates a circuit diagram in a case where a watch type mobile terminal associated with the present disclosure is used as a second type.

As illustrated in FIG. 15B, the main system 310, the FOB module 380, and the display unit 370 may respectively have at least one connector. At least two of the main system 310, the FOB module 380, and the display unit 370 may be electrically connected through the connector. When at least two of the main system 310, the FOB module 380 and the display unit 370 are physically coupled to each other, the connector may be formed to allow contact with each other.

Although not shown in FIG. 15B, the main system 310 and the display unit 370 may include an immobilizer module. Through this, at least one of the main system 310 and the display unit 370 may control an external device (vehicle).

Furthermore, in the above description, it has been described that the main system 310 and the FOB module 380 are detachable, and the FOB module 380 and the display unit 370 are detachable, but the present disclosure is not limited thereto.

The watch type mobile terminal associated with the present disclosure may be formed such that the main system 310 and the display unit 370 are detachable. In this case, the main system 310 and the display unit 370 may be physically/electrically connected or disconnected.

Figure 16:
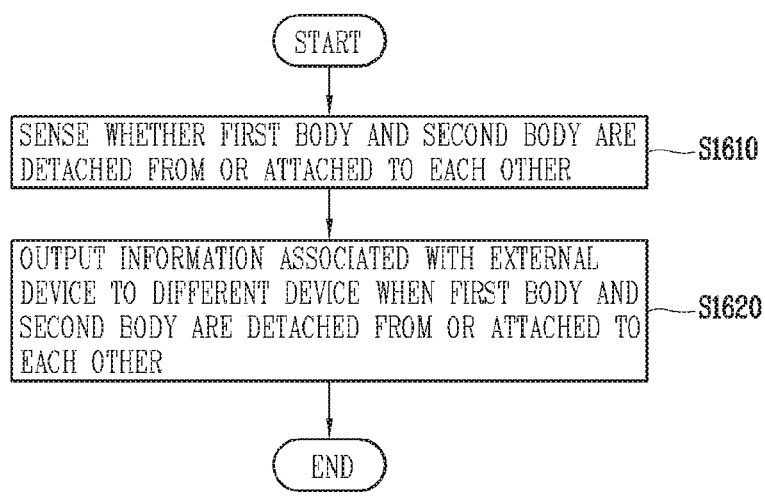
FIG. 16 is a flowchart for explaining a control method according to an embodiment of the present disclosure.

FIG. 16 is a flowchart for explaining a control method according to another embodiment of the present disclosure, and FIG. 17 is a conceptual view for explaining a control method illustrated in FIG. 16.

FIGS. 18A, 18B, 18C, 18D, 19A, 19B, 20, 21, 22, 23, 24, 25, 26, 27, 28, 29, 30, 31 and 32 are conceptual views for explaining various embodiments associated with the present disclosure.

Referring to FIG. 16, the present disclosure may sense whether the first body and the second body are detached from or attached to each other (S1610).

For example, the controller 180 (311 or the processor 382 of the FOB module 380) provided in the first body 510 may sense (determine, decide, extract, detect) whether electrical connection between the first body 510 and the second body 520 is disconnected, or whether a button for separating the first body 510 and the second body 520 is pressed, or whether the first body 510 and the second body 520 are separated from or combined with each other through the sensing unit 140, or whether the first body 510 and the second body 520 are in a separated state or combined state.

Then, the process of outputting information associated with the external device (vehicle) to a different device when the first body and the second body are detached from or attached to each other is carried out (S1620).

For example, when the first body 510 and the second body 520 are detached from or attached to each other, the controller 180 may output information associated with the external device to different devices. Here, the external device may include the vehicle 570.

As illustrated in (a) in FIG. 17, when the first body 510 and the second body 520 are separated (or in a separated state), the controller 180 may display information associated with the external device (vehicle) on the preset external terminal 580.

Here, the preset external terminal 580 (or previously authenticated external terminal) may be a mobile terminal owned by the owner of the watch type mobile terminal 500, a mobile terminal connected to communicate with the watch type mobile terminal 500, a mobile terminal authenticated to communicate with the watch type mobile terminal 500, or the like.

Furthermore, as illustrated in (b) of FIG. 17, when the first body 510 and the second body 520 are combined with each other (or in a combined state), the controller 180 may display information associated with the external device (vehicle) on the second body.

Specifically, when the first body 510 and the second body 520 are combined with each other or recombined with each other after the first body 510 and the second body 520 are separated from each other in the combined state, the controller 180 may display information associated with the external device (vehicle) on the second body 520. At this time, the information associated with the external device (vehicle) may be displayed on the display unit 370 of the second body 520.

The information associated with the external device (vehicle) may include all screen information associated with the external device.

For example, the information associated with the external device (vehicle) may include screen information for setting control authority for controlling the external device, screen information for notifying an event generated from the external device, screen information for notifying the location of the external device, screen information for notifying the location of the second body 520 detached from the first body 510, information for controlling the external device while the second body 520 is detached from the first body 510, and the like.

As described above, since the display unit 370 of the second body 520 is highly likely to be transferred to another user when the second body 520 is detached from the first body 510, information associated with the external device may be displayed on the preset external terminal 580.

Furthermore, since the display unit 370 of the second body 520 can be seen by the user when the second body 520 is coupled to the first body 510 (or recombined subsequent to being separated from each other), according to the present disclosure, information associated with the external device may be displayed on the display unit 370 of the second body 520.

Meanwhile, the present disclosure may display information associated with the external device (vehicle) on the second body 520 even when the second body 520 is detached from the first body 510.

For example, when the second body 520 is detached from the first body 510, the processor (or the control unit of the first body 510) provided in the second body 520 may display screen information capable of controlling the external device on the second body 520.

For an example, the screen information may be displayed on the display unit 370 of the second body 520 for a predetermined period of time after the second body 520 is detached from the first body 510.

For example, as illustrated in (a) of FIG. 18A, when the second body 520 is detached from the first body 510, the processor (or the control unit of the first body) of the second body 520 may display screen information 1800*a* capable of controlling the external device (vehicle 570) on the display unit 370 of the second body 520.

Furthermore, when a predetermined period of time has elapsed after the screen information 1800*a* is displayed, the processor of the second body 520 may display screen information 1800*b* other than the screen information 1800*a* on the display unit 370 of the second body 520.

All features (functions, operations, and controls) that can be carried out by the processor of the second body 520 in the present specification may be carried out by at least one of the processor of the display unit 370, the processor 382 of the FOB module 380, and the controller 180, 311 of the main system 310.

Furthermore, all features (functions, operations, and controls) that can be carried out by the controller of the first body 510 may be carried out by at least one of the controller 180, 311 of the main system 310, the processor 382 of the FOB module 380, and the processor of the display unit 370.

On the other hand, the processor provided in the second body 520 may display different screen information based on whether the first body 510 and the second body 520 are within a predetermined distance from the external device (vehicle 570).

Here, the predetermined distance may be, for an example, a communicable distance between the watch type mobile terminal 500 and the external device (vehicle 570), or a distance set by the user within the distance. The predetermined distance may be determined/changed by user setting.

For example, as illustrated in FIG. 18A, in case where the watch type mobile terminal 500 is present within a predetermined distance from the external device 570 when the first body 510 and the second body 520 are detached from each other, the processor of the second body 520 may display first screen information 1800a on the second body 520.

Figure 18B:
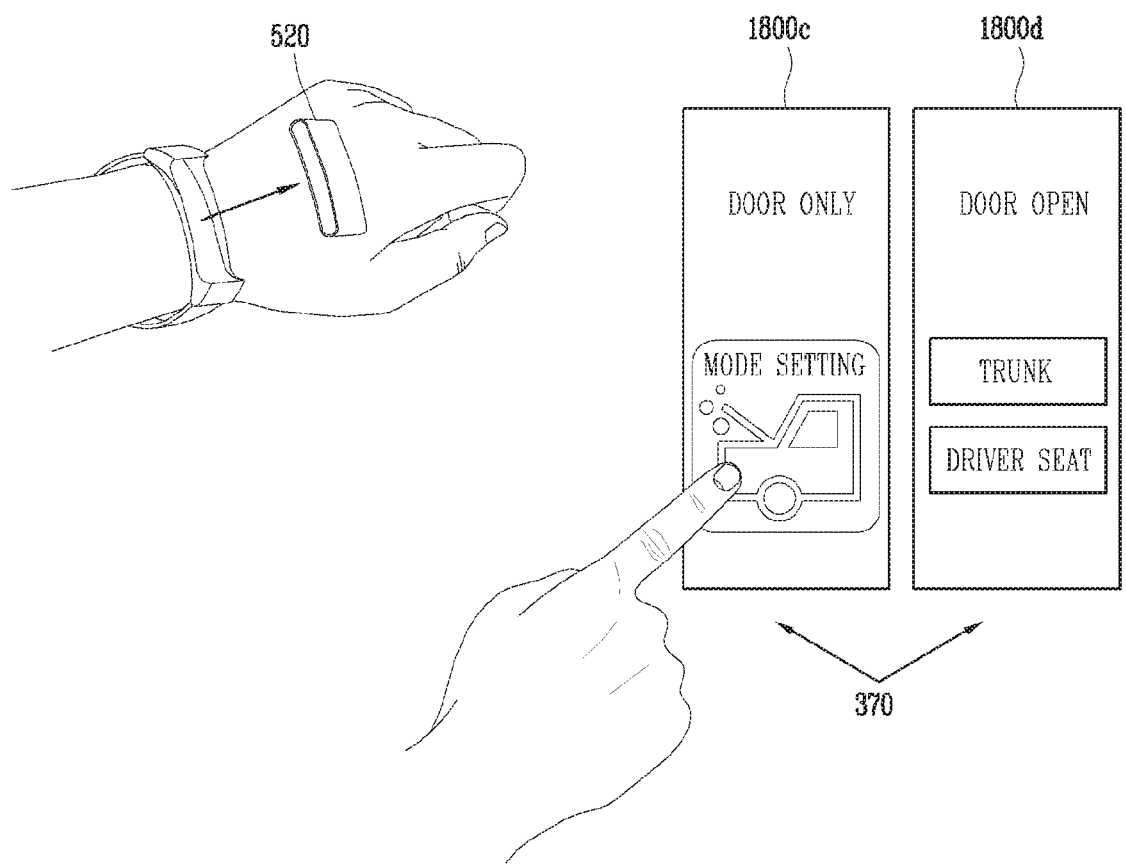

For another example, as illustrated in FIG. 18B, in case where the watch type mobile terminal 500 is not present within a predetermined distance from the external device 570 when the first body 510 and the second body 520 are detached from each other, the processor of the second body 520 may display second screen information 1800c different from the first screen information 1800a on the second body 520.

Displaying any information (for example, screen information) on the second body 520 may denote displaying the any information on an output element (for example, the display unit 370) provided in the second body 520.

The first screen information 1800a and the second screen information 1800c may be screen information capable of controlling the external device (e.g., the vehicle 570). Each of the first screen information 1800a and the second screen information 1800c may include a graphic object linked to a different function among a plurality of functions capable of controlling the external device.

For an example, when a graphic object linked to a function of controlling the external device included in the second screen information 1800c is selected, the processor of the second body 520 may display screen information 1800d linked to the relevant function on the second body 520.

Meanwhile, the controller of the first body 510 may sense whether or not the first body is detached from a wrist through the sensing unit.

Figure 18C:
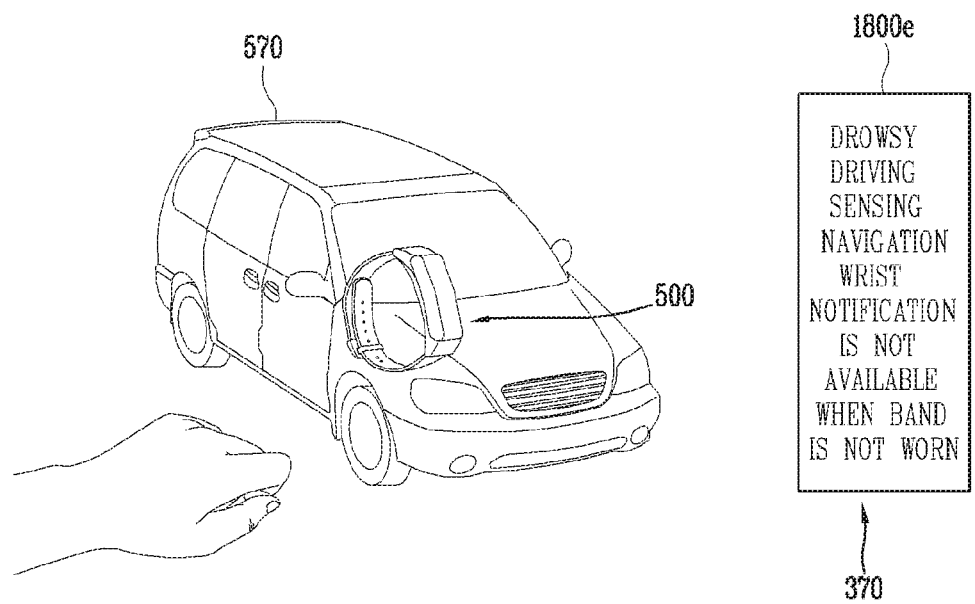

Referring to FIG. 18C, when the first body 510 is detached from the wrist while the first body 510 and the second body 520 are attached to each other, the controller 180 may display screen information 1800e capable of controlling the external device (vehicle 570) on the second body 520. Here, the screen information 1800e may include notification information for notifying whether a function associated with the external device (vehicle 570) is available when the first body 510 is detached from the wrist.

On the other hand, the controller 180 may display different screen information based on whether the first body 510 is within a predetermined distance from the external device (vehicle 570) when the first body 510 is detached from the wrist.

Here, the predetermined distance may be a distance that enables communication between the watch type mobile terminal 500 and the external device (vehicle 570), or may be a distance set additionally by the user within the distance. The predetermined distance may be determined/changed by user setting.

For example, when the first body 510 is detached from the wrist while the first body 510 and the second body 520 are attached to each other, in case where a distance between the mobile terminal 500 and the external device 570 is within a predetermined distance, the controller 180 may display third screen information 1800e on the display unit 370 of the second body 520, as illustrated in FIG. 18C.

Figure 18D:
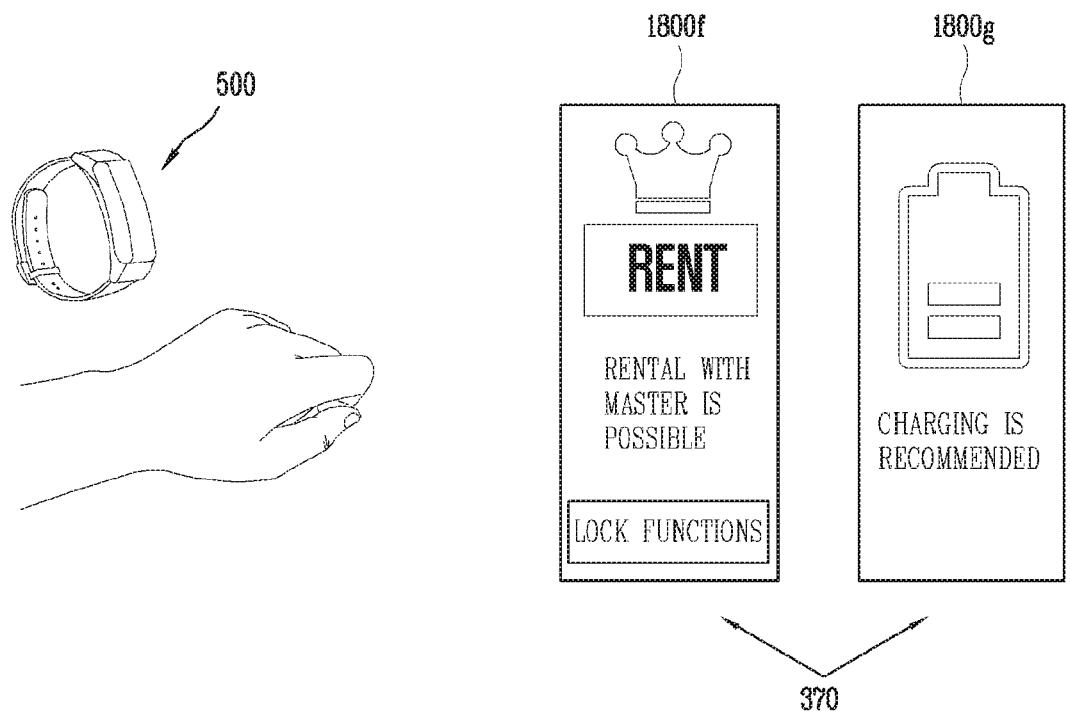

For another example, when the first body 510 is detached from the wrist while the first body 510 and the second body 520 are attached to each other, in case where the mobile terminal 500 is not present within a predetermined distance from the external device 570, the controller 180 may display fourth screen information 1800f different from the third screen information 1800e, as illustrated in FIG. 18D.

The third screen information 1800e and the fourth screen information 1800f may be included in information associated with the external device, and for an example, may include notification information for notifying available functions of the external device, and screen information capable of setting the control authority of the external device, and the like.

The above-described first through fourth screen information may be included in screen information associated with the external device, and may be all different screen information, or at least two of them may be the same screen information.

Furthermore, for an example, as illustrated in FIG. 18D, when there is no user input for a predetermined period of time after the fourth screen information 1800f is displayed, or when the power amount of the power supply unit 390 of the watch type mobile terminal 500 is less than a predetermined amount, fifth screen information 1800g different from the fourth screen information 1800f may be displayed on the second body 520.

On the other hand, when the second body 520 is detached from the first body 510 and then recombined with the first body, the controller 180 may display information associated with the external device on the second body 520.

Here, the information associated with the external device may include event information generated from the external device (vehicle 570) while the second body 520 is detached therefrom. The event information may include information associated with all functions performed in the external device (vehicle) by the control of the second body 520. Furthermore, the event information generated from the external device may include history information in which the external device is controlled by the user, information in which the external device is operated, and the like.

The external device 570 may be operated according to control authority set in the second body 520.

Figure 19A:
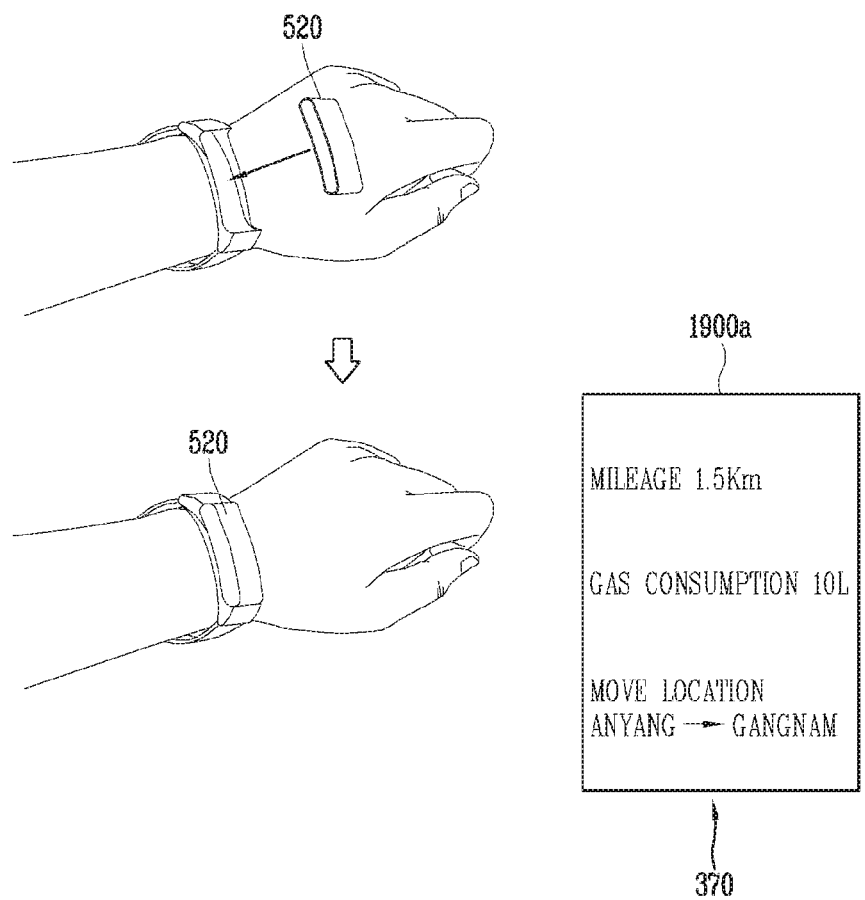

For example, as illustrated in FIG. 19A, when the second body 520 is detached from the first body 510 and then recombined with the first body 510, the controller 180 may display event information 1900a generated from the external device (vehicle 570) while the second body 520 is disconnected on the display unit 370 of the second body 520.

On the other hand, when the second body 520 is detached from the first body 510 and then the external device 570 is operated based on the control authority of the second body 520, and then the second body 520 is combined (or recombined) with the first body 510, event information (or information on the operation of the external device 570) generated from the external device 520 while the second body 520 is detached therefrom may be displayed on the preset external terminal 580.

For example, as illustrated in (a) of FIG. 19B, when the detached second body 520 is combined with the first body 510, a graphic object capable of checking event information (or history information on which the external device 570 is controlled) generated from the external device 570 while the second body 520 is detached from the external device may be displayed on the touch screen of the preset external terminal 580.

For example, when a first graphic object 1900*b* of the graphic object is touched, a detailed screen 1900*c* linked to the touched first graphic object 1900*b* may be displayed on the touch screen.

For another example, when a second graphic object 1900*d* of the graphic object is touched, the controller 180 (or the controller of the preset external terminal) may display a detailed screen 1900*e* linked to the second graphic object 1900*d* on the touch screen.

Meanwhile, referring to FIG. 20, the watch type mobile terminal 500 associated with the present disclosure may display information associated with the external device (vehicle) in various ways based on whether or not the first body 510 is worn on the wrist, and the second body 520 is combined with the first body 510.

For example, when the external device 570 is controlled, while the first body 510 is worn by a band and the second body 520 is connected to the first body 510, the controller 180 may determine that the owner of the external device 570 and the mobile terminal 500 directly controls the external device 570. In this case, the controller 180 may not display any information.

For another example, when the second body 520 is detached from the first body 510 and recombined with the first body 510, the controller 180 may display information associated with the external device (vehicle) on the display unit 370 of the second body 520.

Although not shown, the controller 180 may display information associated with the external device (vehicle) on the preset external terminal 580 or a display module provided in the main body 510 when the second body 520 is detached from the first body 510.

For another example, when the first body 510 is detached from the wrist while the second body 520 is connected to the first body 510, the controller 180 may display information associated with the external device (vehicle) on the preset external terminal 580.

The information associated with the external device (vehicle) may include operation information, driving information of the external device (vehicle), use information of each device provided in the external device (vehicle), and the like.

On the other hand, when an event is generated from the external device (e.g., the vehicle 570), the controller 180 may display information associated with the generated event on at least one of the second body 520 and the preset external terminal 580.

Figure 21:
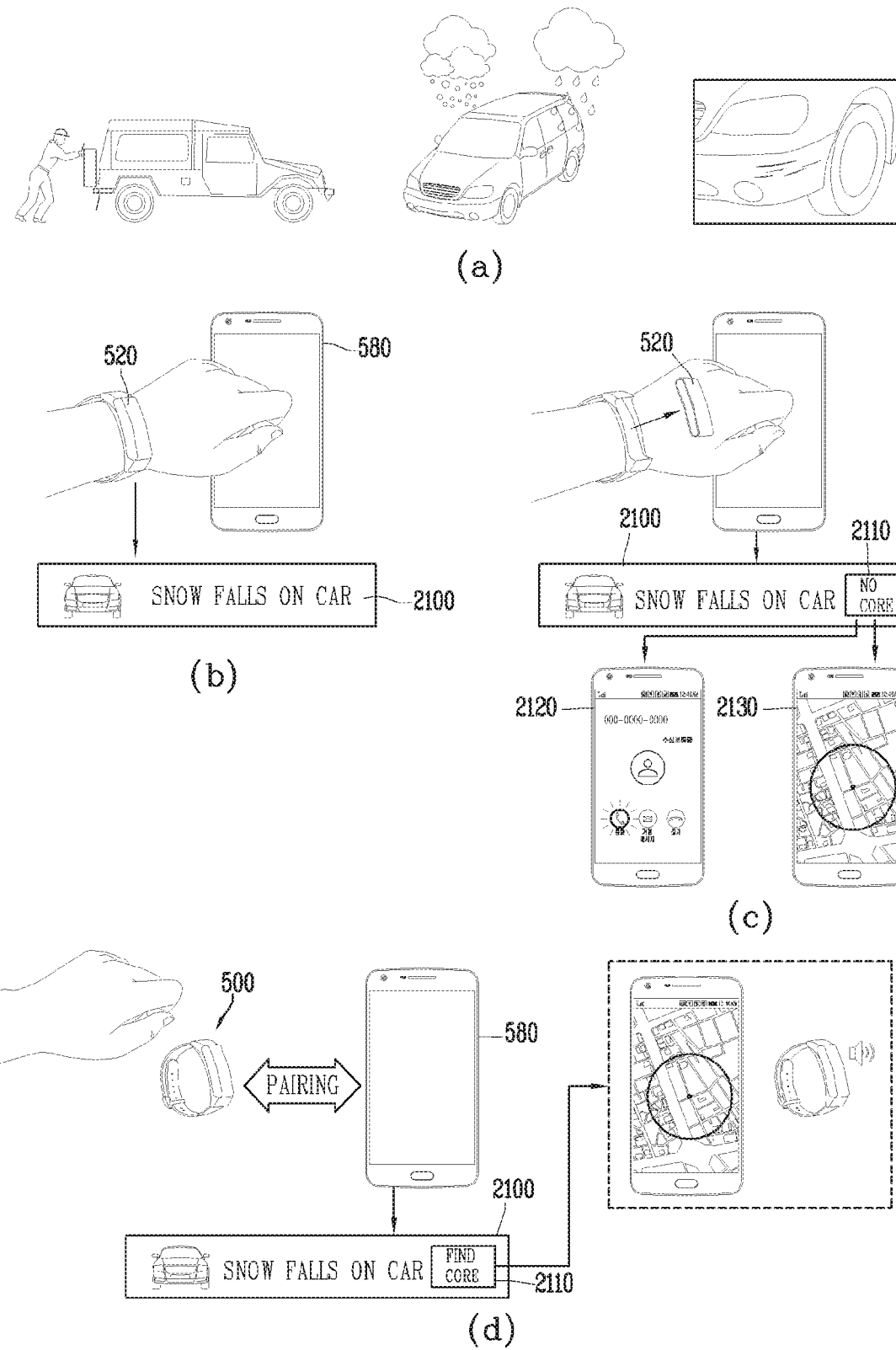

Here, as illustrated in (a) of FIG. 21, for an example, an event generated from the external device may be a case where the external device is moved by a person, or external device surrounding environment information or the external device is damaged, or the like.

In this case, as illustrated in (b) of FIG. 21, when the first body 510 and the second body 520 are combined with each other, information 2100 associated with the generated event may be displayed on the second body 520.

Furthermore, as illustrated in (c) of FIG. 21, when the second body 520 is detached from the first body 510, the controller 180 may display the information 2100 associated with the generated event on the preset external terminal 580.

When the information 2100 associated with the event is displayed on the preset external terminal 580, the information 2100 associated with the event may include a graphic object 2110 linked a function of tracking the location of the second body.

When the graphic object 2110 is selected (touched), the controller 180 may control the external terminal 580 to allow the preset external terminal 580 to make a call 2120 to the second body 520 or control the external terminal 580 to allow the preset external terminal 580 to receive the location information from the second body 520 and display it on map information 2130.

On the other hand, when an event occurs in the external device (vehicle) while the first body 510 is detached from the wrist, the controller 180 may display information 2100 associated with the generated event on the preset external terminal 580. Even in this case, the information 2100 associated with the event may include a graphic object 2110 linked to a function of tracking the location of the second body (or the first body).

In this case, when the graphic object 2110 is selected, the controller 180 may output an alarm sound (or a horn) based on a signal received from the preset external terminal.

Meanwhile, according to the present disclosure, it may be possible to detach the second body 520 set with control authority for controlling the external device from the first body 510 and deliver it to another person. In this case, the another person that has received the second body 520 may control the external device using the second body 520.

Referring to FIG. 22, the external device (vehicle 570) may be controlled (used) by the second body 520 rented to another person, as illustrated in (a) of FIG. 22, and then the second body 520 may be returned to the owner, as illustrated in (b) and (c) of FIG. 22.

In this case, the owner may attach the second body 520 to the first body 510 or to the preset external terminal 580.

The controller 180 (or the processor of the second body 520) may display information associated with the external device on the second body or the preset external terminal 580.

In addition, as illustrated in (e) of FIG. 22, when the second body 520 is attached to the preset external terminal 580, the processor (or the controller 180) of the second body may display screen information 2200*a* indicating the location of the external device (vehicle) on the preset external terminal 580.

The screen information 2200*a* may include map information, and the map information may include a graphic object 2220 indicating the current location of the external device (vehicle).

Furthermore, the screen information 2200*a* may include a graphic object 2220*a* capable of activating a camera provided in the preset external terminal 580.

For an example, the graphic object 2220*a* may be displayed based on whether the location of the preset external terminal 580 (or the second body 520) enters within a predetermined distance from the external device (vehicle).

When the graphic object 2220*a* is selected, the processor of the second body 520 (or the controller of the external terminal) may activate the camera provided in the external terminal 580, and display an image (preview image) 2220*b* received through the camera on the touch screen of the external terminal (or the display unit 370 of the second body 520).

On the image (preview image) 2220*b*, a virtual graphic object may be displayed in an overlapping manner to correspond to a location where the external device is present. Such a configuration may be implemented by an augmented reality (AR) function, for an example.

Through the foregoing configuration, the present disclosure may provide a user interface and a control method for allowing the owner to more easily and conveniently find the external device even after the external device is controlled (used) by another person.

Referring to FIG. 23, the second body 520 associated with the present disclosure may be provided with a function (for example, an immobilizer function) capable of controlling an external device (vehicle 570). Accordingly, as illustrated in (a) of FIG. 23, when the second body 520 is attached to the preset external terminal 580, the controller may perform the functions provided in the second body 520 using the preset external terminal 580.

In addition, as illustrated in (b) of FIG. 23, when communication (e.g., short-range communication) between the watch type mobile terminal 500 and the preset external terminal 580 is connected while the first body 510 and the second body 520 are combined with each other, the preset external terminal 580 may control the external device 570 based on control authority granted by the watch type mobile terminal 500.

Figure 24:
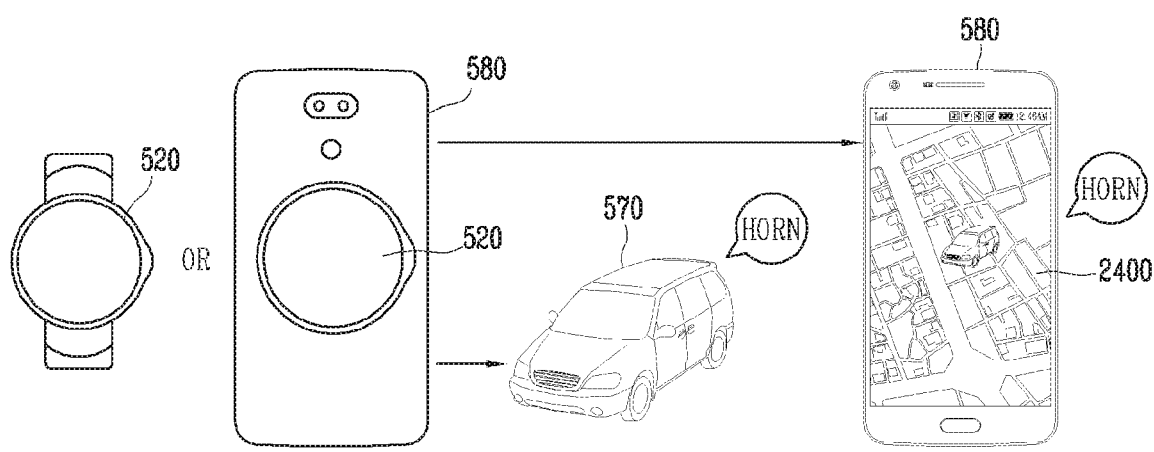
Figure 27:
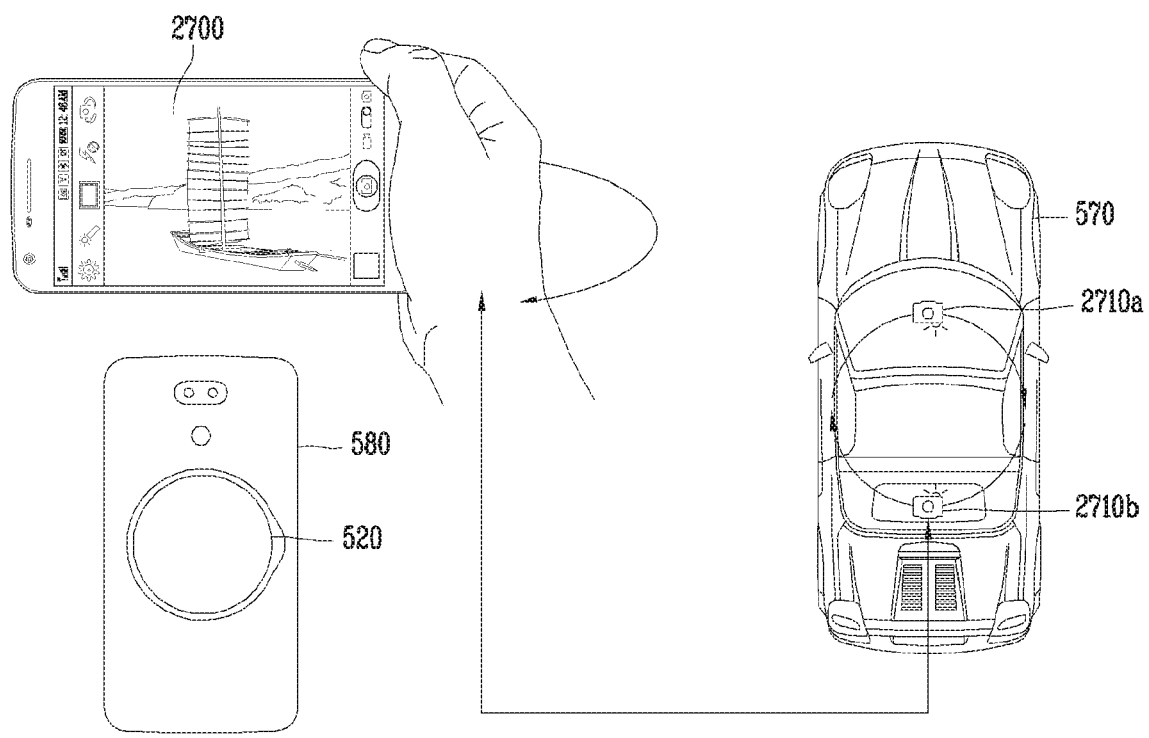

On the other hand, as illustrated in FIG. 24, when the second body 520 is combined with the first body 510, or the second body 520 is combined with the preset external terminal 520, the processor of the second body 520 may transmit a control command to sound the horn to the external device 570 or display map information 2400 guiding the location of the external device on the touch screen of the external terminal 580.

Meanwhile, while the second body 520 is attached to the first body 510 or the second body 520 is attached to the preset external terminal 580, the processor of the second body 520 may display a screen 2500 for setting control authority for controlling the external device in the second body 520 on the display unit 370 of the second body 520, as illustrated in (a) of FIG. 25.

For an example, the user may set various control authorities capable of controlling the external device 570 through the relevant screen 2500.

Then, as illustrated in (b) of FIG. 25, when the second body 520 is detached from the first body 510 and then transferred to another person control authority setting is completed, the another person may control the external device 570 within a range of control authority set in the second body 520.

On the other hand, the processor provided in the second body 520 may be formed to display an image received through a camera provided in the external device (vehicle) on the preset external terminal 580 in a state where the second body 520 is detached from the first body 510 and then attached to the preset external terminal 580.

For example, as illustrated in (a) of FIG. 26, when a camera application 2600 installed in the external terminal 580 is executed while the second body 520 is attached to the preset external terminal 580, an image (preview image) received through the camera provided in the external terminal 580 on the touch screen of the external terminal 580.

Furthermore, a graphic object 2610a for changing the type of the camera receiving the image may be displayed on the touch screen of the external terminal 580.

When the graphic object 2610a is selected, the processor of the second body 520 (or the controller of the preset external terminal 580) may change the type of the camera receiving the image, as illustrated in (b) of FIG. 26.

For example, when the graphic object 2610a is selected (touched) while an image (preview image) received through a rear camera of the preset external terminal is displayed, the controller of the second body 520 (or the controller of the preset external terminal 580) may display any one of an image received through a front camera of the preset external terminal 580, an image received through a camera 2610b provided on a front surface of the external device (vehicle), and an image received through a camera 2610c provided on a rear surface of the external device (vehicle) on the touch screen of the preset external terminal 580.

The above images may be displayed on the touch screen of the preset external terminal 580 sequentially (or in a toggle manner) whenever the graphic object 2610a is selected, for an example.

In other words, when the graphic object 2610a displayed on the touch screen of the preset external terminal is selected, the processor of the second body 520 may transmit a control command for activating the camera to the external device (vehicle), and receive an image (preview image) received through the activated camera from the external device (vehicle) to display the received image on the touch screen of the preset external terminal 580.

The processor of the second body 520 may change the camera to be activated in the external device (vehicle) based on the movement of the preset external terminal 580 to which the second body 520 is attached.

The processor of the second body 520 may sense the movement of the preset external terminal (or the movement of the second body 520) to which the second body 520 is attached, based on information sensed from the sensing unit or the sensing unit provided in the preset external terminal 580.

When the movement corresponds to a preset movement (e.g., a movement moving more than a predetermined distance, rotating more than a predetermined angle, or rotating in a predetermined direction), the processor of the second body 520 may activate at least one of cameras 2710a, 2710b provided in the external device (vehicle).

The processor of the second body 520 may switch a preview image 2700 received through the camera provided in the preset external terminal 580 to an image received from the camera 2710a, 22710b provided in the external device 570 based on the movement.

Furthermore, although not shown, the processor of the second body 520 can also tilt the camera provided in the external device 570 based on the movement.

For example, when the movement of the external terminal 580 (or the second body 520) is sensed while an image (preview image) received from any one of the cameras (for example, 2710a) provided in the external device 570 is displayed on the touch screen of the preset external terminal 580, the processor of the second body 520 may move the camera 2710a provided in the external device 570 to receive the image based on the movement.

At this time, the movement of the camera 2710a may correspond to the movement of the preset external terminal 580 (or the second body 520).

On the other hand, when the second body 520 performs a video call in the preset external terminal 580 while being attached to the external terminal 580, the processor of the second body 520 associated with the present disclosure may transmit an image received from the external device (vehicle) to the counterpart terminal of the video call.

For example, as illustrated in (a) of FIG. 28, the preset external terminal 580 to which the second body 520 is attached may perform a video call within the external device (vehicle). In this case, on the touch screen of the external terminal 580, at least one of an image received from the counterpart terminal and an image received from the camera provided in the external terminal 580 (i.e., an image 2810 transmitted to the counterpart terminal) may be displayed.

A graphic object 2800 linked to a function of switching the camera may be displayed on the touch screen.

When the graphic object 2800 is selected while the second body 520 is attached to the external terminal 580 to perform a video call, the processor of the second body 520 may transmit a control signal for activating the camera 2820 provided in the vehicle to the external device.

Then, as illustrated in (b) of FIG. 28, the processor of the second body 520 (or the controller of the external terminal 580) may receive an image 2830 captured by the camera 2820 activated in the external device to display it on the touch screen of the external terminal 580.

For an example, the image 2830 may be displayed in place of the image 2810 captured by the camera provided in the external terminal 580. Furthermore, the image 2830 may be transmitted to the counterpart terminal through the preset external terminal 580 (or the second body 520).

In this state, once the graphic object 2800 is selected again, an image captured by another camera provided in the external device (vehicle) is may be displayed on the touch screen of the external terminal 580, or an image 2810 captured by the camera provided in the external terminal 580 may be displayed again.

When the image 2810 captured by the camera provided in the external terminal 580 is displayed again, the camera 2820 activated in the external device (vehicle) may be switched from an active state to an inactive state. The switching may be carried out by control of the second body 520 (or the controller of the external terminal 580).

On the other hand, the processor of the second body 520 may use not only the camera image (preview image) but also various content (e.g., music, videos, images, etc.) in the preset external terminal 580.

Figure 29:
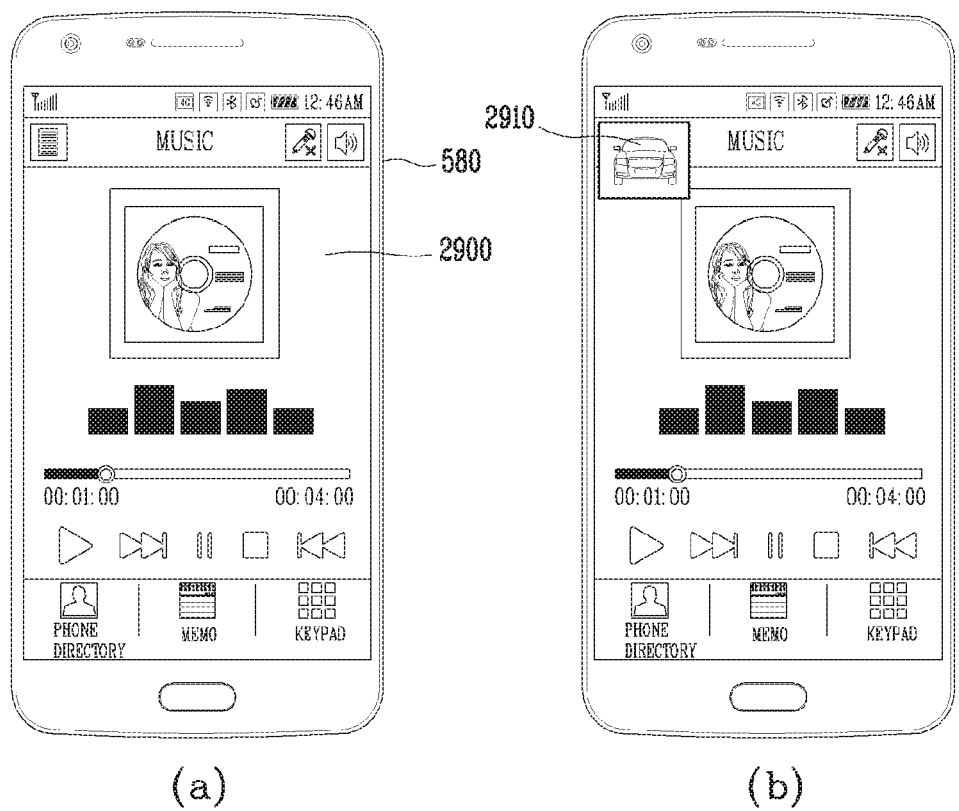

For example, as illustrated in (a) of FIG. 29, when the second body 520 is not attached thereto, screen information 2900 of content that can be provided from the preset external terminal 580 may be displayed on the touch screen of the preset external terminal 580.

For another example, when the second body 520 is attached to the external terminal 580, the processor of the second body 520 may receive content information that can be provided from the external device (vehicle) set to be controllable in the second body 520.

In this case, as illustrated in (b) of FIG. 29, a graphic object 2910 linked to a function of executing content that can be provided by the external device (vehicle) may be displayed on the touch screen of the external terminal 580.

When the graphic object 910 is selected (touched), the processor of the second body 520 (or the controller of the external terminal 580) may receive the content from the external device (vehicle) to execute it on the external terminal 580.

On the other hand, when the second body 520 is detached from the first body 510 and then attached to the preset external terminal 580, the processor provided in the second body 520 may display a graphic object linked to a function associated with the external device (vehicle) on the preset external terminal 580.

The graphic object 2910 described above may also be included in a graphic object linked to a function associated with the external device.

Figure 30:
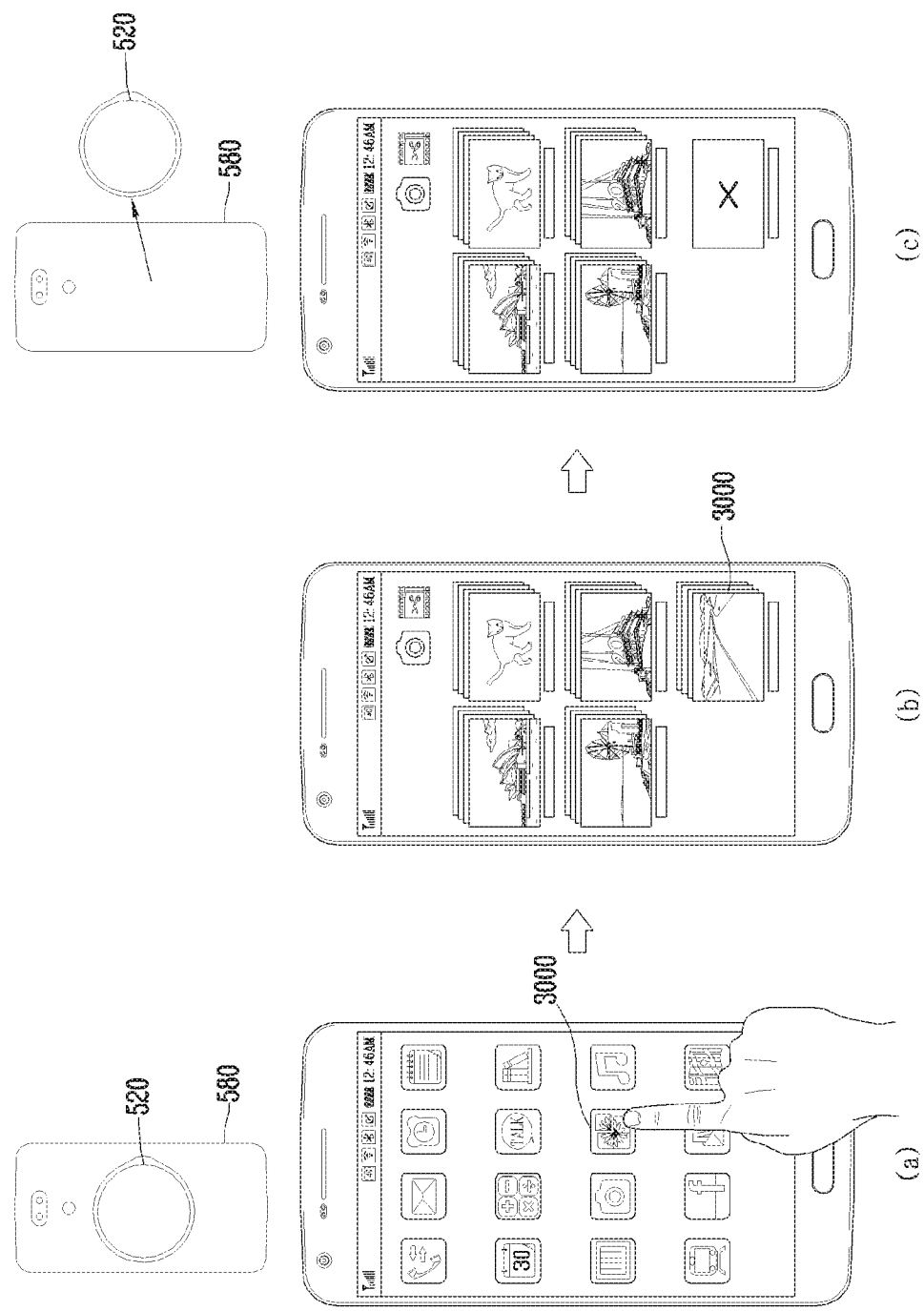

Furthermore, as illustrated in (a) of FIG. 30, while the second body 520 is attached to the preset external terminal 580, a gallery icon 3000 displayed on the touch screen of the external terminal 580 may be selected.

In this case, the processor of the second body 520 (or the controller of the external terminal) may display a graphic object capable of selecting content stored in the memory of the external terminal and a graphic object 3100 capable of selecting content stored in the external device (vehicle) controlled by the second body 520 on the touch screen of the external terminal (or the display unit 370 of the second body 520), as illustrated in (b) of FIG. 30.

Here, the content stored in the external device (vehicle) may include content (videos, images) captured from a camera (black box, etc.) provided in the external device (vehicle) or content (videos, images, music, etc.) stored in the memory of the external device (vehicle).

On the other hand, as illustrated in (c) of FIG. 30, when the second body 520 is detached from the preset external terminal 580, the graphic object 3100 capable of selecting content stored in the external device (vehicle) may disappear.

Through such a configuration, the present disclosure may provide a watch type mobile terminal capable of expanding compatibility between devices to use an external device that is controllable through the second body 520 through a preset external terminal and a control method thereof.

Figure 31:
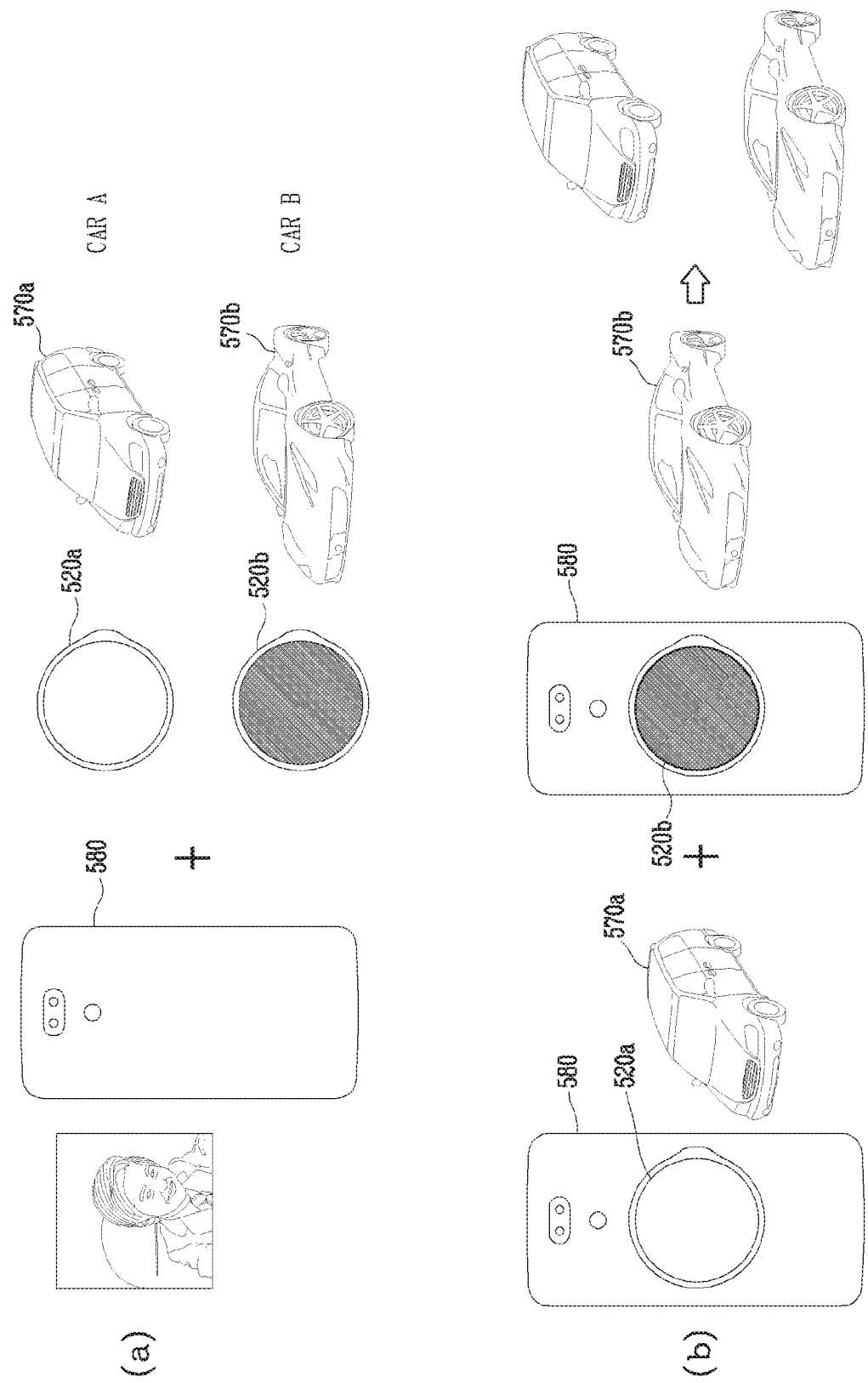

On the other hand, referring to FIG. 31, a plurality of second main bodies 520*a*, 520*b* capable of controlling different vehicles 570*a*, 570*b* may be combined with the preset external terminal 580 associated with the present disclosure.

If a second body 520*a* is attached to the external terminal 580, then the external terminal 580 may store information associated with the external device (vehicle 570*a*) that is controllable by the second body 520*a*.

Furthermore, when another second body 520*b* is attached to the external terminal 580, the external terminal 580 may store information associated with the external device (vehicle 570*b*) that is controllable by the second body 520*b*.

In this case, the external terminal 580 may recognize and store information associated with the external device owned by the owner and the type of the watch type mobile terminal.

In addition, the external terminal 580 may set control authorities for controlling the external devices 570*a*, 570*b* in the second main bodies 520*a*, 520*b*, respectively, based on the recognition. The control authorities set at this time may be control authority capable of performing all the functions of the vehicles 570*a*, 570*b*, for an example.

Referring to (a) in FIG. 32, when the second body 520 (e.g., the display unit 370) set with control authority is detached from the FOB module 380 of the watch type mobile terminal 200 and attached to the external terminal 580, as illustrated in (b) of FIG. 32, screen information 3100*a*, 3100*b* capable of controlling the external device (vehicle 800) may be displayed on the touch screen 551 of the external terminal 580 and the display unit 370 attached to the external terminal 500.

In this case, the screen information 3100*a*, 3100*b* may vary according to the control authority set in the second body 520 (display unit 370), and the screen information 3100*b* displayed on the touch screen 551 and the screen information 3100*a* displayed on the second body 520 (display unit 370) may be different from each other.

For an example, the screen information 3100*b* displayed on the touch screen 551 may include a plurality of (various types of) external device (vehicle 570) control function graphic objects, and the screen information 3100*a* displayed on the second body 520 (display unit 370) may include only part (frequently used functions) of the plurality of vehicle control function graphic objects.

The present disclosure may provide a user interface allowing the user to easily control the vehicle using the screen information 3100b displayed on the touch screen 551 or the screen information 3100a displayed on the display unit 370.

The effects of a mobile terminal according to the present disclosure and a control method thereof will be described as follows.

The present disclosure may provide a new user interface capable of controlling an external device (vehicle) in various ways according to control authority set in a second body (or a first body).

Furthermore, the present disclosure may provide a watch type mobile terminal capable of performing various functions according to whether or not a user is driving while first control authority is set.

In addition, the present disclosure may provide a control method capable of setting control authority to limit other functions according to the state of a vehicle even when third control authority (or second control authority) is set as the second body is detached from the first body so as to control the vehicle using the second body in an optimized manner.

Besides, the present disclosure may provide a mobile terminal capable of outputting information associated with a vehicle to an optimized device based on whether the first body and the second body are detached from or attached to each other, and a control method thereof.

Moreover, the present disclosure may provide a control method capable of controlling a vehicle in an optimized manner using a preset external terminal when the second body is detached from the first body and attached to the external terminal.

Further scope of applicability of the present disclosure will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is the claimed is:

1. A mobile terminal, comprising:
a band configured to be worn on a user's wrist to wrap the wrist;
a first body connected to the band;
a second body formed to be detachable from the first body; and
a controller configured to output information associated with an external device to a different device when the first body and the second body are detached from or attached to each other.

2. The mobile terminal of claim 1, wherein the external device comprises a vehicle.

3. The mobile terminal of claim 1, wherein the controller outputs information associated with the external device to a preset external terminal when the first body and the second body are detached from each other, and displays information associated with the external device on the second body when the first body and the second body are connected to each other.

4. The mobile terminal of claim 1, wherein a processor provided in the second body displays screen information capable of controlling the external device on the second body when the first body and the second body are detached from each other.

5. The mobile terminal of claim 4, wherein the processor displays different screen information based on whether or not the first body and the second body are within a predetermined distance from the external device when they are detached from each other.

6. The mobile terminal of claim 1, wherein the controller displays screen information capable of controlling the external device on the second body when the first body is detached from the wrist while the first body and the second body are combined with each other.

7. The mobile terminal of claim 6, wherein the controller displays different screen information based on whether or not the first body is within a predetermined distance from the external device when the first body are detached from the wrist.

8. The mobile terminal of claim 1, wherein when the second body is detached from the first body and then recombined with the first body, the controller outputs event information generated from the external device to the second body while the second body is detached therefrom.

9. The mobile terminal of claim 1, wherein when an event is generated from the external device, the controller outputs information associated with the generated event to at least one of the second body and a preset external terminal.

10. The mobile terminal of claim 1, wherein the processor provided in the second body is formed to display an image received through a camera provided in the external device on a preset external terminal while the second body is attached to the preset external terminal subsequent to being detached from the first body.

11. The mobile terminal of claim 1, wherein the processor provided in the second body displays a graphic object linked to a function associated with the external device on a preset external terminal when the second body is attached to the preset external terminal subsequent to being detached from the first body.

12. A method of controlling a mobile terminal, the method comprising:
sensing whether the first body and the second body are detached from or attached to each other; and
outputting information associated with an external device to a different device when the first body and the second body are detached from or attached to each other.

13. The method of claim 12, wherein the external device comprises a vehicle.

14. The method of claim 12, wherein said outputting information outputs information associated with the external device to a preset external terminal when the first body and the second body are detached from each other, and displays information associated with the external device on the second body when the first body and the second body are connected to each other.

15. The method of claim 12, further comprising:
  displaying screen information capable of controlling the external device on the second body when the first body and the second body are detached from each other.

16. The method of claim 15, wherein said displaying screen information on the second body displays different screen information based on whether or not the first body and the second body are within a predetermined distance from the external device when they are detached from each other.

17. The method of claim 12, wherein when the second body is detached from the first body and then recombined with the first body, said outputting information outputs event information generated from the external device to the second body while the second body is detached therefrom.

18. The method of claim 12, wherein when an event is generated from the external device, said outputting information outputs information associated with the generated event to at least one of the second body and a preset external terminal.

19. The method of claim 12, further comprising:
  displaying an image received through a camera provided in the external device on a preset external terminal while the second body is attached to the preset external terminal subsequent to being detached from the first body.

20. The method of claim 12, further comprising:
  displaying a graphic object linked to a function associated with the external device on a preset external terminal when the second body is attached to the preset external terminal subsequent to being detached from the first body.

* * * * *